United States Patent [19]

Yanagawa

[11] 4,274,146
[45] Jun. 16, 1981

[54] CALENDAR DATA DISPLAY DEVICE FOR AN ELECTRONIC DEVICE

[75] Inventor: Mikio Yanagawa, Akishima, Japan

[73] Assignee: Casio Computer Co., Ltd., Tokyo, Japan

[21] Appl. No.: 44,631

[22] Filed: Jun. 1, 1979

[30] Foreign Application Priority Data

| Jun. 12, 1978 | [JP] | Japan | 53-70506 |
| Jun. 14, 1978 | [JP] | Japan | 53-71801 |
| Jun. 16, 1978 | [JP] | Japan | 53-72934 |
| Jun. 21, 1978 | [JP] | Japan | 53-74077 |
| Aug. 28, 1978 | [JP] | Japan | 53-104662 |

[51] Int. Cl.³ .................... G06F 15/02; G04B 19/24
[52] U.S. Cl. ............................ 364/705; 364/710; 368/30
[58] Field of Search ............. 364/705, 710; 58/4 A, 58/58; 368/29, 30, 82

[56] References Cited

U.S. PATENT DOCUMENTS

| 3,738,099 | 6/1973 | Tanaka | 58/4 A X |
| 3,813,533 | 5/1974 | Cone et al. | 364/705 |
| 4,117,657 | 10/1978 | Shimizu | 58/4 A |
| 4,120,036 | 10/1978 | Maeda et al. | 58/58 X |
| 4,152,768 | 5/1979 | Kuriya | 364/705 |
| 4,170,105 | 10/1979 | Kashio | 58/4 A X |
| 4,205,516 | 6/1980 | Terao | 364/705 X |

Primary Examiner—Jerry Smith
Attorney, Agent, or Firm—Frishauf, Holtz, Goodman and Woodward

[57] ABSTRACT

A calendar data display controller may display the calendar of a desired month with various calendar data in a calendar display section which is provided in a display unit, together with a numerical data display section for displaying numerical data.

The calendar is displayed in a given format in a manner that, in accordance with an instruction given by depressing a CAL key provided on a keyboard for instructing a calendar display, data is prepared representing specific calendar data such as data representing the date corresponding to a specific day (for example, Sunday) of the week and/or a holiday, a day set by an operator, today, and the day as a result of date calculation, and the prepared data is sent out to a display drive unit.

35 Claims, 54 Drawing Figures

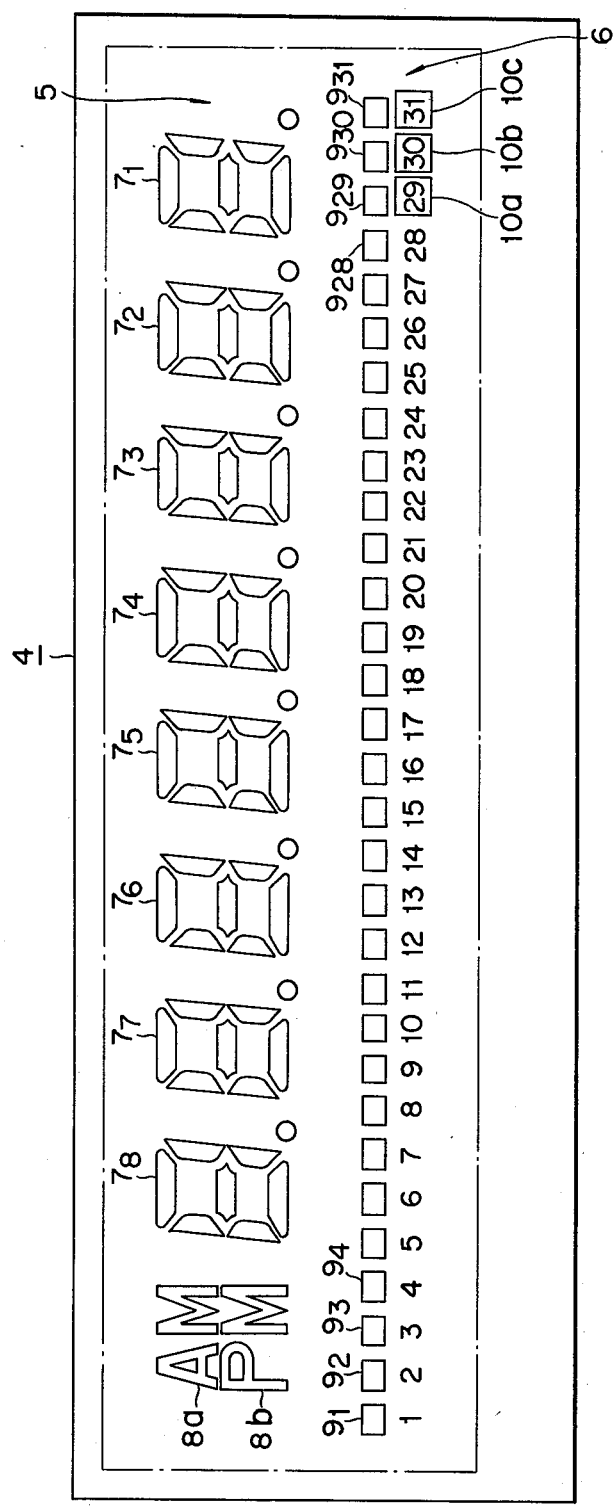

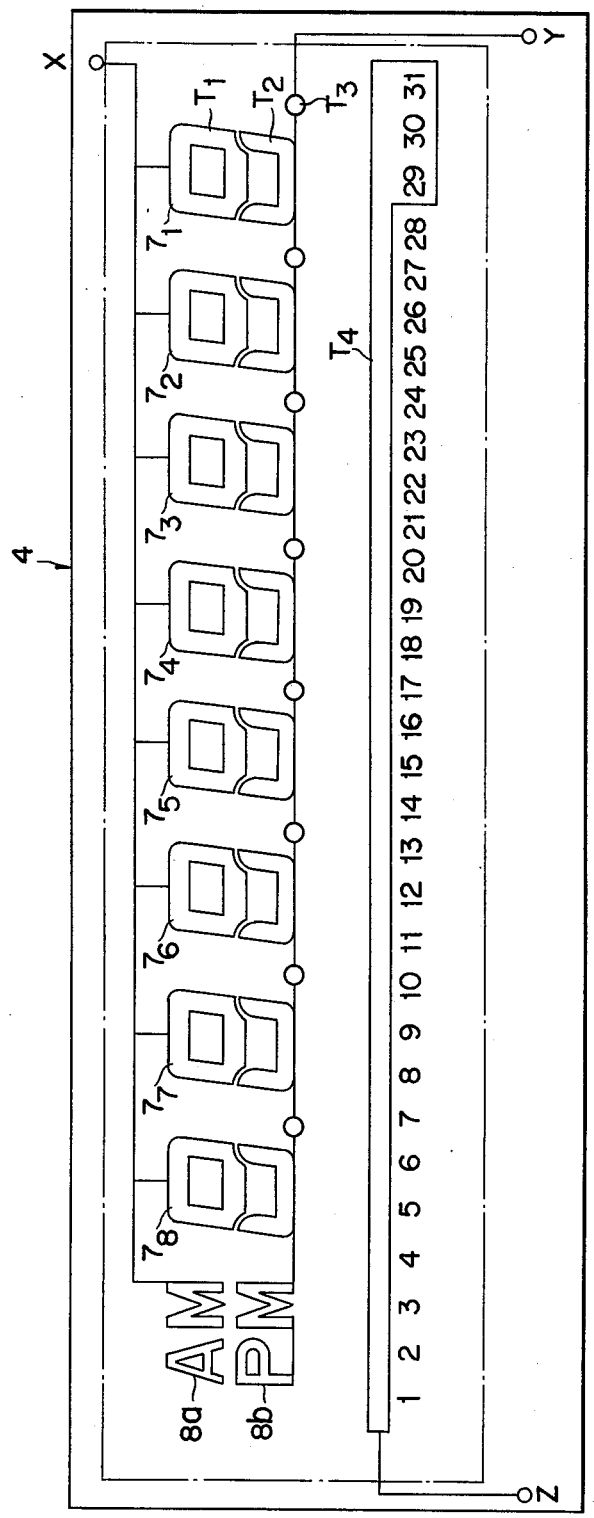

F I G. 6A
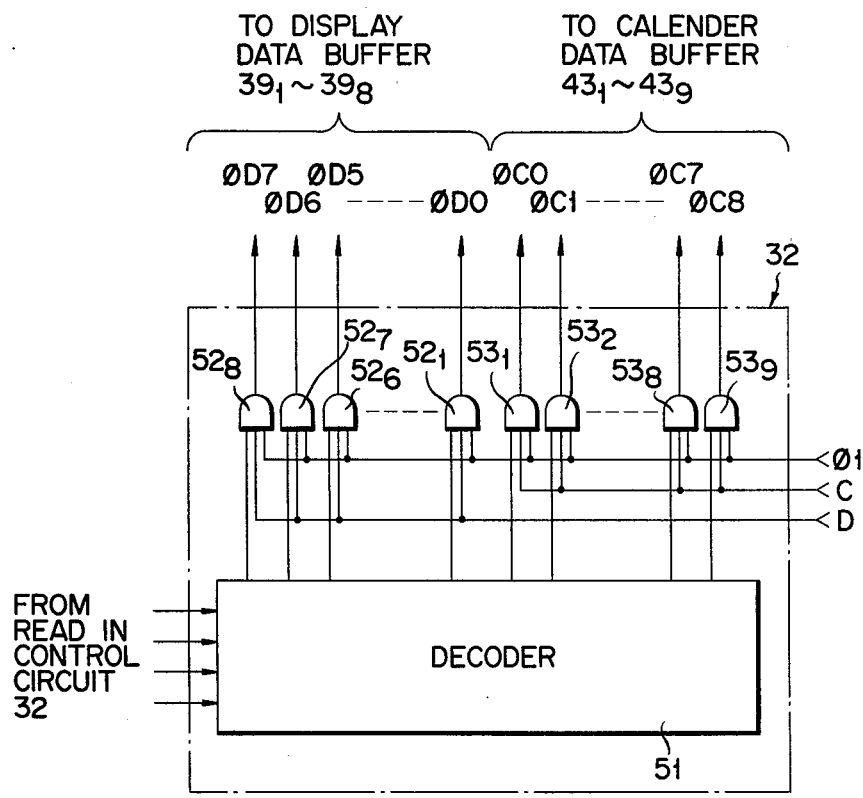

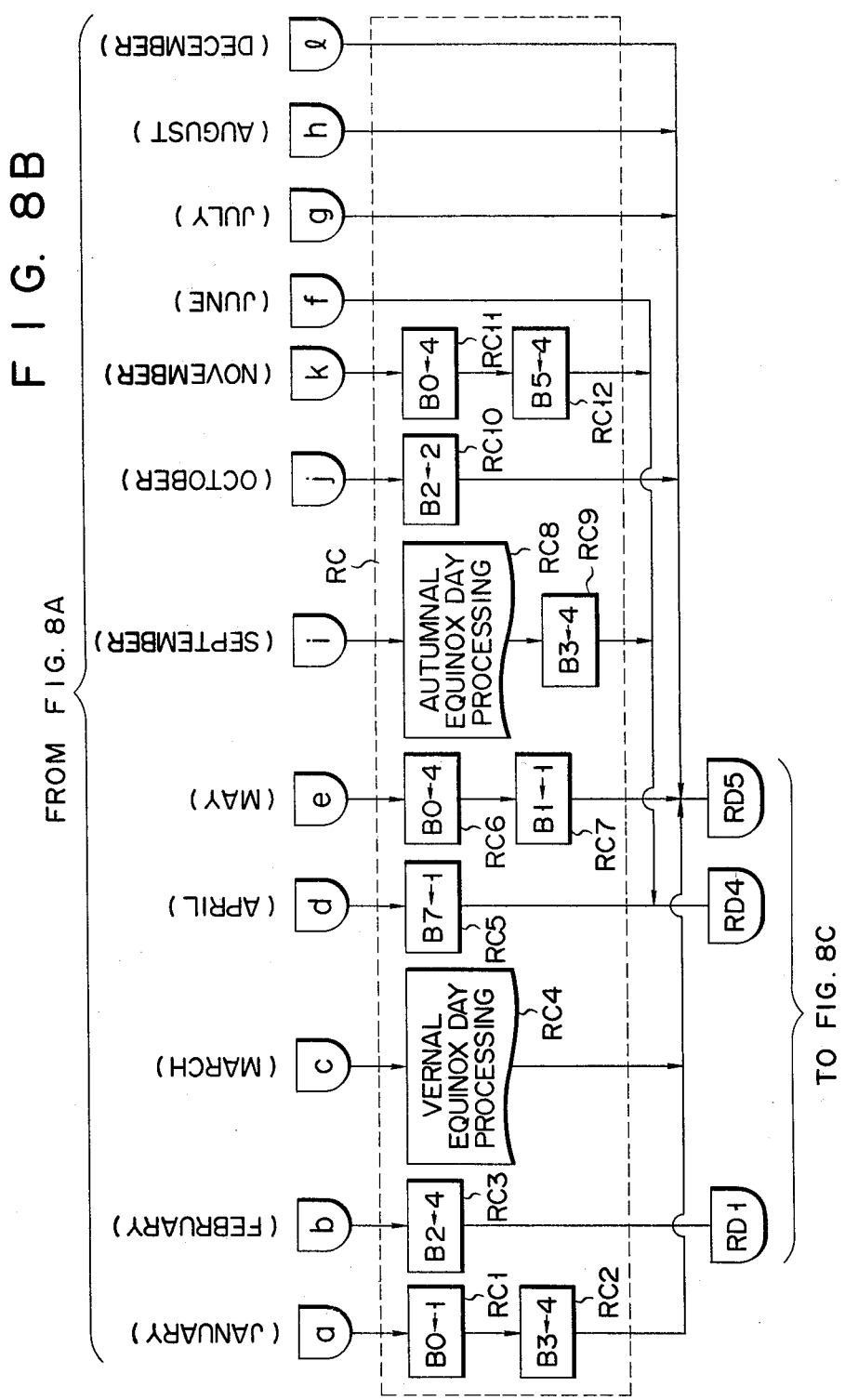

F I G. 15

| FIXED NATIONAL HOLIDAYS | |
|---|---|
| NEW YEAR'S DAY | JANUARY 1 |
| ADULT'S DAY | JANUARY 15 |
| NATIONAL FOUNDATION DAY | FEBRUARY 11 |
| EMPEROR'S BIRTHDAY | APRIL 29 |
| CONSTITUTION MEMORIAL DAY | MAY 3 |
| CHILDREN'S DAY | MAY 5 |
| RESPECT-FOR-THE-AGED DAY | SEPTEMBER 15 |
| HEALTH SPORT'S DAY | OCTOBER 10 |
| CULTURE DAY | NOVEMBER 3 |
| LABOR THANKSGIVING DAY | NOVEMBER 23 |
| UNFIXED NATIONAL HOLIDAYS | |
| VERNAL EQUINOX DAY | MARCH 21 BEFORE OR AFTER |
| AUTUMNAL EQUINOX DAY | SEPTEMBER 24 BEFORE OR AFTER |

FIG. 16

| YEAR OF CHRIST | VERNAL EQUINOX DAY | | | AUTUMNAL EQUINOX DAY | | YEAR OF CHRIST | VERNAL EQUINOX DAY | | | AUTUMNAL EQUINOX DAY | |
|---|---|---|---|---|---|---|---|---|---|---|---|
| | 3/20 | 3/21 | 3/22 | 9/23 | 9/24 | | 3/20 | 3/21 | 3/22 | 9/23 | 9/24 |
| 1900 | | O | | O | | 1940 | | O | | O | |
| 1 | | O | | | O | 41 | | O | | O | |
| 2 | | O | | | O | 42 | | O | | | O |
| 3 | | | O | | O | 43 | | O | | | O |
| 4 | | O | | O | | 44 | | O | | O | |
| 5 | | O | | | O | 45 | | O | | O | |
| 6 | | O | | | O | 46 | | O | | | O |
| 7 | | | O | | O | 47 | | O | | | O |
| 8 | | O | | O | | 48 | | O | | O | |
| 9 | | O | | | O | 49 | | O | | O | |
| 10 | | O | | | O | 50 | | O | | O | |
| 11 | | | O | | O | 51 | | O | | | O |
| 12 | | O | | O | | 52 | | O | | O | |
| 13 | | O | | | O | 53 | | O | | O | |
| 14 | | O | | | O | 54 | | O | | | O |
| 15 | | | O | | O | 55 | | O | | | O |
| 16 | | O | | O | | 56 | | O | | O | |
| 17 | | O | | | O | 57 | | O | | O | |
| 18 | | O | | | O | 58 | | O | | O | |
| 19 | | | O | | O | 59 | | O | | | O |
| 20 | | O | | O | | 60 | O | | | O | |
| 21 | | O | | | O | 61 | | O | | O | |
| 22 | | O | | | O | 62 | | O | | O | |
| 23 | | | O | | O | 63 | | O | | | O |
| 24 | | O | | O | | 64 | O | | | O | |
| 25 | | O | | O | | 65 | | O | | O | |
| 26 | | O | | | O | 66 | | O | | O | |
| 27 | | O | | | O | 67 | | O | | | O |
| 28 | | O | | O | | 68 | O | | | O | |
| 29 | | O | | O | | 69 | | O | | O | |
| 30 | | O | | | O | 70 | | O | | O | |
| 31 | | O | | | O | 71 | | O | | | O |
| 32 | | O | | O | | 72 | O | | | O | |
| 33 | | O | | O | | 73 | | O | | O | |
| 34 | | O | | | O | 74 | | O | | O | |
| 35 | | O | | | O | 75 | O | | | | O |
| 36 | | O | | O | | 76 | O | | | O | |
| 37 | | O | | O | | 77 | | O | | O | |
| 38 | | O | | | O | 78 | | O | | O | |
| 39 | | O | | | O | | | | | | |

FIG. 21
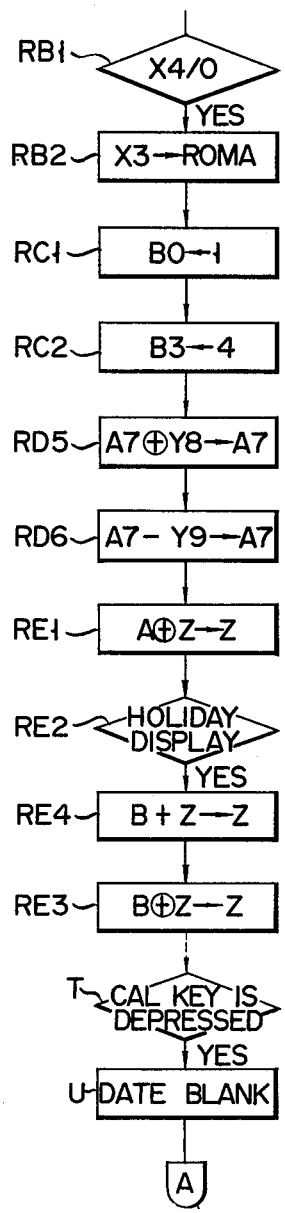
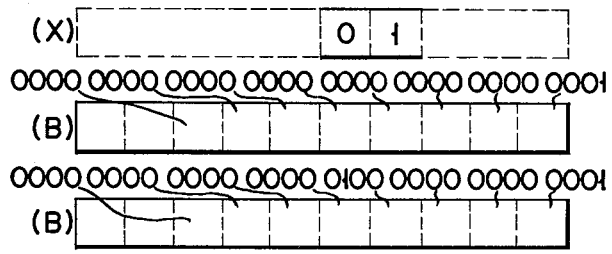
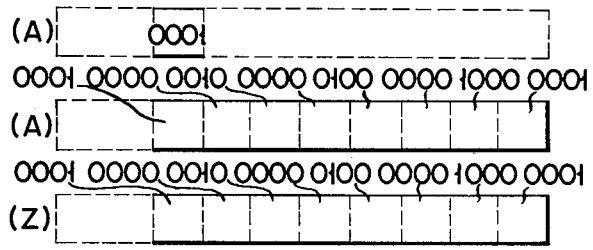
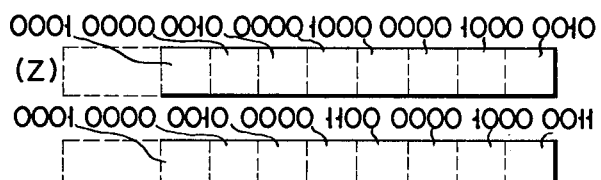

FIG. 24
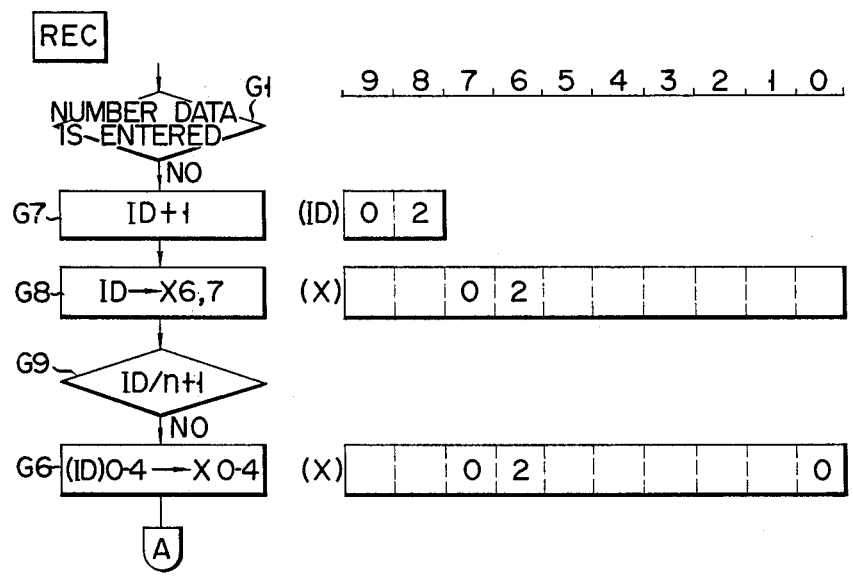
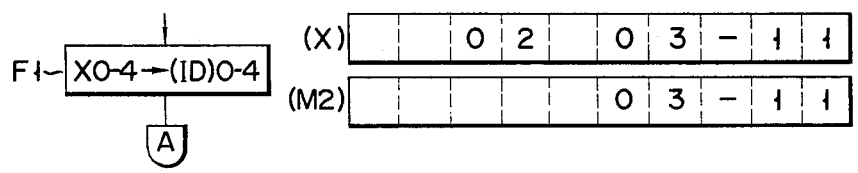
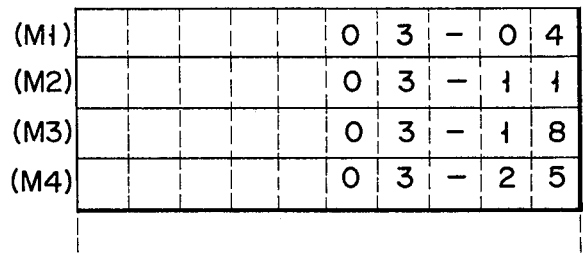

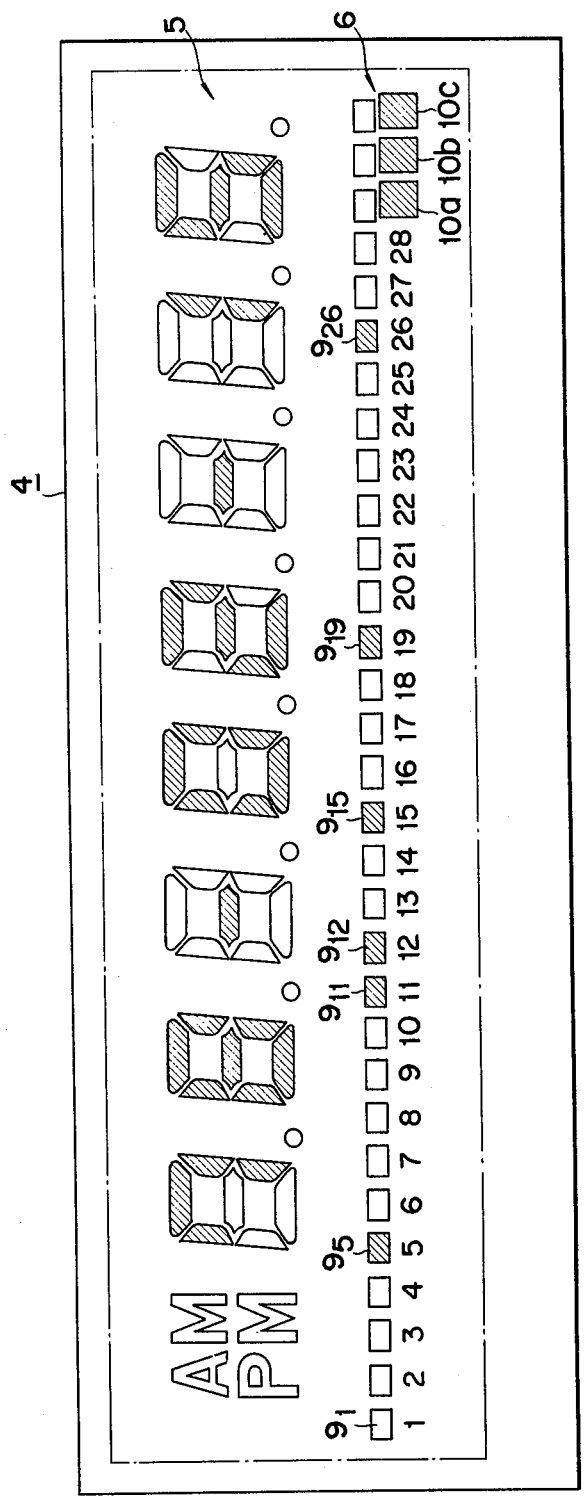
F I G. 32

FIG. 35
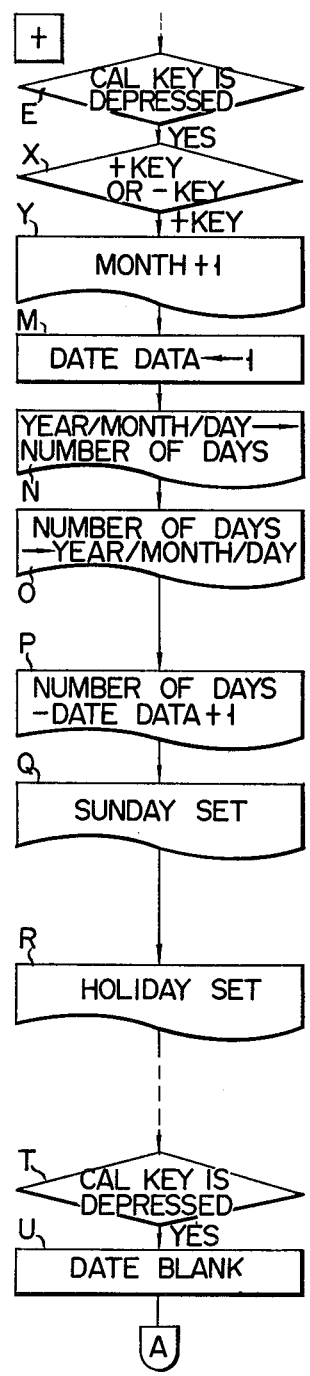
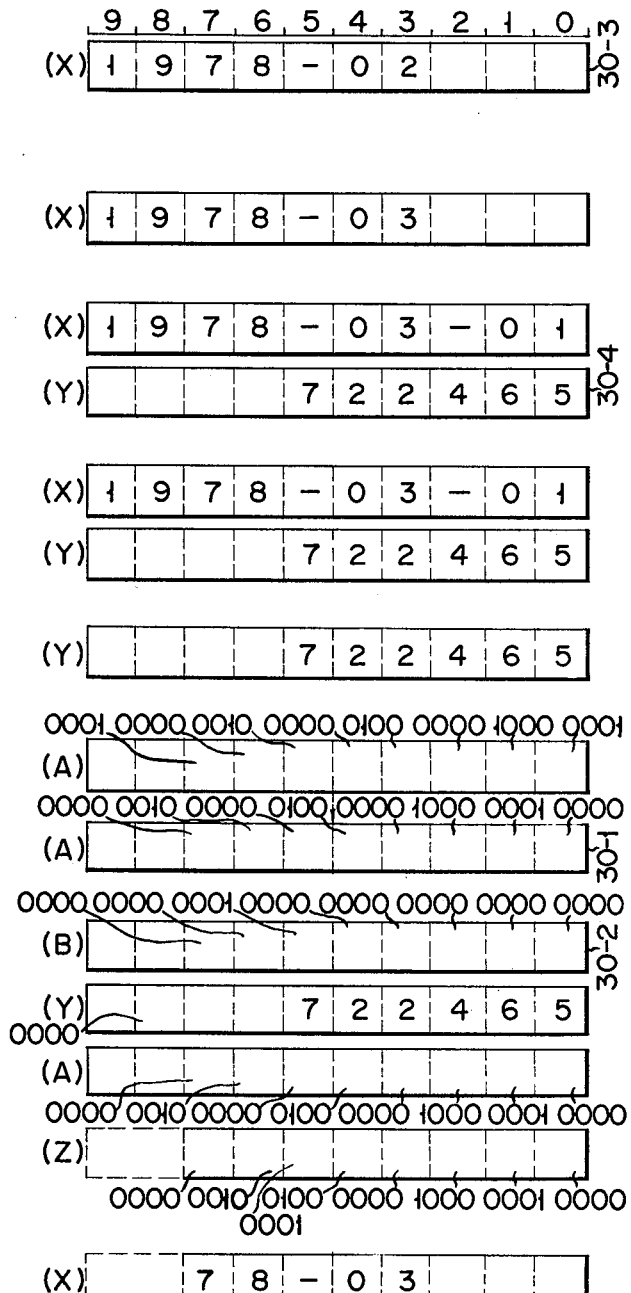

FIG. 37

| NEW YEAR'S DAY | JANUARY 1 |
|---|---|
| WASHINGTON'S BIRTHDAY | FEBRUARY 22 |
| MEMORIAL DAY | MAY 30 |
| INDEPENDENCE DAY | JULY 4 |
| LABOR DAY | FIRST MONDAY OF SEPT. |
| VETERANS' DAY | NOVEMBER 11 |
| THANKSGIVING DAY | FINAL THURSDAY OF NOV. |
| CHRISTMAS | DECEMBER 25 |

FIG. 38

| WHIT MONDAY | MONDAY AFTER PENTICOST |
|---|---|
| EASTER MONDAY | MONDAY AFTER EASTER |
| QUEEN'S BIRTHDAY | APRIL 21 |
| COMMON WEALTH DAY | MAY 24 |
| DERBY DAY | FIRST WEDNESDAY OF JUN. |
| LAMMAS DAY | AUGUST 1 |
| BANK HOLIDAY | FIRST MONDAY OF AUG. |
| BOXING DAY | DECEMBER 26 |

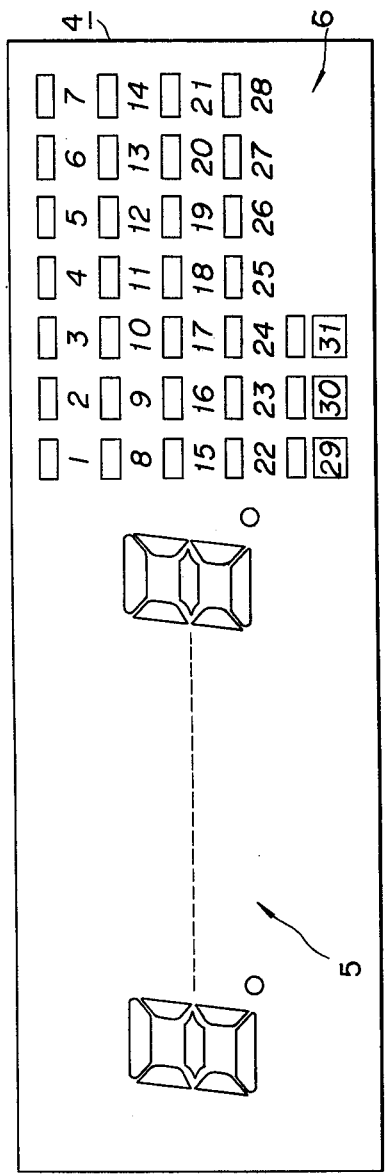
F I G. 40
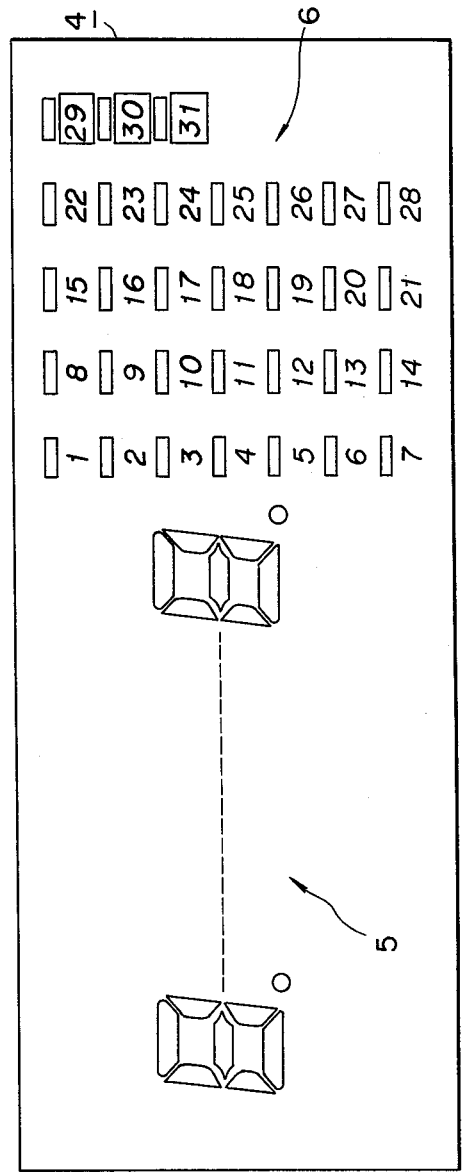
F I G. 41

CALENDAR DATA DISPLAY DEVICE FOR AN ELECTRONIC DEVICE

BACKGROUND OF THE INVENTION

The present invention relates to a calendar data display device capable of displaying various calendar data in a calendar display section of at least one month provided in a small-sized electronic device with a calendar display function.

Many and various types of small-sized electronic devices with a time-count function have been marketed such as small-sized electronic calculators with a time-count function or electronic timepieces. Some of these devices can display date data on the basis of time-count data. Some of the electronic calculators of this type are provided with a date calculating function, which can easily calculate that day after or before a given number of days from a day, and display such a day.

In a usual practical use, a full one-month calendar data is required rather than such a specific date, for use in making a plan or the like. Some desk-top electronic calculators now marketed can display such a full one-month calendar. This calculator, however, displays the one-month calendar previously stored or distinctively displays at most the specific days, for example, Sundays of the weeks, in addition to the one-month calendar. In other words, it can not display national or public holidays, for example, or a desired day properly set by an operator.

Recently, most of the companies or offices employ the working system of the "five-day work week". To cope with this, a specific calendar is specially prepared. The conventional calculator with the calendar display function can not be adapted for the display of such a special calendar.

So far as we have investigated, there has been no electronic device with both the date calculation and the calendar display.

Additionally, in order to display the last month or the next month calendar frequently used by the conventional electronic devices, the year and month data relating to it must be keyed in each time such a display is performed. This operation is very troublesome work.

Accordingly, an object of the invention is to provide a calendar data display device for use in an electronic device which is capable of displaying various calendar data in a small-sized electronic device with a calendar display function.

Another object of the invention is to provide a calender data display device for use in an electronic device which is capable of displaying as holidays Sundays and national holiday in a month to be displayed in a given format.

Still another object of the invention is to provide a calendar data display device for use in an electronic device which is capable of displaying as holidays Sundays and public holidays in a month to be displayed and the next day as a holiday when Sunday coincides with public holiday.

Yet another object of the invention is to provide a calendar data display device for use in an electronic device which permits an operator to set a desired day or days and is capable of displaying a calendar previously stored and at the same time an extra calendar including the desired day or days in a specific format, or displaying only the latter calendar.

A further object of the invention is to provide a calendar data display device for use in an electronic device which is capable of automatically displaying a calendar of the month including a date of today given by the time-count function of a small-sized electronic apparatus such as a desk-top calculator or an electronic timepiece, and capable of displaying the date of today in a given format in the calendar.

Another object of the invention is to provide a calendar data display device for use in an electronic device which is capable of automatically displaying the calendar of a month including the date as a result of the date calculation and further displaying the calculation resultant date in the calendar in a given format.

An additional object of the invention is to provide a calendar data display device for use in an electronic device which is capable of automatically displaying a calendar of the last month or the next month through the operation of a given key.

SUMMARY OF THE INVENTION

To achieve the above-mentioned objects of the invention, there is provided a calendar data display device for use in an electronic device comprising: a display unit including a numerical data display section for displaying various data and a calendar display section where at least one-month dates are arranged in a given format to provide a given calendar arranged in a given format; a display drive unit coupled with the display unit for driving the display unit; and directing means for directing the drive unit to send the calendar data of a month to be displayed; control means which responds to the direction issued from the directing means to control the preparation of the calendar data of a month to be displayed; calendar data preparation means which, under control of the control means, prepares the calendar information of a month to be displayed containing data representing the date corresponding to a specified day of the week and/or data representing a given date different from the date corresponding to the specified day of the week; and memory means for storing a date data set by the calendar data preparing means and/or the input means.

With such a construction, not only days of the week but also other various calendar data may be displayed, thus making it easy to plan meetings or travels. The invention enables the related electronic device to display Sundays and/or the remaining holidays. This also makes it easy to plan the same. When using the calendar data display controller according to the invention, the related electronic device can display as holidays public holidays othe than Sunday, in addition to Sundays, and display also as a holiday the next day when Sunday coincides with a national holiday. In other words, the device can display a calendar in exactly the same way as the conventional calendar. This feature brings about further improved beneficial effects as mentioned above. Additionally, the invention enables the related electronic device to display a desired day in a given format. Accordingly, the electronic device using the calendar data display controller according to the invention may also be used as data memory. Further, a calendar including a date set by an operator may be displayed together with another calendar previously stored or the former calendar may soley be displayed, so that a calendar with quite different holidays may be prepared and displayed. Moreover, according to the invention, a calendar of a month containing today or a date resulting from date calculation may automatically be displayed in a given format. This feature enhances the discrimination of such a specified day. According to the invention, a calendar of any month may easily be displayed and a calendar of the last month or the next month may be displayed by a simple key operation.

BRIEF DESCRIPTION OF THE DRAWINGS

FIG. 2 shows a plan view of a display section of the calculator shown in FIG. 1;

FIGS. 3A and 3B show the structure of electrodes and the wiring thereof in the display section shown in FIG. 2;

FIGS. 6A and 6B show circuit diagrams of a reading control circuit 32, display data buffers $39_1$ to $39_8$, calendar data buffers $43_1$ to $43_9$, and a combination logic circuit 40 shown in FIGS. 4A and 4B;

FIGS. 8A to 8C show flow charts illustrating the detail of a routine R in FIG. 7G;

FIG. 15 shows a table tabulating the national holidays in Japan;

FIG. 16 shows a table illustrating the Vernal Equinox Days and the Automnal Equinox Days in the period from 1900 to 1978;

FIGS. 20 and 21 comparatively show the processing routines and the contents of the related registers when a national holiday coincides with Sunday;

FIGS. 23 and 24 comparatively show the processing routines or steps and the contents of the related registers when a specific calendar is set by an operator;

FIG. 32 shows a display state when a series of processings shown in FIG. 31 are executed;

FIG. 35 shows the routines or steps and the contents of the related registers when the month of a calendar currently displayed is changed;

FIG. 37 tabulates the national holidays commonly used in all the states in U.S.A.;

FIG. 38 tabulates the national holidays in England;

FIGS. 40 and 41 show modifications of the display section shown in FIG. 2.

DETAILED DESCRIPTION

Figure 1:
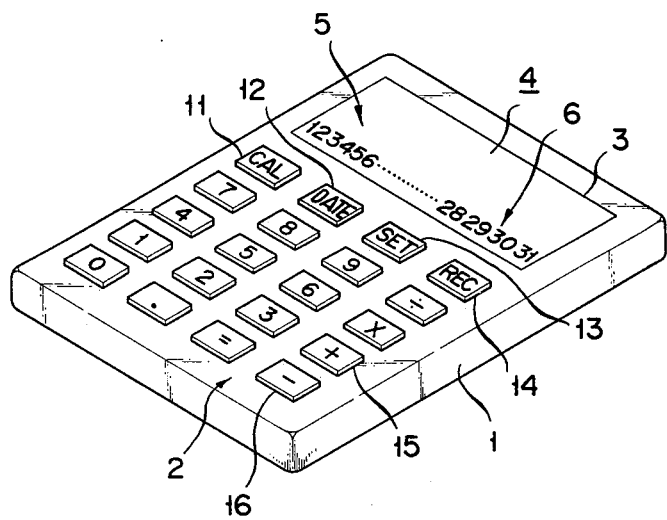
FIG. 1 shows a perspective view of the outer appearance of a small-sized electronic calculator to which the invention is applied.

Referring now to FIG. 1, there is shown the outer appearance of an electronic calculator to which a calendar data display device according to the invention is applied. A case 1 is provided on the upper surface with a keyboard 2 and a display window 3 for displaying data. A display unit 4 housed in the case 1 is disposed just below the display window 3. The keyboard 2 has ten keys for keying in numerical data, function keys including a + key 15, and a − key 16 for designating the contents of operations, a CAL key 11 for displaying a calendar, a DATE key 12 for inputting year, month and day or month and day, a SET key 13 for setting a calendar (referred often as to an extra calendar) different from that keyed in by the CAL key 11, and a REC key 14 for reading out the extra calendar from a memory of the calculator.

As illustrated in detail in FIG. 2 the display unit 4 is formed by a liquid crystal display device, for example, and includes a data display section 5 for displaying registered data, the result of the operation, time data and the like, and a calendar display section 6. The data display section has eight numerical display elements $7_1$ to $7_8$ of eight digits and abbreviated characters AM and PM meaning before noon and after noon, which are disposed on the left hand side of the numerical display elements row. The characters AM and PM are denoted as $8a$ and $8b$, respectively. The calendar display section 6 includes 31 holiday display elements $9_1$ to $9_{31}$ disposed below the data display section 5 and date numerals 1 to 31 marked or printed below the holiday display elements $9_1$ to $9_{31}$. As a matter of course, the date numerals row may be disposed above the holiday display elements row or those two rows may be disposed above the numerical display elements row. The display elements $9_{29}$ to $9_{31}$ are provided with mask electrodes $10a$ to $10c$ for selectively masking the display elements $9_{29}$ to $9_{31}$ in accordance with a month to be displayed.

Figure 3A:
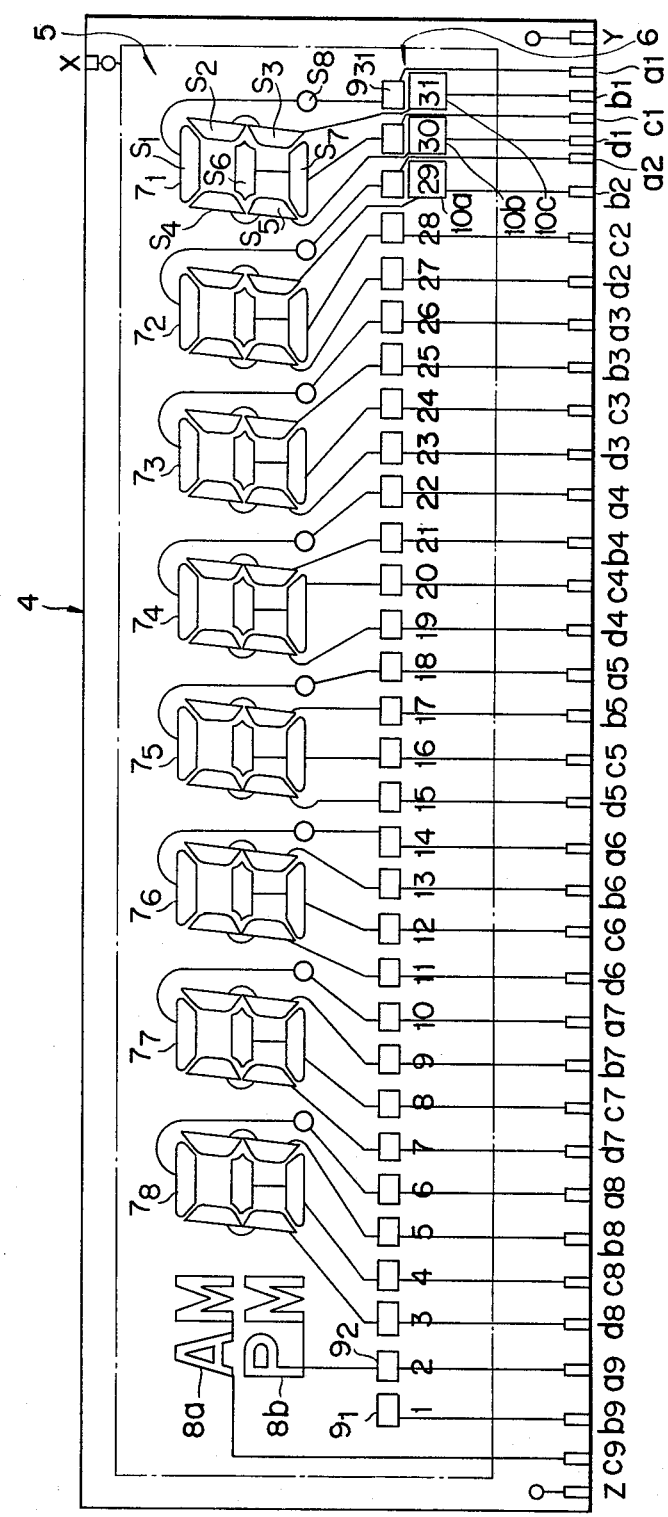

In FIGS. 3A and 3B illustrating electrode arrangements of the display unit 4, first electrodes are shown in FIG. 3A and second electrodes in FIG. 3B. Each numerical display element $7_1$ to $7_8$ is comprised of first electrodes S1 to S7, i.e. segment electrodes, and a decimal point electrode S8. The segment electrodes S1 to S7 arranged in a letter 8 shape of each numerical display element, the decimal point electrode S8 thereof, character display elements 8a and 8b, specified day/holiday display elements $9_1$ to $9_{31}$, and mask electrodes 10a to 10c respectively are connected to external terminals a1 to a9, b1 to b9, c1 to c9 and d1 to d8, respectively. Here, the term 'specified day' indicates a day specified by an operator, today, the day as a result of period calculation the 'holiday' indicates thosee including Sunday and public holidays.

The second electrodes, or common electrodes, shown in FIG. 3B are disposed right below the respective segment electrodes shown in FIG. 3A. Each of the numerical display elements $7_1$ to $7_8$ is divided into two common electrodes T1 and T2. A single common electrode T4 is disposed covering the mask electrodes 10a to 10c and extending above and along the specific day/holiday display elements $9_1$ to $9_{31}$. The common electrodes T1 of the numerical display members $7_1$ to $7_8$, and a common electrode for the character display element 8a of AM are commonly connected to an external terminal X. The common electrodes T2, decimal point common electrodes T3 and a common electrode for the PM character display element 8b are commonly connected to an external terminal Y. The common electrode T4 is commonly connected to an external terminal Z.

Figure 4A:
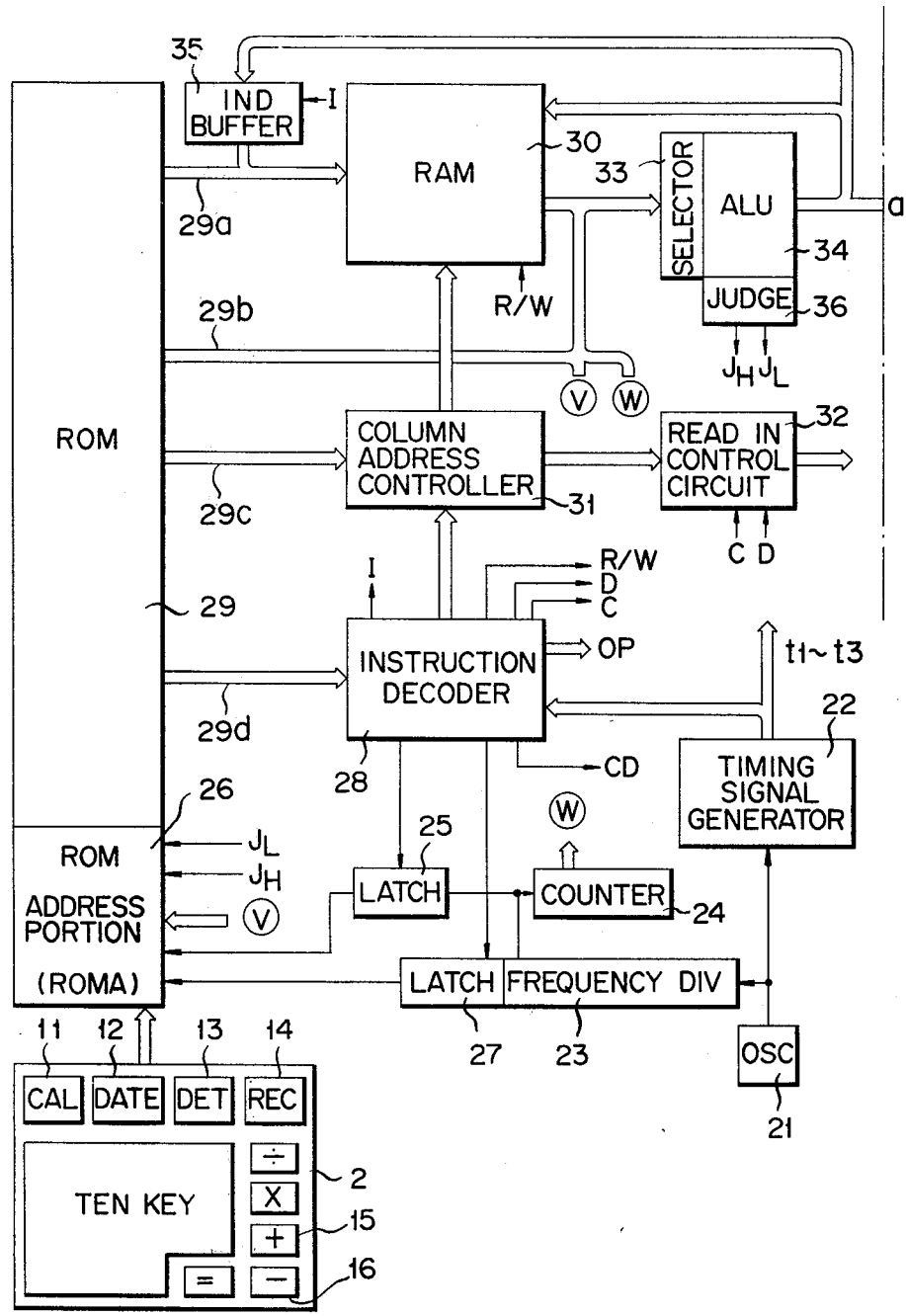
FIGS. 4A and 4B cooperate to form a block diagram of an embodiment of a calendar data display device according to the invention.
Figure 4B:
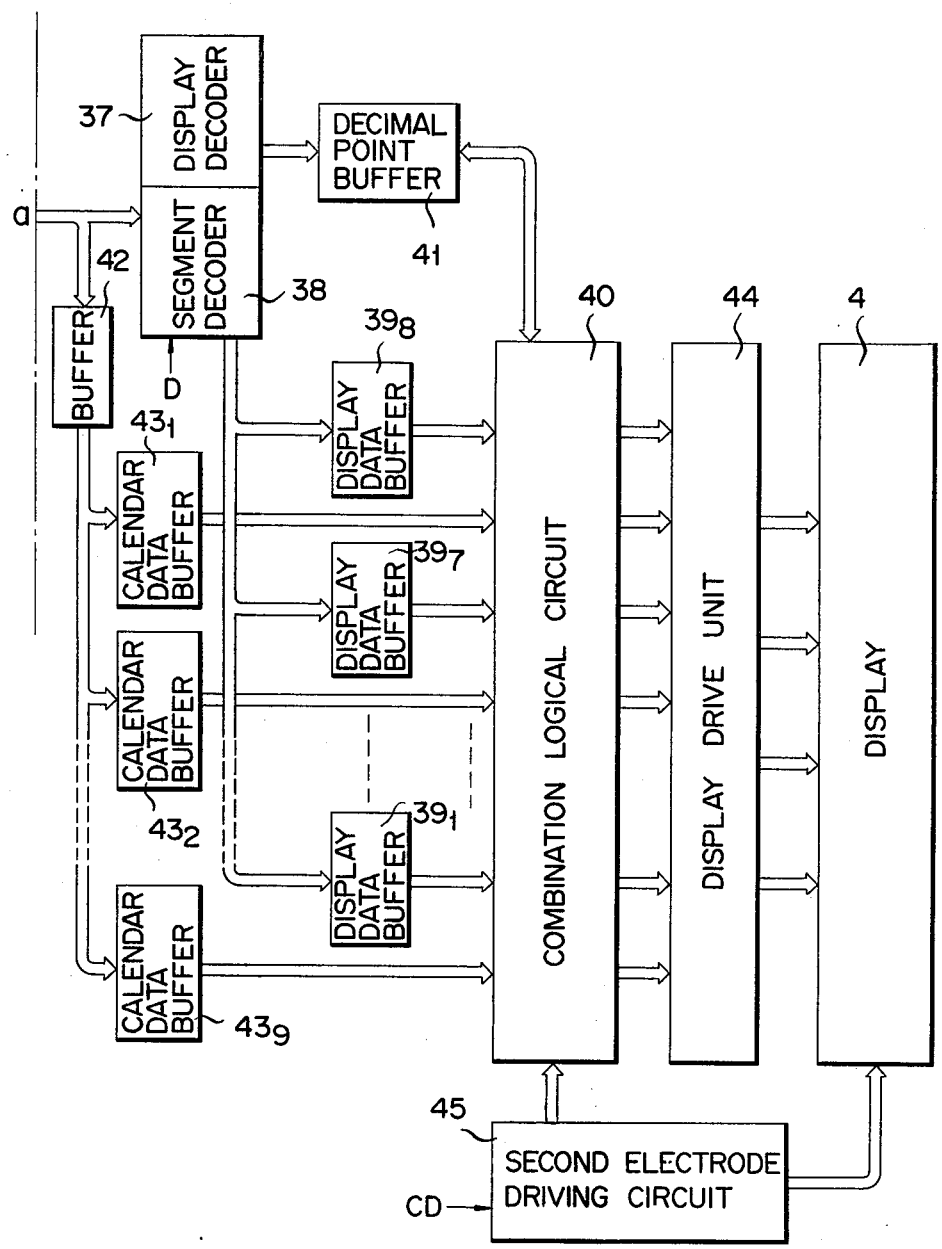
Figure 5:
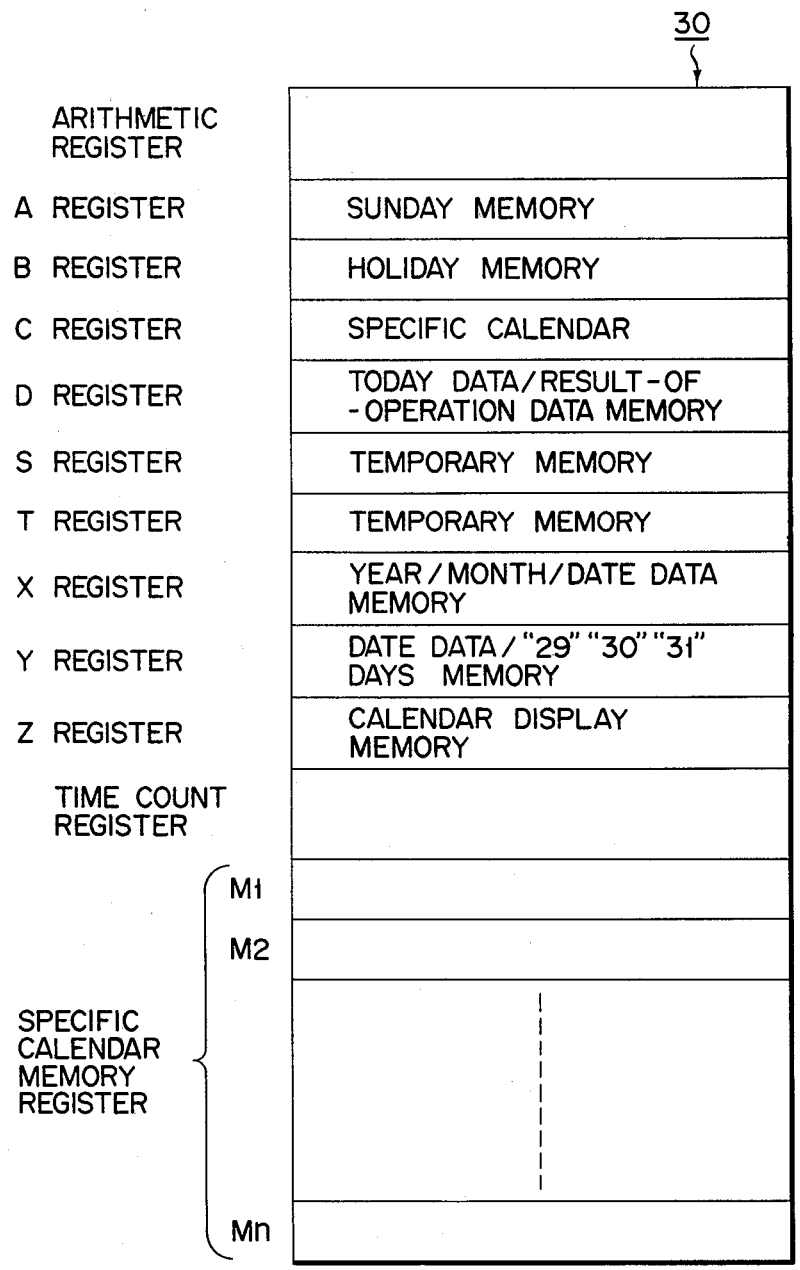
FIG. 5 shows a register arrangement of RAM 30 shown in FIG. 4A.

Explanation to follow is the elaboration of a circuit construction of the calendar data display device according to the invention. Reference is made to FIGS. 4A and 4B. Reference numeral 21 designates a reference frequency oscillator for producing clock pulses used to count time and to control operations at the respective portions in the circuit. The output clock pulses from the oscillator 21 are applied to a timing signal generator 22 and to a frequency divider 23. The frequency divider 23 frequency-divides the output clock pulse signal from the oscillator 21 into a 0.5 second signal and a 1 second signal. The 0.5 second signal is applied to a status counter 24 for producing a flashing signal and also is applied to a ROM (read only memory) address portion (ROMA) 26 through a latch circuit 25. The 1 second signal from the frequency divider 23 is applied to ROMA 26 via a latch circuit 27. The latch circuits 25 and 27 are reset by signal delivered from an instruction decoder 28. The timing signal generator 22 produces timing signals t1 to t3 of three phases and other various timing signals on the basis of the clock signal delivered from the oscillator 21. The various timing signals are distributed to the instruction decoder 28 and the remaining necessary circuit portions. ROMA 26 designates addresses in ROM 29 storing various control programs. In addition to the signal from the frequency divider 23, the signals applied to ROMA 26 include a key operation signal from the keyboard 2, judgement signals $J_L$ and $J_R$ from a judgement portion to be described later. Those signals are applied thereto as address data. Additionally, the next address (not shown) from ROM 29 and a jump address V from ROM 29 or RAM (randon access memory) to be given later are applied to ROMA 26. ROM 29 has output lines 29a to 29d. The output line 29a a ROM 29 delivers a row address data to RAM 30 thereby to designate an operatinal (first operand) register and second operand registers in RAM 30. As shown in FIG. 5, RAM 30 includes arithmetic registers A to D, S register, T register, S to Z registers, time count register, additional calendar registers M1 to Mn. The A register holds Sunday data; B register holiday data; C register additional calendar data properly prepared; D register today and the day of a caluclation result; X register year, month and day data; Y register the number of days counted from a reference day and a day or days to be erased at the end of a mont; Z register calendar display data. The S and T registers are used to temporarily store operational data to gain calendar data.

A specific register of those registers in RAM 30 is specified by a row address signal delivered through the output line 29a of RAM 30. The column address of the specified register is specified by a column address signal transferred from a column address controller 31. The column address controller 31 receives a column address transferred through the output line 29c from ROM 29 and start and end column addresses therefrom and transfers a column address control signal to a read-in control circuit 32. The output line 29b of ROM 20 for delivering numerical code or address data delivers a jump address V to ROM 26 and numerical code to an arithmetic unit 34 by way of a selector 33. The output line 29d delivers various instructions to the instruction decoder 28. The instruction decoder 28 decodes various instructions transferred from ROM 28 to produce a read/write command R/W, a data display command D, a calendar display command C, various operation commands OP, a display timing signal generating command CD, reset signals and indirect address control signal I and the like. As mentioned above, a reset signal is applied to latch circuits 25 and 27. The read/write command R/W outputted from the instruction decoder 28 is sent to RAM 30 to direct the read or write operation. When RAM 30 responds to a read-out command to produce data from an internal register, the read-out data is applied via the selector 33 to ALU 34 where it is properly processed. The output signal from ALU 34 is inputted as write data to RAM 30 and to the column address designating terminal of RAM 30, via an address buffer 35 for indirect address. The address buffer 35 performs the read-in operation at the time that the instruction decoder 28 produces the indirect address control signal I, and applies its output to the row address designation terminal of RAM 30. The output of ALU 34 is judged by the judging portion 36 as to whether data and carry are present or not and the judged output signals $J_L$ and $J_H$ are sent to ROMA 26. The output signal from ALU 34 is applied to a display decoder 37 and a segment encoder 38 where it is converted into segment signal which in turn are stored for a time display data buffers $39_1$ to $39_3$ and then are transferred to a combination logic circuit 40. In addition to the decoding of the display data, the display decoder 37 decimal point data is set for a time in decimal point buffer 41 and then is applied to the combination logic circuit. Of the data derived from ALU 34, the calendar data is temporarily stored in a buffer register 42 and then is transferred to the combination logic circuit 40, through calendar information buffers $43_1$ to $43_9$. The display data buffer circuit 39 and the calendar data buffer circuit 43 operate in response to the control signal delivered from the read-in control circuit 32. The detail of this will be described later. The output signal from the combination logic circuit is transferred to a display drive circuit 44 which in turn drives the display unit 4. The combination logic circuit 40 and the display unit 4 operate in response to the timing signals X, Y and Z or a drive signal outputted from a second electrode drive circuit 45. The second electrode drive circuit 45 operates in response to an operation start signal CD derived from the instruction decoder 28.

Figure 6B:
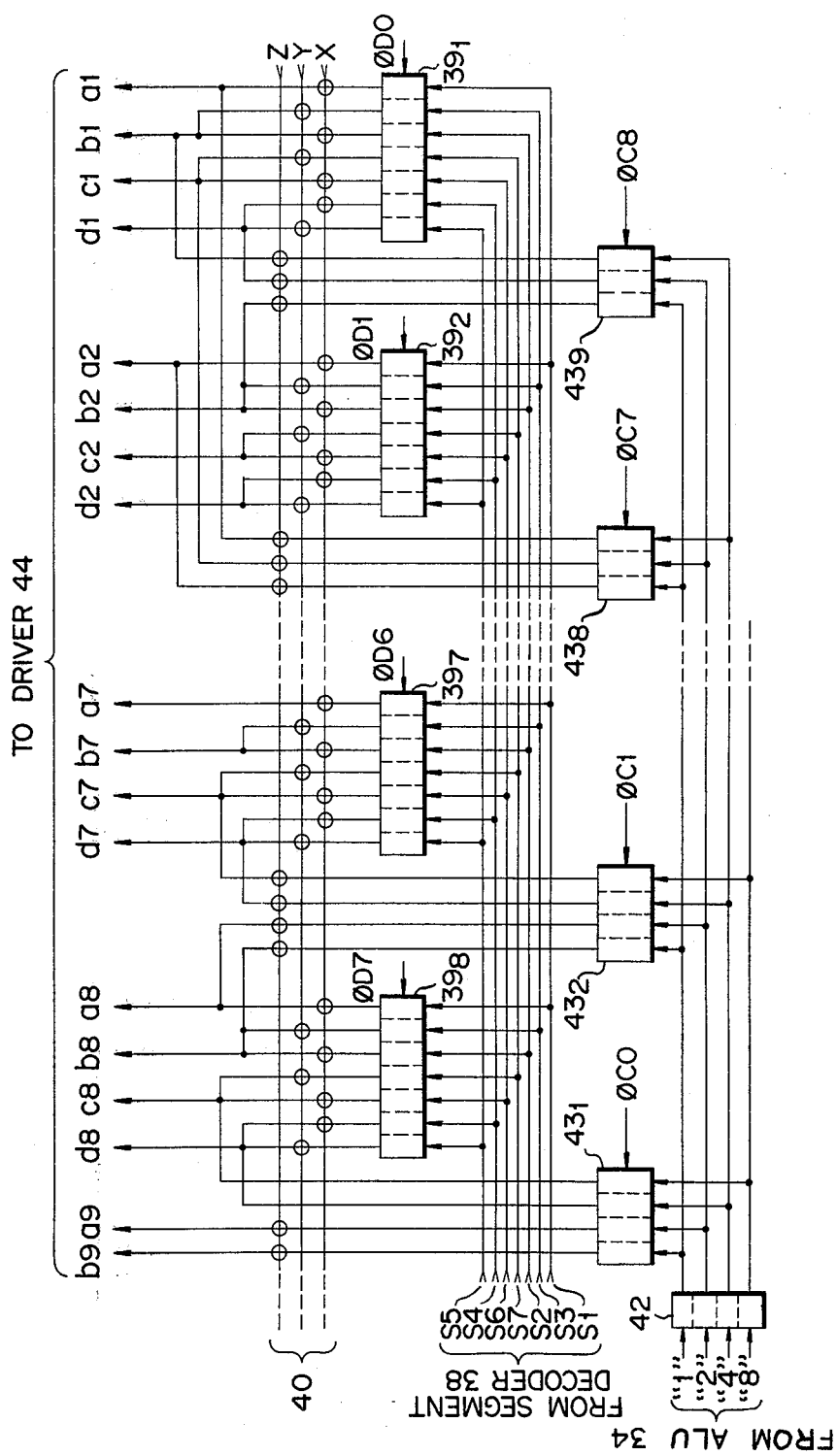

Reference will be made to FIGS. 6A and 6B for explaining in detail the read-in control circuit 32, display data buffers $39_1$ to $39_8$, calendar data buffers $43_1$ to $43_9$, and combination logic circuit 40. The read-in control circuit 32 is comprised of a decoder 51 for decoding address data transferred from the row address controller 31, and AND gates $52_1$ to $52_8$, and $53_1$ to $53_9$ connected to the output of the decoder 51. The clock pulse $\phi 1$ and the display command D derived from the instruction decoder 28 are applied to AND gates $52_1$ to $52_8$. Under this condition, the output signal from the decoder 51 fully conditions the AND gates $52_1$ to $52_8$ to successively produce timing signals $\phi_{D0}$ to $\phi_{D7}$ for reading in the display data. The AND gates $53_1$ to $53_4$ supplied with the clock signal $\phi 1$ and the calendar display command C fed from the instruction decoder 28, is enabled by the output signal from the decoder 51 to successively produce timing signals $\phi c0$ to $\phi c8$ for reading in the calendar data.

The timing signals $\phi c0$ to $\phi c8$ outputted from the AND gates $53_1$ to $53_9$ are applied as read-in signals to calendar data buffers $43_1$ to $43_9$. Of the calendar data buffers $43_1$ to $43_9$, two stages $43_8$ and $43_9$ are each constructed by three bits and the remaining ones by four bits. The bits of the buffers $43_1$ to $43_8$ respectively correspond to the specific day/holiday display elements $9_1$ to $9_{31}$. The specific day data or the holiday data designated by an operator is set therein through the buffer 42 or 4 bits. The buffer $43_9$ corresponds to the mask electrodes 10a to 10c. Mask data is set through the buffer 42 in the buffer $43_9$. The timing signals $\phi_{D0}$ to $\phi_{D7}$ outputted from the AND circuits $52_1$ to $52_8$ are applied as a data read-in signal to the display data buffers $39_1$ to $39_8$. The data buffers $39_1$ to $39_8$ are each constructed of 7 bits and buffer signals from the segment decoder 38 and transfer them to the segment electrodes S1 to S7.

The outputs from the display data buffers $39_1$–$39_8$ and the calendar data buffers $43_1$ to $43_9$ are transferred to the combination logic circuit 40. The combination logic circuit 40 is comprised of transfer gates. The transfer gates are controlled in their opened and closed operations by the timing signals X, Y and Z transferred from the second electrode drive circuit 45 to select the outputs from the display data buffers $39_1$ to $39_8$ or the calendar data buffers $43_1$ to $43_9$. These selected ones are sent out from the terminals $a_1$ to $a_9$, $b_1$ to $b_9$, $c_1$ to $c_9$ and $d_1$ to $d_8$ to the display unit 4, through the driver 44. As shown, the output a1 of the combination logic circuit 40 is coupled with the electrode $9_{31}$ for displaying a specified day/holiday of 31st day, the decimal point electrode S8 and the segment S1. The display element $9_{31}$ is energized by the timing signal Z; the decimal point electrode S8 by the timing signal Y; the segment S1 by the timing signal X. Accordingly, the outputs of the buffer $39_1$ corresponding to the segment S1 are wired-ORed through the transfer gates enabled at the timing X. The outputs of the buffer $43_8$ storing the signal for displaying a specified day/holiday of 31st are wired-ORed through the transfer gates enabled at the timing Z. When '1' is stored in the corresponding bit stage of the buffer $39_1$ or $43_8$, a '1' signal is produced at the terminal a1 at the timing X or Z and is applied to the driver 44 which in turn applies it as a drive signal to the terminal a1 of the display unit 4. FIG. 6B omits the illustration of the decimal point buffer and its wiring. Similarly, the output b1 is connected to the mask electrode 10c of the 31st, and segments S2 and S3, and those are energized at timings X and Y. In the combination circuit 40, transfer gates are arranged on the basis of the just-mentioned wiring. This is correspondingly applied to the remaining transfer gate wirings.

The operation of the calendar data display device thus constructed will be described by using the flow charts shown in FIGS. 7A to 7G. As well known, such flow charts are well suitable for explaining the operation of the circuit shown in FIGS. 4A and 4B. It will be understood for skilled persons in the art that, under control of ROM 29 storing microprograms of a number of instructions to execute the operations as shown in the flow charts, the instruction decoder 28 and the column address controller 31 and the like first operate, and then RAM 30, the arithmetic unit 34 and the judging portion 36 and the like operate.

Figures 7A, 7B, 7C:
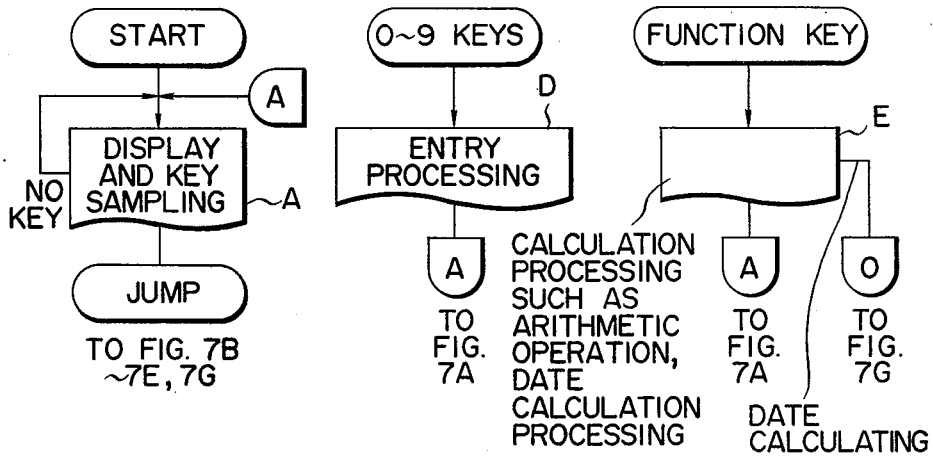
FIGS. 7A to 7G show flow charts useful in explaining the operation of the circuit shown in FIGS. 4A and 4B.

Upon turning on a power source, ROM 29 causes the calendar data display device (abbreviated simply as CDDD) to be in display and key sampling condition, as shown in a routine A in FIG. 7A. In this condition, CDDD always checks as to whether the key input is present or not. At this time, A reference frequency signal produced from the oscillator 21 is frequency-divided into a 1 (one) second signal by the frequency divider 23, which in turn is applied through the latch circuit 27 to ROMA 26. Then, ROMA 26 designates a new address of ROM 29 to execute a time count processing shown by a routine B in FIG. 7. In the course of the time count processing, the instruction decoder 28 produces reset signal to reset the latch circuit 27. In the time count processing, the present time data is read out from the time count register in RAM 30 and the arithmetic unit 34 adds 1 to the second data and loads again the result of the addition into RAM 30. For the arithmetic operation, an output signal outputted through the output line 29a of ROM 29 designates a row address to designate time count register in the time count relating register of RAM 30. At the same time, an output signal outputted from the output line 29c of ROM 29 designates a column address controller 31. Also at this time, the instruction decoder 28 delivers a read-out command R to RAM 30. As a result, the contents of the time count register, i.e. the time data specified by the row address, is read out from RAM 30 and the read-out one is applied to the arithmetic unit 34 by way of the selector 33. The read-out operation is performed at time t1 or t2. At the time that the second data is read out from RAM 30, the output line 29b of ROM 29 delivers a code signal of numeral '1' via the selector 33 to the arithmetic unit 34 where 'second data +1' operation is carried out. The result of the operation by the arithmetic unit 34 is subjected to a judging portion 36. When the second time reaches 60 seconds as a result of the '+1 operation', the judging portion 36 produces $J_L$ and $J_H$ to drive ROMA 26 which in turn designates the next address in ROM 29. A control command outputted at this time from ROM 29 causes the execution of a carry processing to minute data. Further, ALU 34 executes a carry processing to hour data stored in RAM 30 in accordance with the minute data at that time. The time data subjected to '+1 operation' in the ALU 34 is again sent to RAM 30 and loaded into the time count register in RAM 30 at a t3 timing signal delivered from the timing signal generator 22. At the time of data write-in, ROM 29 delivers to RAM 30 a row address designating the time count register and a column address to designate the column and at the same time the instruction decoder 28 delivers a write command W to RAM 30. When the time count processing in the routine B is performed, the output signals $J_H$ and $J_L$ of the judging portion 35 judge whether a date change signal is present or not and if no date change signal is produced, the CDDD operation returns to the routine A of the display and sampling shown in FIG. 7A. If the data change signal is produced, CDDD advances to routine C for year/month/date data count processing so that, in response to the control command from ROM 29, a change processing of year, month, day and day of the week is performed through the year, month and day storing register in the time count register of RAM 30. Following the completion of the time count processing, the CDDD operation returns to the routine A. The year, month and day register stores the date data in the form of the number of days counted from an imaginary reference date to be given later.

In the routine A of the display and key sampling in FIG. 7A, the calendar date, time, keyed-in data, the result of operation and the like are displayed in accordance with the display mode at that time while at the same time the presence or not of the key input signal is checked. If the key input is present, the operation jumps to a routine or step corresponding to the operated key. For example, when the ten key of '0 to 9' is depressed, the operation steps to a routine D in FIG. 7B where the entry processing in accordance with the key input and then returns to the routine A in FIG. 7A.

When the function key is depressed, the operation jumps to a routine E shown in FIG. 7C to perform an arithmetic calculation, date calculation or the like in accordance with the contents of the signal by the operated key, and then returns to the routine A in FIG. 7A. When the date calculation is performed in the routine E in FIG. 7C, the operation after its routine ends advances to a routine for processing a calendar and its related data to be given later.

Figures 7D, 7E, 7F:
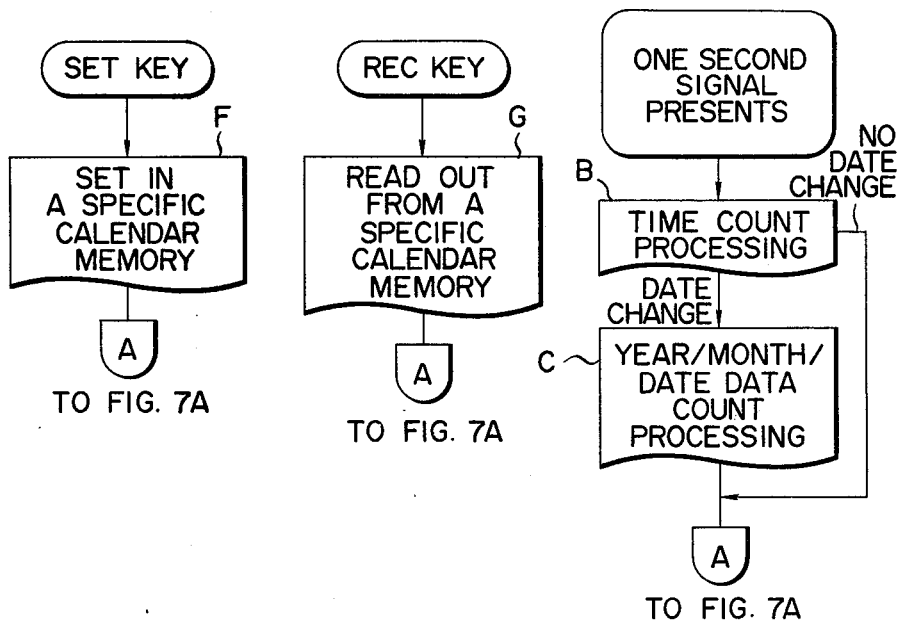

When the SET key 13 for setting a specific calendar is operated, the operation jumps to a routine F in FIG. 7D to load the specific calendar properly set into a specific calendar memory and then returns to the routine A in FIG. 7A.

When the REC key 14 is activated to display a specific calendar, the operation of CDDD jumps to a routine G in FIG. 7E to read out the memory contents from the specific calendar memory and returns to the routine A in FIG. 7A.

Figure 7G:
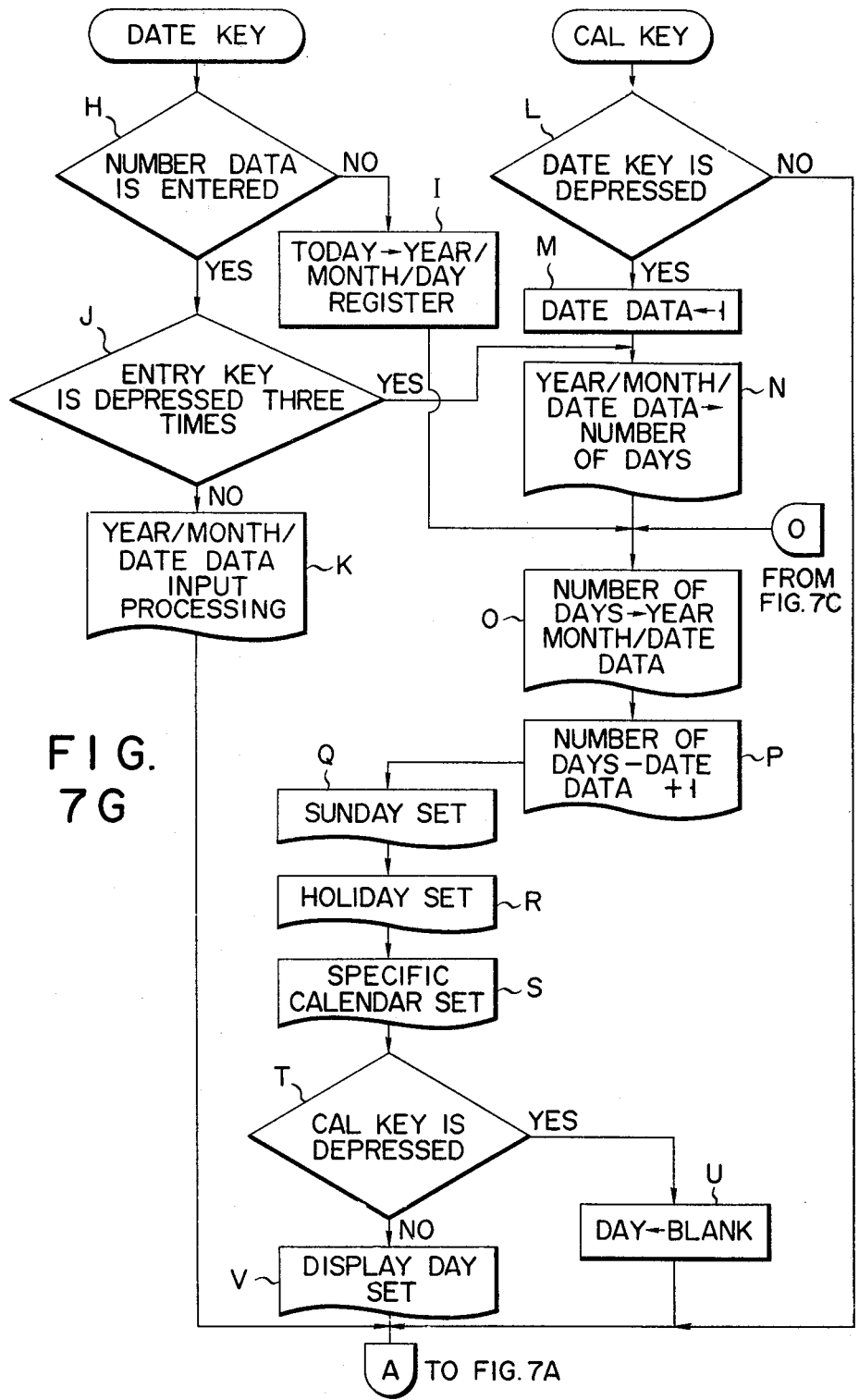

When the DATE key 12 is actuated to input date data, it jumps to a step H in FIG. 7G so that the judging portion 36 judges as to whether some data entered is registered or not in the operational register, under control of the ROM 29. If the operational register has not such data, it advances to a step I. This state that the operation advances to the step I corresponds to a state that only the DATE key 42 is operated so that it is set to the number of days date change stored in the year/month/day register in the time count register, in order to display the calendar of today. Following this, the CDDD operation proceeds to a calendar processing to be detailed later. When the judging portion 36 judges that the date entered is present in the step H, the operation proceeds to a step J to judge as to if the DATE key 12 is operated three times or not.

Like the judging operation in the step H, in the judging operation in the step J a row address outputted from ROM 29 and a column address delivered through the column address controlled from RAM 30 are applied to RAM 30, and the data read out from the specified address in RAM 30 is operated in the arithmetic unit 34. For example, the step J judges as to if the data counting the number of operations of the DATE key 12 is '3' or not and the data and carry resulting from the judging operation are detected by the judging portion 36. The detected one is applied to ROMA 26 to modify the next address in ROM 29. This judging operation is correspondingly applied to the remaining judging operations. In the step J, if the operation time of the DATE key 12 fails to reach three times, the operation advances to routine K to load the date data of year, month and day into the register X, and then returns to the routine A shown in FIG. 7A.

When the CAL key 11 is depressed to display the calendar display, the routine L in FIG. 7G judges as to whether the DATE key 12 is depressed or not. In the display of calendar, the year and month of a calendar to be displayed are designated by the ten keys and the DATE key 12. Therefore, if the DATE key 12 is not operated before the CAL key 11 is operated, the operation of the CAL key 11 is treated as no action and the operation returns to the routine A shown in FIG. 7A. If the DATE key 12 is operated before the CAL key 11, the operation proceeds to a step M to set '1' as date data in the X register in RAM 30. At this time, the X register X has stored the data designating the year and month of a calendar to be displayed by the first key operation. In other words, the CDDD according to the invention is so designed that the calendar may be displayed when only the data of year and month is inputted. Upon the completion of the step M, CDDD proceeds to the routine N to convert the date set in the X register into the number of date from the imaginary reference day to the specified day and set the converted one into the Y register. When it is judged that the DATE key 12 is depressed three times it also advances to the routine N. As the processing of the routine N is completed, it advances to a routine O to convert again the number of days set in the Y register into year, month and day. When the date computation is performed in the routine E, or the number of days from the imaginary reference day to today is set in the Y register in the step I, the operation advances to the routine O. The routines N and O are used to correct an impossible data that is inputted in the calculation of the number of days. For example, When February 29 is designated in a common year, the routines N and O correct it to March 1. After these operations are completed, CDDD (calendar data display device) advances its operation a routine P to subtract the date data from the number of days stored in the Y register and adds one day to the subtraction result, in order to obtain the number of days from the imaginary day to the 1st day in the month designated. Then, it advances to a routine Q to set Sundays. In other words, the number of days calculated by the routine F, i.e. the number of days calculated by an equation (2), is first divided by a numeral 7 and the remainder is corrected. In this manner, the Sundays are obtained. If it is Feb. 1, 1978, for example, numerals '0' to '6' are assigned to Sunday to Saturday and the above-mentioned calculation is performed so that '3' is obtained as the remainder corrected value. In this manner, it is calculated that February 1 is Wednesday. Further, '1' is set in a 32-bit A register for storing Sunday provided in RAM 30 every seven bits from the least significant bit, and the contents of the A register is shifted in accordance with the data of a day of the week previously calculated. When February 1 is Wednesday, as mentioned above, the contents of the A register is downwardly shifted by the number of bits corresponding to the numeral '3' respresenting Wednesday, or upwardly shifted by the number of bits corresponding to "7-3". In this case, the bits of the A register correspond to the specific day/holiday display elements $9_1$ to $9_{31}$, respectively, with reference to the lower bit. The '1' signal stored in the A register every 7 bits is shifted to the Z register to selectively drive the specific day/holiday display elements $9_1$ to $9_{31}$ thereby to indicate the position of Sunday.

Then, the operation proceeds to the holiday set routine R to set the holiday into the B register in RAM 30 and then to shift the set data to the Z register, with the result that the specific day/holiday display elements $9_1$ to $9_3$ are driven to display the holiday. The detail of the subroutine R will be described later. Then, the operation advances to a specific calendar set routine S to set the specific calendar. Upon the end of the specific calendar set routine processing, a step or routine T is executed to judge as to whether the CAL key 11 is depressed or not. If the CAL key 11 is depressed, only 'year and month' are displayed and therefore date data stored in the X register is blanked, as shown in the step U. Then, the operation returns to the routine A in FIG. 7A. When the CAL key 11 is not depressed, it proceeds to a routine V to set in the D register the calendar data of today or the day as a result of the date calculation, i.e. the positions of the specific day/holiday display elements $9_1$ to $9_{31}$, and returns to the routine A in FIG. 7A. As described above, the overall operation of the calendar data display device (CDDD) according to the invention is carried out through a series of routines or steps (A to V). Some characteristic routines used in CDDD according to the invention will be described in detail in relation to their displays.

Display of Holiday

Figure 8C:
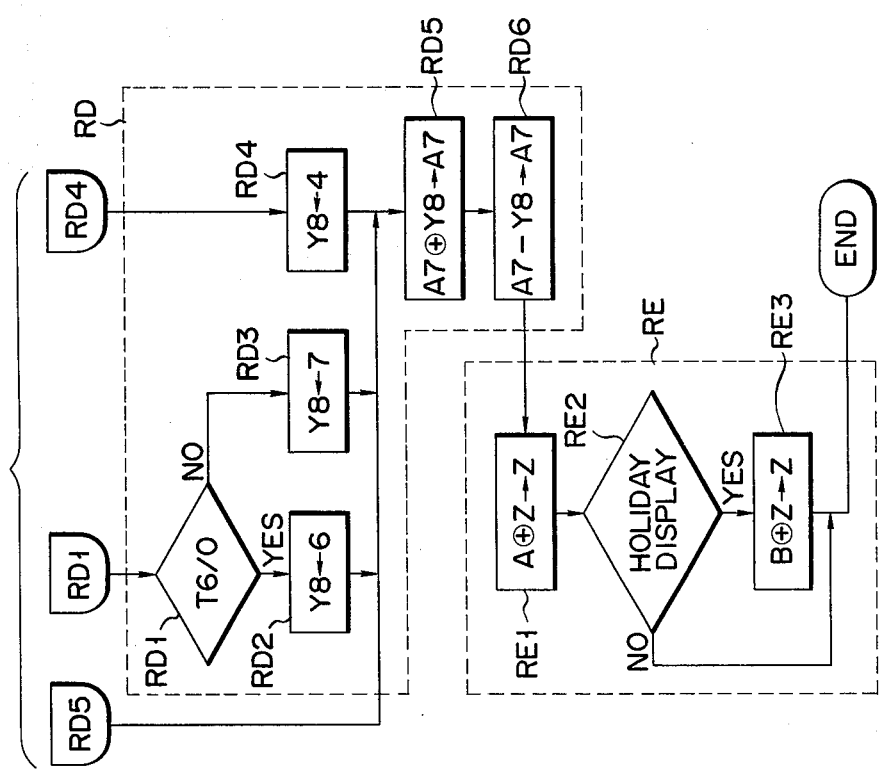
Figure 8A:
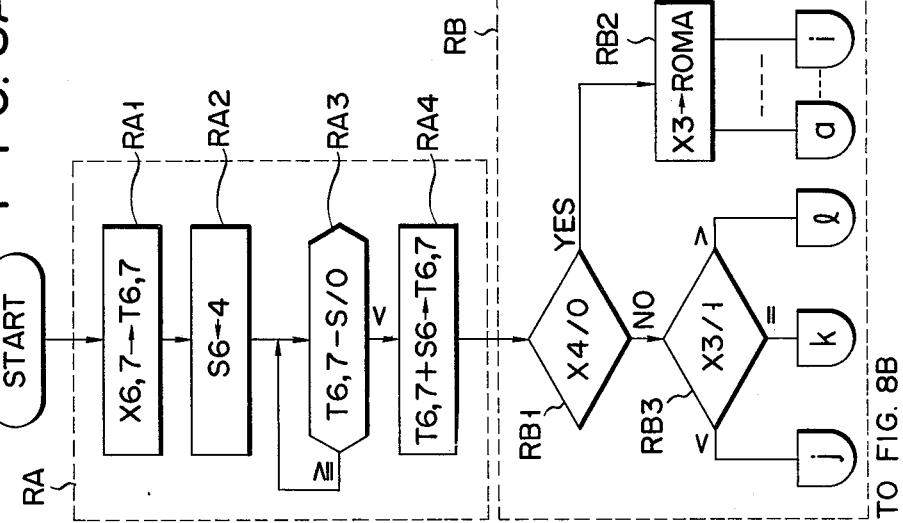

The routine R shown in FIG. 7G to set the holiday will be described in detail referring to FIGS. 8A to 8C. As shown in FIGS. 8A to 8C, the routine R has five sub-routines denoted as RA, RB, RC, RD and RE. Upon the initiation of the processing of the routine R, the sub-routine RA first executes a process to detect a leap year. Specifically, the first step RA1 loads the lower two digits of year data stored in the 6th and 7th digits X5, 7 of the X register into the 6th and 7th digits of the T register for temporary storage. Then a step RA2 loads a numeral '4' into the 6th digit S6 of the S register for temporary storage. The next step RA3 subtracts the numeral '4' set in the S register from the 6th and 7th digits T6, 7 of the T register. This subtraction continues so long as the result of the subtraction is positive. At the time that the subtraction result becomes negative (this is detected by the judging portion 36), the operation of CDDD advances to the next step RA4. The step RA4 adds the contents '4' of the S register to the digits T6, 7 of the T register of which the value became negative in the step RA4 to correct the negative value produced as a result of the subtraction operation in the step RA3. The contents of the T register calculated through the subroutine RA operation is used as data to judge a leap year, and is used in a subroutine to be described later.

Following the processing of the sub-routine RA, the operation proceeds to the next sub-routine RB to effect an address branch in accordance with month data. Firstly, a step RB 1 judges whether the contents of the 4th digit of the X register for storing year, month and day, that is, the upper digit X4 of the month data, is '0' or not. Specifically, when the upper digit of the month data is not '0', it judges the contents "October to December" and when it is '0', it judges them "January to September". When the upper data of month is '0' as judged in the step RB1, the next step RB2 is executed to transfer the contents of the 3rd digit X3 of the X register, i.e. the data of the lower digit of month, to the address portion 26 of ROM thereby to branch the addresses a to i for January to September. When the step RB1 judges the upper data of month not '0', the program operation advances to a step RB3 to compare the lower data of month stored in the 3rd digit X3 of the X register with a numerical value '3' thereby to make a judgement of the "October to December". For example, when the data of X3 is smaller than '1', it is October. Conversely, when the data is larger than '1', it is December. On the result of the judgement, those are branched to the addresses k and l, respectively.

In accordance with the addresses branched by the subroutine RB, the program execution enters the execution of the sub-routine RC for setting national holidays in a specified month shown in FIG. 8B. The national holidays set up in the present Japan are as shown in FIG. 15. In January, the New Year's Day for January 1 and the Adult's Day for January 15 are included. For setting the national holidays in January, '1' is first loaded into the $B_0$th digit (1st digit) of the B register for storing the national holiday, as shown in the step RC1, thereby to set the national holiday of the New Year's Day. Each digit of the B register or the remaining registers is comprised of 4 bits. Accordingly, when '1' (0001) is loaded into the least significant digit B0 of the B register, '1' is set in the least significant digit. The respective bits in the B register, when viewed from the lower to upper digits, correspond to the specific day/holiday display elements $9_1$ to $9_{31}$, respectively. When '1' is set in the least significant digit of the B register, data is transferred to the Z register so that the display element $9_1$ is driven for display. In the next step RC2, '4' (0100) is loaded into the B3 digit (4th digit) of the B register to set another national holiday of the Adult's Day. When '4' (0100) is loaded into the B3 digit, '1' is loaded into the 3rd bit of the digit, i.e. the 15th bit counted from the least significant bit of the B register. As a result, the specific day/holiday display element $9_{15}$ corresponding to the 15th day is driven for display.

In setting the national holiday of February, '4' (0100) is loaded into the B2 digit (3rd digit) of the B register in a step RC3, so that the National Foundation Day on February 11 is set.

The national holiday of the Vernal Equinox Day in March is unfixed. This is true for the Autumnal Equinox Day in September. As seen from FIG. 16, the Vernal Equinox Day is March 21 in the period from 1924 to 1959 but it is March 20 every four years, i.e. in the leap years from 1960 to now, 1978, but it is March 21 in the remaining years. Accordingly, on the assumption that this shift of the Vernal Equinox Day every four years will be continued in the future, a sub-routine RC4 is used for setting the national holiday in March. The sub-routine RC4 is so designed that the Vernal Equinox Day is March 20 in a leap year and is March 21 in a common year. Alternately, the Vernal Equinox Day may externally be set by an operator as required. This is true for the Autumnal Equinox Day.

In setting the national holiday in April, s step RC5 loads '1' (0001) into the B7 digit (the 8th digit) of the B register, i.e. in the 29th bit. In this manner, the Emperor's birthday on April 29 is set.

In setting the national holiday in May, as shown in a step RC6, '4' (0100) is loaded into the Bo digit (the 1st digit) of the B register to render the 3rd bit '1', thereby to set the Constitutional Memorial Day of May 3. Succeedingly, the program proceeds to a step RC7 where '1' (0001) into the B1 digit (the 2nd digit) of the B register to render the 5th bit '1' thereby to set the Children's Day of May 5.

June, July, August and December do not have national holidays so that no setting of the national holiday is performed.

September has the Respect-for-the-Aged Day on September 15 and the Autumnal Equinox Day. The Autumnal Equinox Day is unfixed as shown in FIG. 16. As seen from FIG. 16, the Autumnal Equinox Day is September 24 every four year from 1947 to 1978 but is September 23 in the remaining years. Accordingly, on the assumption that the shift of the Autumnal Equinox Day every four years will be continued in the future, a sub-routine RC8 is provided for processing the Autumnal Equinox Day. In the sub-routine RC8, the specified year (Year of Christ) is divided by '4' and the remainder of the division is used for judging as to whether the Autumnal Equinox Day is September 23 or September 24. Following the sub-routine RC8, the program advances to a step RC9 to load '5' (0100) into the B3 digit (4th digit) of the B register to render the 15th bit '1' thereby to set the Respect-for-the-Aged Day.

In setting the national holiday in October, a Step RC10 loads '2' (0010) into the B2 digit (the third digit) of the B register to render the 10th bit '1' thereby to set the Health Sport's Day of October 10.

In setting the national holidays in November, step RC11 loads '4' (0100) into the Bo digit (the 1st digit) to render the 3rd bit '1' thereby to set Culture Day of November 3. Following this, a step Rc12 is executed to load '4' (0100) into the B5 digit (the 6th digit) of the B register to render the 23rd bit '1' thereby to set Labor Thanksgiving Day.

As the sub-routine RC for setting the national holidays shown in FIG. 8B is completed, the program execution enters a sub-routine RD for adjusting the end of month, as shown in FIG. 8C. In this step, it is checked as to whether the contents of the 6th digit T6 of the T register obtained in the sub-routine RA shown in FIG. 8A is '0' or not, that is to say, whether that year is a leap year or a common year. If the contents of the T register is '0', that year is a leap year. The program step advances to a step RD2 to load '6' (01100) into the Y8 digit of the Y register for storing the number of days and a day or days to be erased. The first to third bits in the Y8 digit of the Y register are arranged corresponding to the mask electrodes 10a, 10b and 10c. As described above, when '6' (0110) is loaded into Y8 digits, the second bit and third bit are '1', with the result that the mask electrodes 10b and 10c are driven to mask the 30th and 31st days. The calendar displayed represents February of a leap year, that is, including 1st to 29th days. When the step RD1 judges the contents of the T register a common year, the program step proceeds to a step RD3 to load '7' (0111) into the Y8 digit of the Y register. '1' is set in the 1st to 3rd bits of the Y8 digit of the Y register so that the mask electrodes 10a to 10c are energized to mask the 29th, 30th and 31st days. Therefore, a calendar displayed is February of a common year including 1st to 28th days.

In the case of the months including 30 days, for example, April, June, September, and November, the program step advances from the sub-routine RC for setting the national holidays or the sub-routine RB to a step RD4 to set '4' (0100) into the Y8 digit of the Y register and to set '1' in the 3rd bit in that digit. As a result, the mask electrode 10c is driven to mask the 31st day to display a calendar of 30 days. Following the steps RD2, RD3, and RD4, a step RD5 is executed. When the steps RC2, RC4, RC7 and RC10 are completed in the sub-routine RC, and when the address branch for July, August and December is made in the sub-routine, the program step advances to the step RD5. The step RD5 adds the contents of A7 digit in the A register for storing Sunday to the contents of the Y8 digit of the Y register and the result of the addition is again loaded in the Y8 digit of the Y register. That is to say, the contents of the Y8 digit of the Y register is ORed to the A7 digit of the A register storing Sunday included in the days of 29th to 31st. In the ORing, a carry produced is omitted without raising it to the upper bit. The step RD5 executes, a preprocessing to erase the Sunday data for the 29th to 31st stored in the A7 digit of the A register, the Sunday data for the 31st day in the shorter month (the final day of the month is 30). In the next step, the contents of the Y8 digit of the Y register is subtracted from the A7 digit of the A register to erase the unnecessary Sunday data.

Following the setting of Sunday through the sub-routine RD incuding steps RD1 to RD6, the program advances to the sub-routine RE. In the sub-routine RE, a step RE1 ORs Sunday data stored in the A register to the contents of the Z register storing calendar information. Then, the program steps to a step RE2 to judge whether it is a display mode of the national holiday or not. The national holiday display mode is a set through a key operation. When the national holiday is not displayed, the processing flow for setting Sunday and national holidays ends at this point. When the national holiday is displayed, a step RE3 is executed to the national day data stored in the B register is ORed to the contents of the Z register having already stored Sunday data. As a result, the Sunday data and the national holiday data are set in the Z register. The specific day/holiday display elements $9_1$ to $9_{31}$ are driven in accordance with the set contents to display Sunday and the national holiday.

Figure 17:
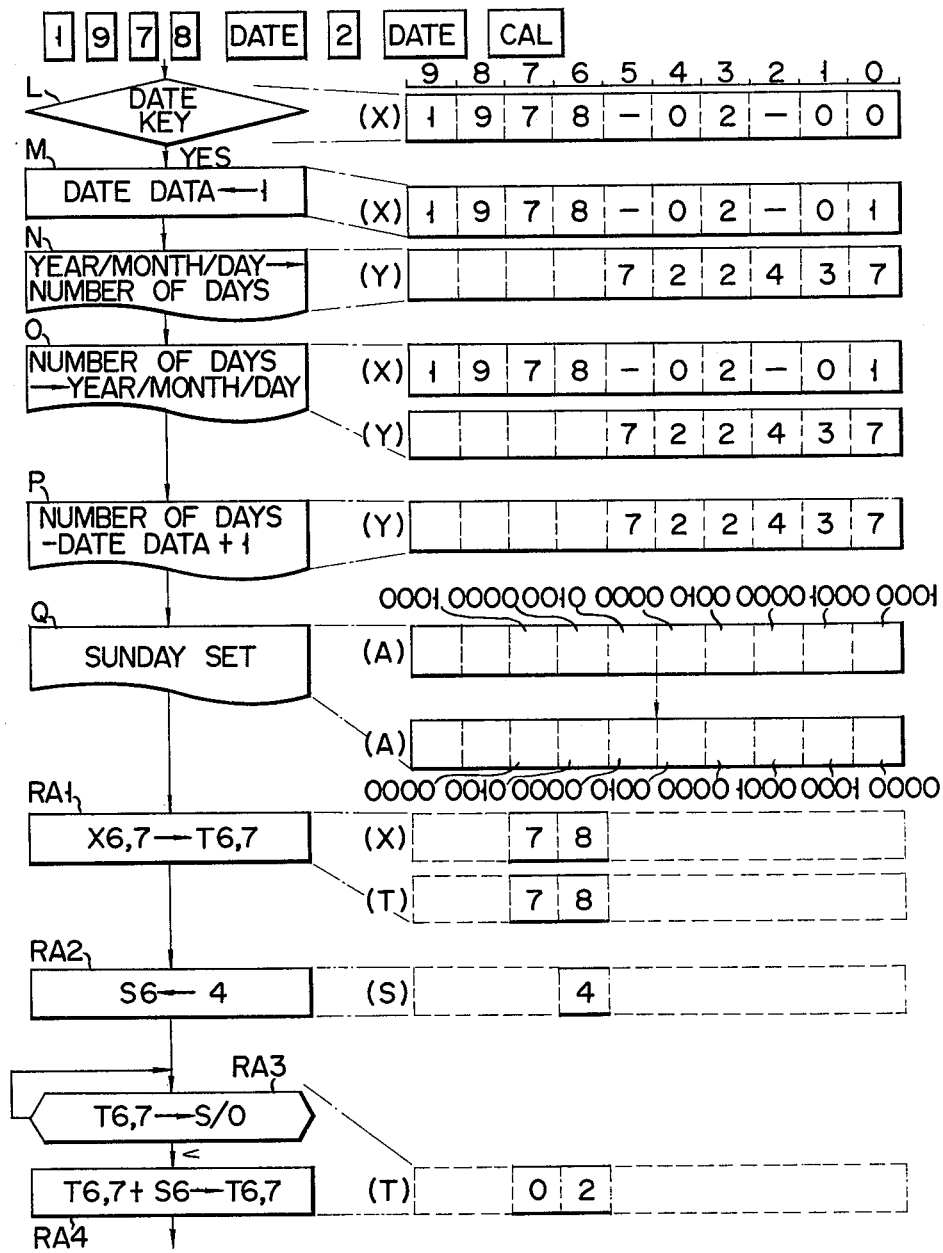
FIGS. 17 and 18 cooperatively show the processing routines or steps and the contents of the related registers when the national holidays and Sundays are both displayed.
Figure 18:
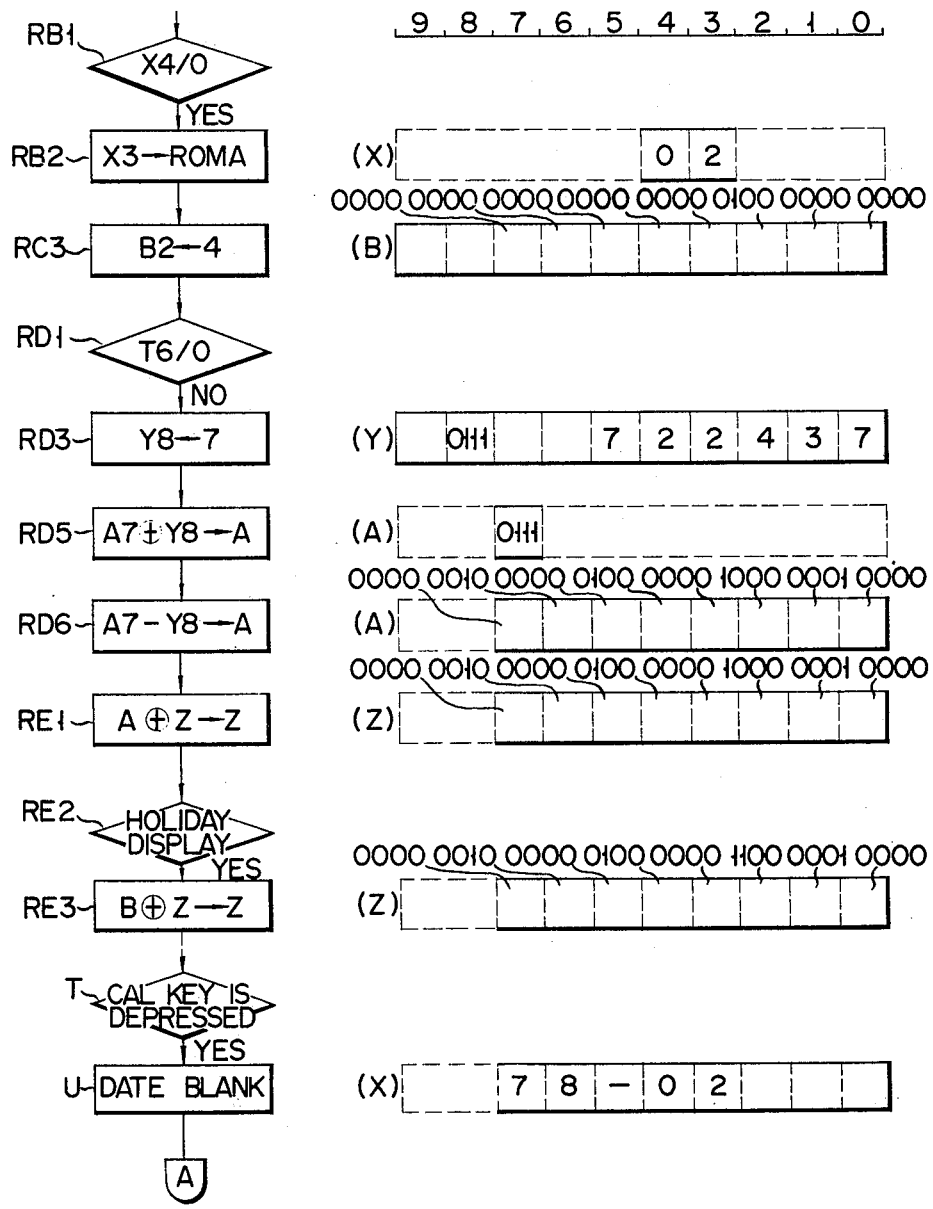

The detail operation to effect the calendar display will be described with reference to FIGS. 17 and 18. FIGS. 17 and 18 illustrate the contents of the respective registers when the steps or routines L to Q in FIG. 7G, the respective steps in FIGS. 8A to 8C and the steps T and U in FIG. 7G are executed. When a calendar of February in 1978 is displayed, for example, the keys 1, 9, 7, 8, DATE, 2, DATE, CAL are depressed in this order, as shown in FIG. 17. February 1978 is keyed in so that the date data "1978-02-00" is set in the X register. When the CAL key 11 is depressed, the step L shown in FIG. 7G is executed to jude whether DATE key 12 has been depressed or not. In this case, the DATE key 12 has been depressed so that the judgement of the step L is YES. Then, the program steps to the step M to set '1' into the digit storing "date" data of the X register, as shown in FIG. 17. The step M designates February 1 and steps to the step N to calculate the number of days "722437" from a reference data March 1, 0 to Feb. 1, 1978 and to set the number of days into the Y register, as shown in FIG. 17. In the routine N, the number of days X is calculated from the following equations:

When $b \geq 3$ $$X = [365.25 \times a]_{cut} + [30.6 \times (b-3)]_{5/4} + C \qquad (1)$$

When $b \leq 3$ $$X = [365.25 \times (a-1)]_{cut} + [30.6 \times (b+9)]_{5/4} + C \qquad (2)$$

where a=year, b=month and c=day. In the equations (1) and (2), the first term cuts away the fractions of the calculation result and the second term counts fractions of 0.5 and over as a unit, and cuts away the rest. After the number of days is calculated in the routine N, the program advances to the routine O. In the routine O, year, month and day are calculated from the number of days stored in the Y register in the inverse processing of the routine N and the result of the calculation Feb. 1, 1978 is set in the X register, as shown in FIG. 17. And the input of an impossible date or the like is corrected, as previously mentioned. In the next routine P, a specified day is subtracted from the number of days calculated in the routine N and further 1 is added to the result of the subtraction. That is to say, if the specific day is subtracted from the number of days obtained in the routine P, obtained is the number of days for the '0'th day of that month. Therefore, 1 is added to the result of the subtraction in order to obtain the number of days for the 1st day of that month. In the processing in this case, it is originally the 1st day. For this, no change of the contents is performed as shown in FIG. 17. Then, the program steps to the routine Q which in turn sets the Sundays in the specified month in the A register. The A register has "1's" previously set every seven bits successively from the lower bit. For this, the set data is shifted in accordance with the data of the day of the week. The day-of-the-week data of Feb. 1, 1978 is Wednesday '3'. Accordingly, the contents of the A register is shifted downwardly by three bits and is stored, as shown in FIG. 17.

Then, the program step advances to the routine R for setting the national holiday. In the routine R, a step RA1 first transfers the lower two-bit value '78' of year stored in the X register into the T6, 7 digits of the T register for temporary storage. Then the next step RA2 loads '4' into the S6 digit of the S register for temporary storage. Following this, a step RA3 continuously substracts the contents '4' of the S register from the contents '78' of the T register until the result of the subtraction becomes zero ('0') or less. As a result of the subtraction, the contents of the T register becomes '−2' to permit the program to step to the next step RA4. The step RA4 adds the contents '4' of the S register to the contents of the T register, with the result that the contents of the T register becomes '2'. The excessive subtraction in the step RA3 is corrected in a step RA4 so as to fall within '0 to 3'.

Upon the completion of those steps, a step RB1 is executed to judge as to whether the upper digit of the X register is '0' or not. In the case of February, the upper digit is '0' so that the judgement of the step RB1 is YES.

Then, a step RB2 transfers the contents '2' of month to ROMA 26 to jump it to the address designating February. Specifically, in the case of February, a step RC3 is executed to load '4' (0100) into the B2 digit (the 3rd digit) of the B register to set '1' in the 11th bit. In this manner, the National Foundation Day on February 11 is set. Then, a step RD1 is executed to judge whether the contents of the T6 digit of the T register obtained in the step RA4 is '0' or not, that is to say, whether it is a leap year or not. In this case, the contents of the T6 digit is '2' and not a leap year and therefore the calendar data display device (CDDD) of the invention executes a step RD3 of the program to load '7' (0111) to the Y8 digit of the Y register so as to blank the 29th to 31st day. Then, a step RD5 ORs the contents '0' (0000) of the A7 digit of the A register and the contents '7' (0111) of the Y8 digit of the Y register and loads the result of the ORing '7' (0111) into the A7 digit of the A register. After this, a step RD6 subtracts the contents '7' (0111) in the digit Y8 of the Y register from the contents '7' (0111) in the A7 digit of the A register, and loads again the result of the subtraction '0' (0000) into the A7 digit of the A register. Then, a step RE1 ORs Sunday data stored in the A register to the contents of the Z register. The next step RE2 judges whether the national holiday display mode is present or not. If the national holiday display mode is present, a step RE3 ORs the national holiday data stored in the B register to the contents of the Z register. In this way, the national holiday setting routine R is completed.

Upon the end of the national holiday setting routine R, another calendar set routine S (omitted) is executed and a step T is executed to judge whether the CAL key 11 is depressed or not. In this case, since the CAL key 11 is operated, a step U is executed to blank day to render the contents of the X register "78-02". Finally, the program returns to the routine A shown in FIG. 7A. The routine A displays "78-02" representing February in 78 by the data display section and displays Sundays and the national holidays in February 78 by the calendar display section 6. Further, the mask electrodes 10a to 10c mask the 29th to 31st days.

While the embodiment thus far described relates to only the national holidays in Japan, the manner of the above-mentioned embodiment is similarly applied for the setting of the national holidays commonly effective in all the states in U.S.A. shown in FIG. 37, the national holidays in England shown in FIG. 38, and the national holidays in the remaining countries.

As described above, the calender data display device according to the invention can easily display the calendar of a month together with Sundays and the national holidays. Therefore, CDDD is very effective when it is used to make a plan of meeting or travel.

Display when a National Holiday coincides with Sunday

When a national holiday coincides with Sunday, CDDD displays the next day as a holiday. This is realized by merely changing the routine RE of those RA to RE shown in FIGS. 8A to 8C into an $RE_x$ routine shown in FIG. 9. The subroutine $RE_x$ is also realized by placing a step RE4 between the steps RE2 and RE3 of the sub-routine including steps RE1 to RE3 shown in FIG. 8C.

The sub-routine RE shown in FIG. 9 will be described. Following the sub-routine RD shown in FIG.

Figure 9:
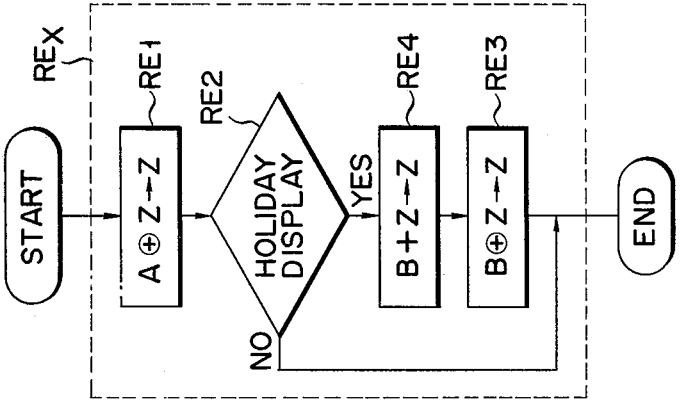
FIG. 9 shows a flow chart which is a modification of a subroutine RE shown in FIG. 8G.

8C, the processing of the sub-routine shown in FIG. 9 starts. Firstly, a step RE1 ORs Sunday data stored in the A register to the contents of the Z register for storing calendar data. At the next step, a step RE2 is effective to judge whether the national holiday display mode is present or not. The national holiday display mode is set by the key operation. When the national holiday is not displayed, the subroutine of the setting of Sunday and the national holiday is terminated at that time. When it is displayed, a step RE4 is performed to add the contents of the B and Z registers and loads the result of the addition into the Z register. When the step RE4 is executed, the Z register has already stored Sunday and the B register has also stored a national holiday. Accordingly, if those are added, when the national holiday does not coincide with Sunday, '1' is present in the respective bits. When the former coincides with the latter, a carry occurs to load '1' into the bit position higher than by one bit (next day). Then, the program advances to the step RE3 like that shown in FIG. 8C to OR the contents of the B and Z registers. In the step RE3, the bit of the Z register which has been blanked by shifting the carry to the upper bit in the routine RE4 is ORed to the national holiday set in the B register thereby to set '1' in the blanked bit. Through the execution of the steps RE4 and RE3, Sunday data and national holiday data are set in the Z register. When Sunday coincides with a national holiday, holiday data is set in the position of the next day. In accordance with the set contents of the Z register, the specific day/holiday display elements $9_1$ to $9_{31}$ are driven to display the holiday display of Sunday and the national holiday but to display the next day, i.e. Monday, when Sunday coincides with the national holiday.

Figure 20:
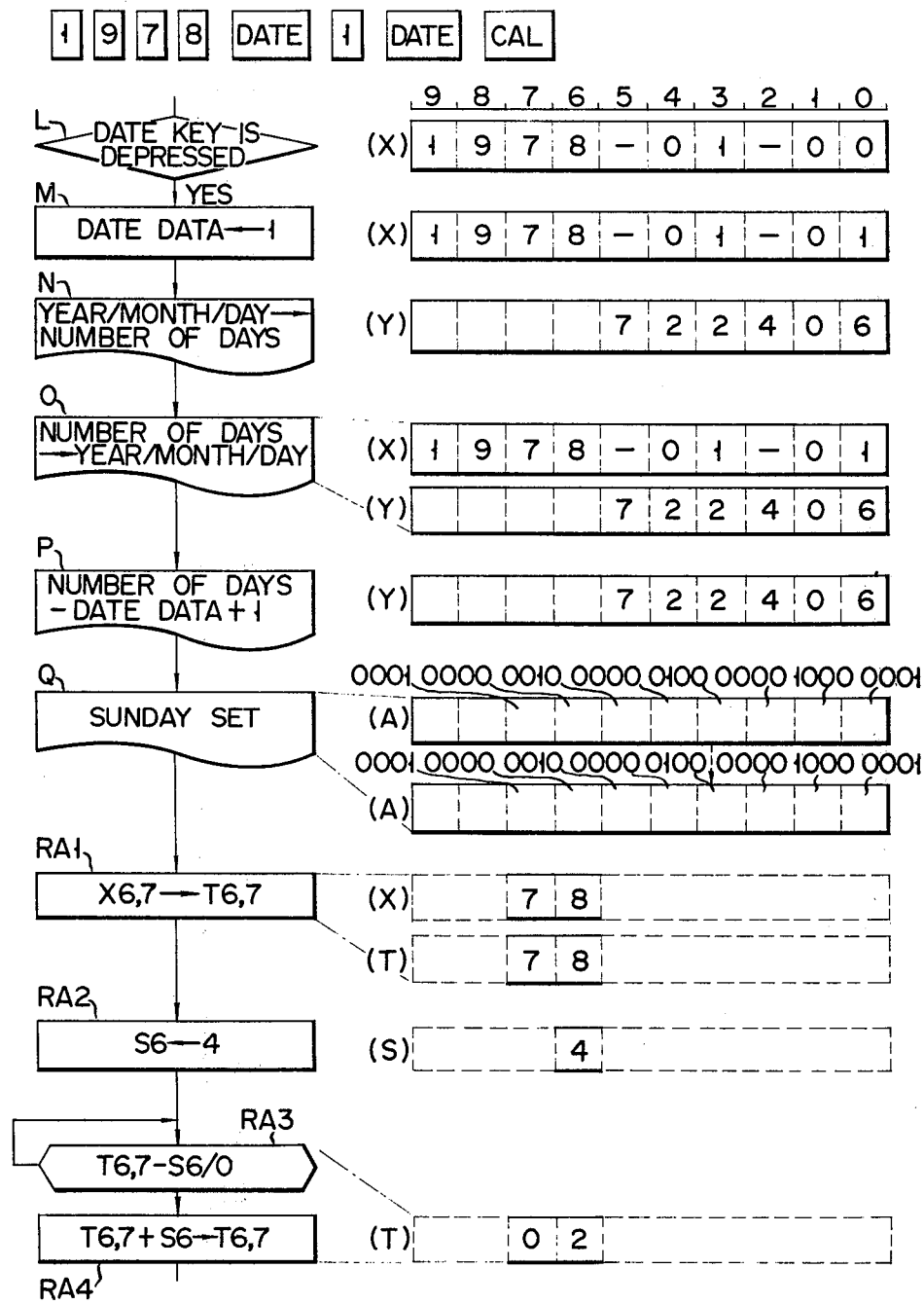
Figure 22:
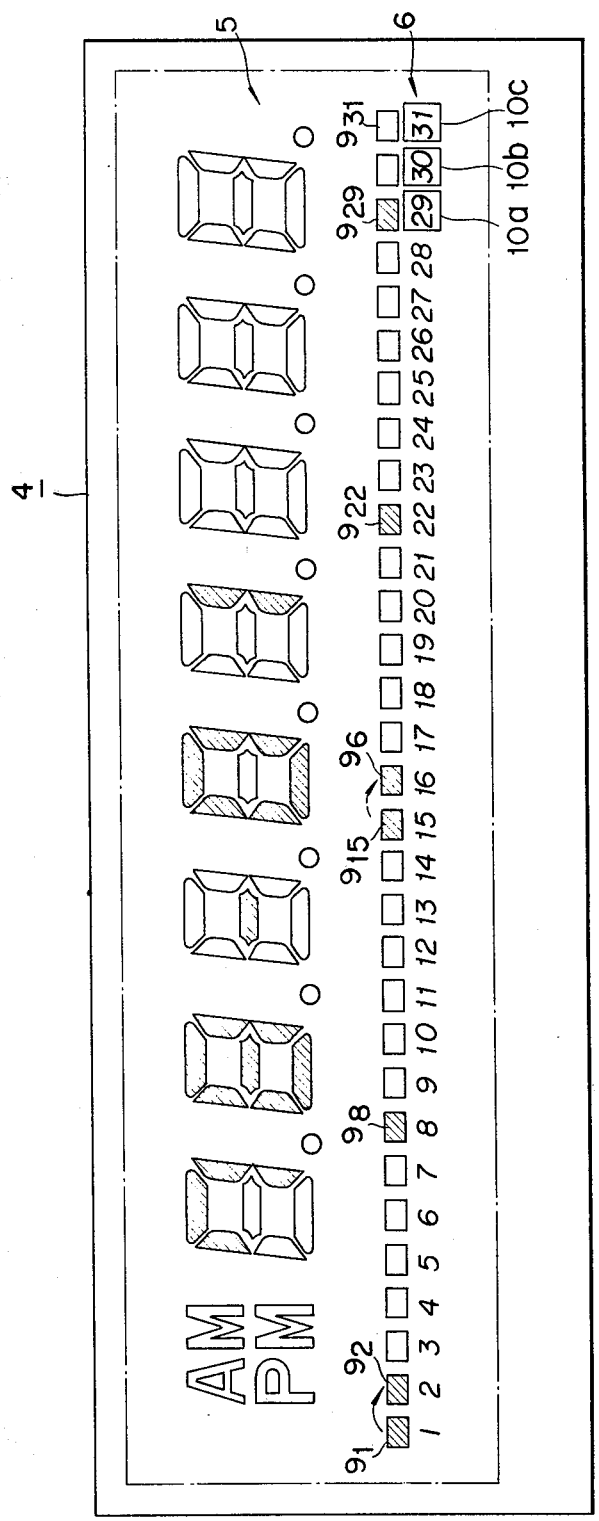
FIG. 22 shows a display state when a series of processings shown in FIGS. 20 and 21 are executed.

The operation in such a case will be described in detail with reference to FIGS. 20 and 21. FIGS. 20 and 21 show the contents of the respective registers in processing the step and routines L to Q shown in FIG. 7, the sub-routines RA to RD shown in FIGS. 8A to 8C, the sub-routine RE shown in FIG. 9, and the steps T and U shown in FIG. 7G. In order to display the calendar of January in 1978, the keys 1, 9, 7, 8, DATE, 1, and CAL are depressed in this order, as shown in FIG. 20. Upon the keying in, "1978-01-00" is set in the X register. Under this condition, when the CAL key 11 is depressed, the program advances to the step L shown in FIG. 7G to judge whether the DATE key 12 has been depressed or not. In this case, the DATE key 12 is depressed so that the judgement of the step L is YES as shown in FIG. 20 and the program advances to the routine M to set '1' to the date memory digit of the X register. Specifically, the routine M specifies January 1 and it shifts to the routine N to calculate the number of days "7224P6" from March 1, 0 to Jan. 1, 1978 to load it in the Y register as shown in FIG. 20. The routine N is used to calculate the number of days X by using the equations (1) and (2).

After the routine N calculates the number of days, program steps to the routine O calculates year, month, day in the inverse processing of the routine N and steps the result of the calculation Jan. 1, 1978 into the X register, as shown in FIG. 20 to correct an impossible day and the like, as previously stated. Then, the routine P is executed to subtract a specified day from the number of days calculated in the routine N, and to add 1 to the result of the subtraction to obtain the number of days. In other words, when the specified day is subtracted from the number of days obtained in the routine P, the number of days at the '0'th day of that month is obtained. For this reason, '1' is added to the subtraction result to obtain the number of days at the '1' day of that month. In the processing in this case, it is originally the '1' day and therefore the contents are not changed. After this, the routine Q is performed to set Sundays of the specified month in the A register. As previously mentioned, the A register has "1's" previously set every seven bits successively from the lower bit. For this, the set data is shifted in accordance with the date of the day of the week. The day-of-the-week data of Jan. 1, 1978 is Sunday '0'. Accordingly, the contents of the A register is held as it is, as shown in FIG. 20. After the sub-routine RD is completed, the program proceeds to the routine R for setting the national holiday. The routine R first transfers the lower two digits "78" of the year stored in the X register by the routine RA1 to the T6, 7 digits of the T register for temporary storage. Then a step RA2 loads '4' into the S6 digit of the S register for temporary storage. In a step RA3, the contents '4' of the S register is continuously subtracted from the contents '78' of the T register until the result of the subtraction becomes '0' or less. As a result of the subtraction, the contents of the T register becomes '−2' and the program steps to a step RA4. In the step RA4, the contents '4' of the S register is added to the contents of the T register, so that the contents of the T register becomes '2'. The excessive subtraction in the step RA3 is corrected in the step RA4 so that the result of the correction falls within "0 to 3".

As shown in FIG. 21, the program steps to a step RB1 to judge whether the upper digit of the month stored in the X4 digit of the X register is '0' or not. In the case of January, the upper digit is '0' so that the result of the judgement in the step RB1 is YES. The next step RB2 is then performed transfer the contents '1' of the lower digit X3 of month to the ROMA 26 and jumps to the processing flow to designate January. In the case of January, the program steps to a step RC1 to load '1' (0001) into the Bo digit (first digit) of the B register to set '1' in the first bit. As a result, the national holiday of the New Year's Day is set. Following this, the next step RC2 is performed to load '4' (01000) in the B3 digit (fourth digit) of the B register to set '1' (0100) in the 15th bit. As a result, the national holiday of the Adult's Day is set.

After those processings are completed, the next step RD5 is executed to OR the contents '1' (0001) of the A7 digit of the A register and the contents '0' (0000) of the Y8 digit of the Y register and loads the result of the ORing '1' (0001) into the A7 digit of the A register. In the next step RD6, the contents '0' (0001) of the Y8 digit of the Y register is subtracted from the contents '1' (0001) of the A7 digit of the A register and the result of the subtraction "1" (0001) is loaded into the digit A7 of the A register. Those steps RD5 and RD6 are used to erase the Sunday data corresponding to the day to be erased at the end of the month such as the shorter months or February. In this example, the month is January so that the contents of the A register is not changed. Then, the program advances to the sub-routine REx shown in FIG. 9. In the sub-routine REx, a step $RE_1$ is first executed to OR the Sunday data stored in the A register to the contents of the Z register. Then a step RE2 is executed to judge whether the national holiday display mode is present or not. If the national holiday mode is present, a step RE4 is executed to add the national holiday data stored in the B register to the Sunday data stored in the Z register and to load the result of the addition to the Z register. In the step RE4, when the national holiday does not coincide with Sunday, '1' is loaded into the respective bit positions in the Z register. When those coincide with each other a carry occurs to load '1' into the upper digit (the next day) by one bit. For example, in the case of January 1978, the New Year's Day and the Adult's Day on January 15 coincide with Sunday. Accordingly, the 1st bit and 15th bit in the Z register are blanked as shown in FIG. 21 so that '1' is loaded into the 2nd bit and 16th bit which are higher by one bit than the blanked bits. Then, in the next step RE3, the contents of the B register and Z register are ORed. Also in this step, '1' is set in the blanked 1st bit and 15th bit in the Z register by ORing the national holiday data in the B register to the contents of the Z register. In this manner, the Sunday data and the national holiday data are set in the Z register. When Sunday coincides with a national holiday, the national holiday data is set in the position of the next day.

As the national holiday setting sub-routine R ends, a routine S not shown for setting an extra calendar is performed and then a step T is performed to execute if the CAL key 11 is operated or not. In this case, since the CAL key 11 is operated as shown in FIG. 21 so that the step U is performed to blank the date to render the contents of the X register "78-01" and then program returns to the routine A shown in FIG. 7A. The routine A displays "78-01" representing January 78 by the data display section 5 and displays Sundays and the national holidays in January 78 by the calendar display section 6. In the case of January, 1978, the New Year's day and the Adult's Day coincide with Sunday, as previously mentioned, so that the specific day/holiday display elements $9_1$, $9_{15}$, $9_{22}$ and $9_{20}$ and the specific day/holiday display elements $9_2$ and $9_{16}$ are energized. Consequently, the second day and the 16th day, which are Monday, are displayed as holidays.

As described above, the embodiment of the calendar data display device according to the invention enables the electronic device with the CDDD to display as holidays Sundays and the national holidays other than Sundays and, when Sunday coincides with a national holiday, it enables the device to display as a holiday the next day of the national holiday coinciding with Sunday. Accordingly, CDDD can display a calendar like a real calendar. Therefore, the invention considerably enhances the scheduling meeting or travel.

Specific Calendar Display

In addition to the display functions mentioned above, CDDD enables the electronic device to store an optional type of calendar which is desired by an operator and to display it energizing specific day/holiday display elements. A specific calendar specially prepared by a company or an office so as to be suitable for the so-called "five-day work week" working system or another specific calendar prepared so as to comply with business field which cannot take Sundays or the remaining holidays off, may easily be prepared.

The specific calendar is set by executing the routine F shown in FIG. 7D and the read-out of the specific calendar set is designated by the routine G shown in FIG. 7E and the calendar is displayed by the routine S in FIG. 7G.

Figure 10B:
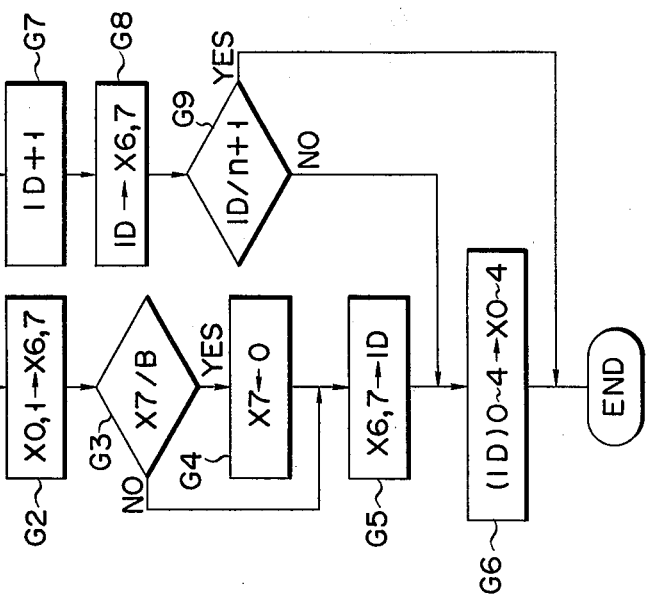
FIGS. 10A and 10B show flow charts of routines F and G shown in FIG. 7E.
Figure 10A:
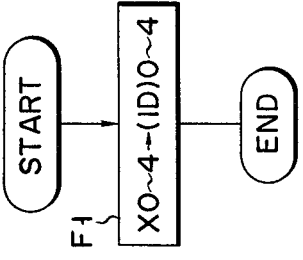

The details of the routines F and G will be given referring to FIGS. 10A and 10B. When an extra calendar is set, number data, REC, Extra Calendar and SET keys are operated in this order. The number data key designates the memory number of the specific calendar. Then, the REC key 14 is operated and designates an extra calendar memory corresponding to the numerical value (memory number) keyed in. The specific calendar input is a number key for designating month and day. The following SET key 13 operation permits month and day data to be written into the specific calendar memory specified by the REC key 14 operation. Following the REC key 14 operation, the routine G for reading out the specific calendar from the memory, as shown in FIG. 7E is performed. The routine G is illustrated in detail in FIG. 10B. In the first step G1, judgement is made as to whether the number data is entered or not before the REC key 14 is operated. When the number data is entered, the number data is held in Xo, 1 digits (the first to second digits) in the X register so that the second step G2 carries the contents of the Xo, 1 digits to the X6, 7 digits. Then, the third step G3 judges whether a blanking code is stored in the X7 digit or not. When the number data is not keyed in, the X7 digit has the blanking code so that the judgement as to if the data number is one digit or not is made upon the presence or not of the blanking code. In case where the blanking code is placed in the X7 digit of the X register, the fourth step G4 changes the contents of the X7 digit into "0" and shifts to the fifth step G5. When the step G4 judges that no blanking code is placed in the X7 digit, the routine step immediately advances to the step G5. The step G5 transfers the contents of the digits X6, 7 to the indirect address register ID which is provided within the arithmetic register of RAM 30. The sixth step G6 transfers the contents of the indirect address register to the IND buffer 35. Upon the contents of the ID, the contents of the specific calendar memory addressed is transferred to the X register. Then, the program returns to the routine A shown in FIG. 7A to display the contents of the X register by the data display section 5. When the step G1 judges that the numeral data is not inputted before the REC key 14 is operated, the subroutine execution proceeds to a step G7 to add 1 to the contents of the indirect address register ID to continue the access operation to the specific calendar. Following this, a step G8 is performed to transfer the contents of the ID to the X6, 7 digit of the X register, to allow the memory number of the specific calendar to be displayed. The routine execution further proceeds to a step G9 to judge whether the contents of the ID, which was subjected to '+1' operation in the step G7, exceeds the last memory number or not. If it exceeds the last memory number, the CDDD operation returns to the routine A shown in FIG. 7A to display the memory number specified at that time by the data display section 5. When the step G9 judges that the contents of the ID fails to reach the last memory number, the routine execution proceeds to the step G5 to transfer the contents of the specific calendar memory specified on the basis of the contents of ID, as mentioned above, to the X register, and the CDDD operation then returns to the routine A shown in FIG. 7A. The routine A displays the contents of the specific calendar memory transferred to the X register. Accordingly, in case that only the REC key 14 is operated without entering the numerical data, the contents of the ID is counted up one by one every time the REC key 14 is operated so that the specific calendar memories are specified in the order of the memory number and the contents of the memories are displayed sequentially.

Under a condition that the contents of the specific calendar memories specified as mentioned above, if the month and day data are inputted and the SET key 13 is operated, the CDDD operation shifts to the specific calendar memory set routine in FIG. 7D. A step F1 in the routine F transfers the date of the specific calendar stored in the X register into the specific calendar memory specified by the ID at that time. Then, the operation returns to the routine A shown in FIG. 7A. In this way, a date is optionally set in the specific calendar memory.

The specific calendar set routine S shown in FIG. 7G will be described in detail with reference to FIG. 11. In the specified calendar set routine S, a step S1 initially sets '1' in ID and then a step S2 reads out data from the specific calendar memory specified by the contents of ID and loads the read-out one into the S register for temporary storage. Then, the operation proceeds to a step S3 to judge whether the contents in the S3, 4 (the third and fourth digits) digits of the X register coincide with the contents in the X3, 4 digits of the X register. In other words, it is judged whether the data read out from the specific calendar memory corresponds to the data of the month held in the X register, i.e. the 'month' to be displayed. When the data corresponds to the different month, the routine operation steps to a step S4 to add 1 to the contents of ID. Then, a step S5 judges whether the contents of ID reaches "n+1" or not, that is to say, whether all the specific calendar memories are read out or not. If such a read-out is completed, a step S6 is executed. On the other hand, if it is not completed, the routine program returns to the step S2 to write the contents of ID into the S register. Through the repetition of the steps S1 to S5, the contents of the specific calendar memories are read out in the order of the memory number and the step S3 judges whether the read out data is the data of the 'month' to be displayed. If the judgement is YES, the routine advances to a step S7 to clear the T register for temporary storage. Then, a step S8 is executed to subtract the number of bits in one digit, that is to say, '4' from the date data stored in the S0, 1 digits (the first to second digits) of the S register and judges whether the result of the subtraction is larger than '0' or not. If it is larger than '0', the routine execution proceeds to a step S9 to add '1' to the To digit (the first digit) to the T register, and returns to the step S8. The steps S8 and S9 executions are continued until the subtraction result of the step S8 becomes '0' or less. When the subtraction result becomes '0' or less, the operation proceeds to a step S10. The execution of the steps S8 and S9 provides data showing the digit of the D register in which the date data is loaded. In the step S10, '4' is added to the S register to correct the '0' or a negative value obtained in the step S8. The next step to be executed is a step S11 which compares the contents of the So digit of the S register with the numeral '3'. As a result of the comparing, the contents of the So digit is larger than '3', step S12 is executed to load '8' (1000) into the digit So. When the contents of the So digit is '3', a step S13 is performed to load '4' (0100) into the So digit. When the contents of the So digit of the S register is smaller than '3', and when the steps S12 and S13 are executed, the operation advances to a step S14. The processing of the steps S11 to S13 provides the bit location of the date to be displayed. When the contents of the So digit of the S register, which was corrected in the step S10, is '1', '1' is set in the first bit of the digit specified by the To digit of the T register. When the contents of the So digit is '2', '1' is set in the second bit of the specified digit. Accordingly, when the contents of the So digit is "1" or '2', there is no need for changing the contents of the So digit so that the '4' (0100) is loaded into the So digit of the step S13. When the contents of the So digit is '4', '1' must be set into the fourth bit of the specified digit so that the step S12 sets '8' (1000) into the So digit. Then, the routine execution advances to a step S14. The step S14 transfers the contents of the To digit of the T register obtained in the step S9 to ROMA 25, thereby to branch the address of ROM 29. When the contents of the To digit is '0', the address branch is made to a step S15 and the contents of the So digit of the S register is ORed to the contents of the Co digit of the C register. When the contents of the To digit is '1', the address is branched to a step S16 and the contents of the So digit is ORed to the contents of the C1 digit of the C register. Similarly, the address is branched to steps S15 to S22 in accordance with contents of the To digit and the contents of the So digit is ORed to the corresponding digit of the C register, so that '1' is set to a given bit position at the respective digits of the C register. When the processings of the steps S15 to S22 are completed, the subroutine execution returns to the step S4 and '1' is added to the contents of ID. Then, the step S5 judges whether all the specific calendar memories are read out or not. When the read-out operation from all the memories is not completed, the just-mentioned operation will be repeated. When the read-out operation of all the specific calendar is completed, the step S6 is performed to OR the specific calendar data stored in the C register to the contents of the Z register for storing the calendar display data, to end the specific calendar set routine S.

Figure 23:
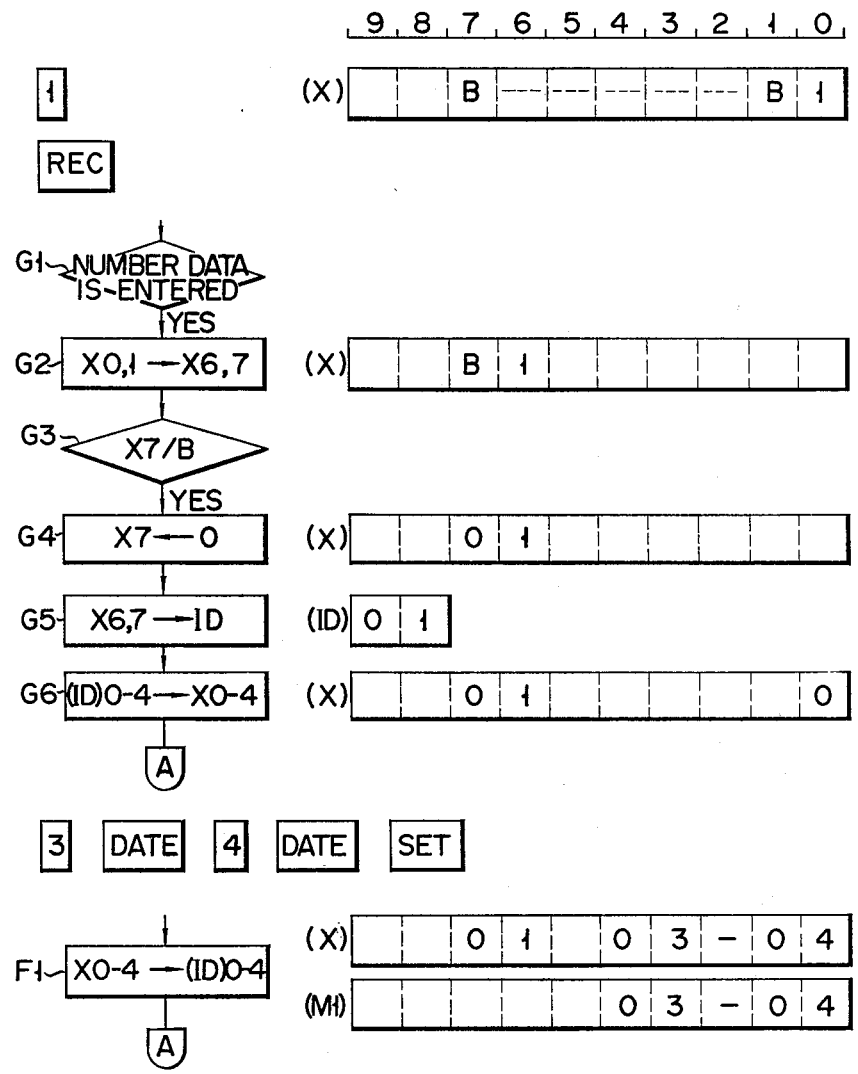

FIGS. 23 and 24 will be referred to for explaining in detail the routine for setting a specific calendar in which the Saturdays of March in 1978 are treated as holidays. FIGS. 23 and 24 comparatively illustrate the processings in such a case and the contents of the corresponding registers. When the specific calendar is set, 1 and REC keys are operated to read out the first specific calendar memory, as shown in FIG. 23. Upon the operation of the REC key 14, program execution jumps to the routine G for reading out from the specific calendar memory shown in FIG. 7E. A first step G1 of the routine G judges whether the numeral data is entered or not. In this case, since the numeral data is entered, a second step G2 is performed so that the contents of the Xo, 1 of the X register is carried to the X6, 7 digits. The numeral data is held in the Xo, 1 digits of the X register. When the entry input is '1', '1' is loaded into the Xo digit and a blanking code B is loaded into the remaining digits. Accordingly, when the X register is carried in the step G2, '1' is loaded into the X5 digit and the blanking code B is loaded into the X7 digit. Accordingly, it is judged that the blanking code B is loaded into the X7 digit. As a result, a fourth step G4 is executed '0' is loaded into the step G4. Then, in the fifth step G5, the contents '01' of the digits X6, 7 are transferred to ID. In the sixth step G6, the contents '01' of ID is transferred to the IND buffer 35. Upon the contents of the buffer 35, the contents of a specific calendar memory, e.g. '0' is read out and is loaded into the Xo to X4 digits of the X register. At this time, the number for designating the specific calendar memory is left in the digits X6, 7 digits of the X register. Accordingly, when the program execution returns to the routine A shown in FIG. 7A, the data display section 5 displays the designation number of the specific calendar and the memory contents.

Under this condition, the date data of the Saturday of March is inputted. For example, in the case of March 4, 3, DATE, 4, DATE, SET keys are operated, as shown in FIG. 23. The date data is loaded as '03-04' to the digits $X_o$ to $X_4$ of the X register, as shown in FIG. 23. Upon the operation of the SET key 13, the program advances its execution to the routine F for setting the specific calendar memory, as shown in FIG. 7D. In the routine F, the first step F1 loads the contents of the $X_o$ to $X_4$ digits of the X register into the first specific calendar memory M1 designated by the contents '01' of the ID.

As shown in FIG. 24, only the REC key 14 is operated without entering the number data to designate the next specific calendar memory. When only the REC key 14 is operated, a step G1 judges that no number data is entered, and a step G7 is executed. The step G7 adds 1 to the ID and the contents of ID becomes '2'. A step G8 transfers the contents of ID to the $X_6, 7$ digits of the X register. A step G9 judges whether the contents of ID exceeds the last memory number or not. In this case, the judgement is NO so that the step G6 is executed to transfer the contents of the second specific calendar memory specified by the contents of ID to the X register. Under this condition, the date data "March 11" of Saturday is keyed in to set the memory number '02' and the date data '03-11' in the X register. Further, the step F1 the date data '03-11' into the second specific calendar memory M2, as described above. Similarly, the date data "March 18" or Saturday is loaded into the third specific calendar memory; the date data "March 25" of Saturday to the fourth specific calendar memory.

Figure 25:
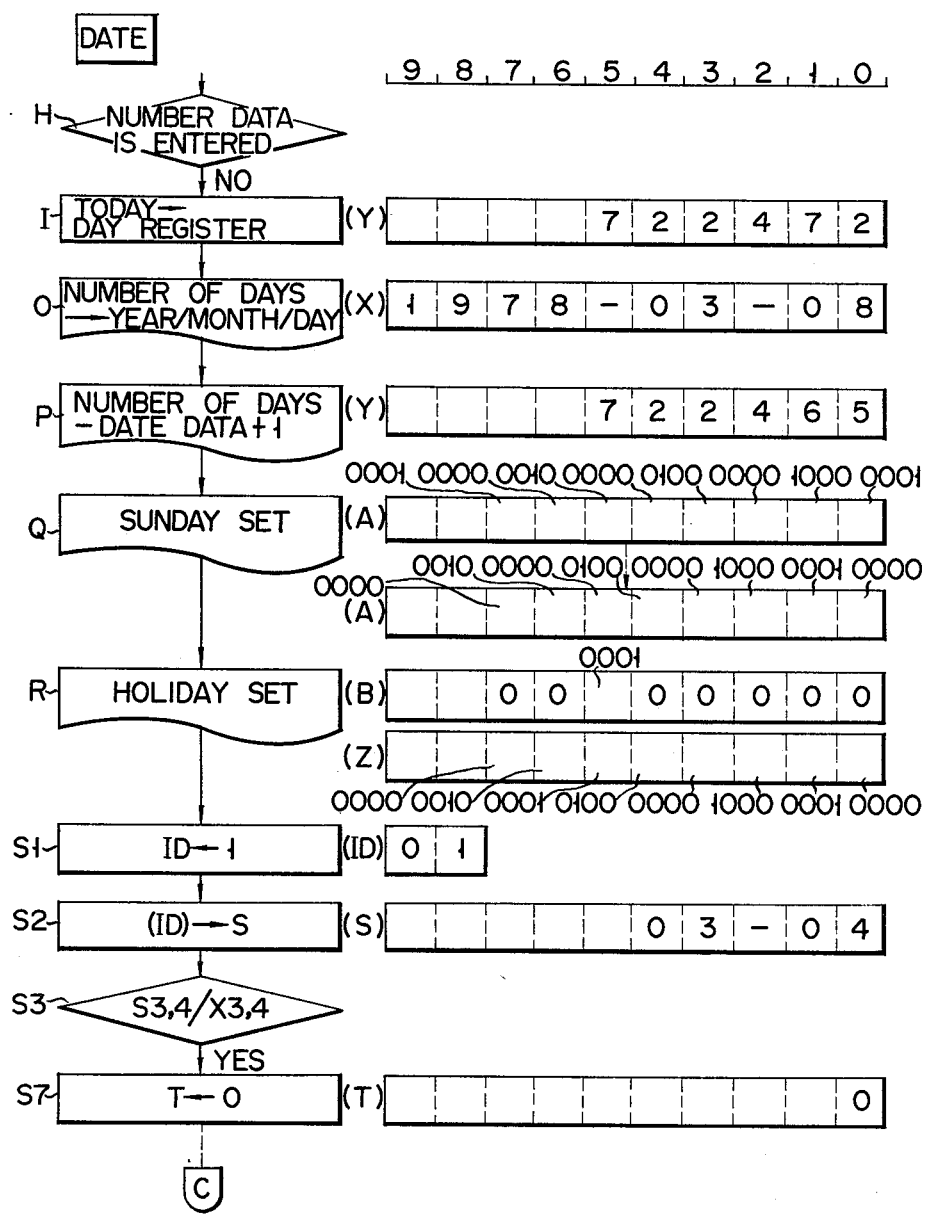
FIGS. 25 and 26 comparatively show the routines or steps when a series of routines shown in FIGS. 23 and 24 are executed for displaying a specific calendar.
Figure 26:
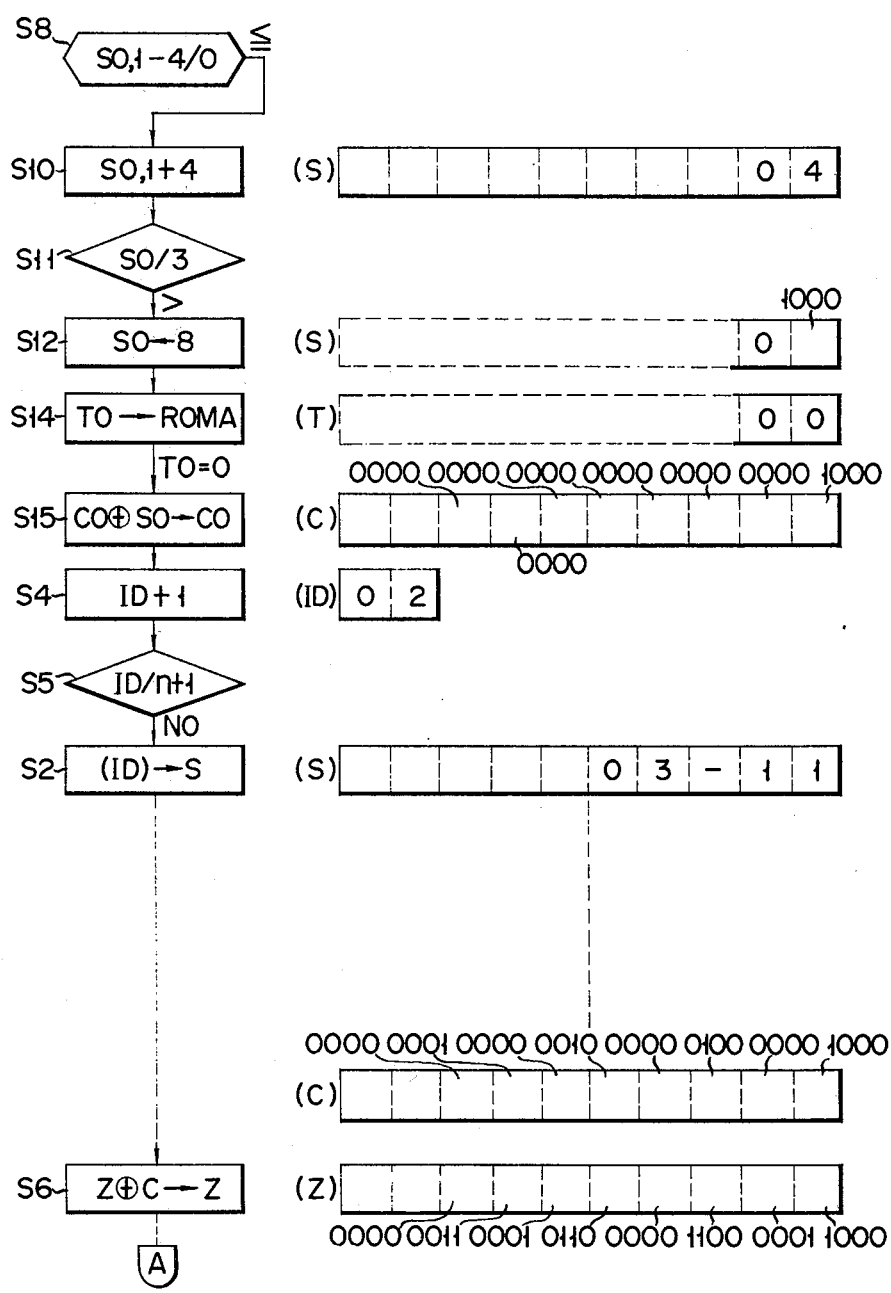
Figure 27:
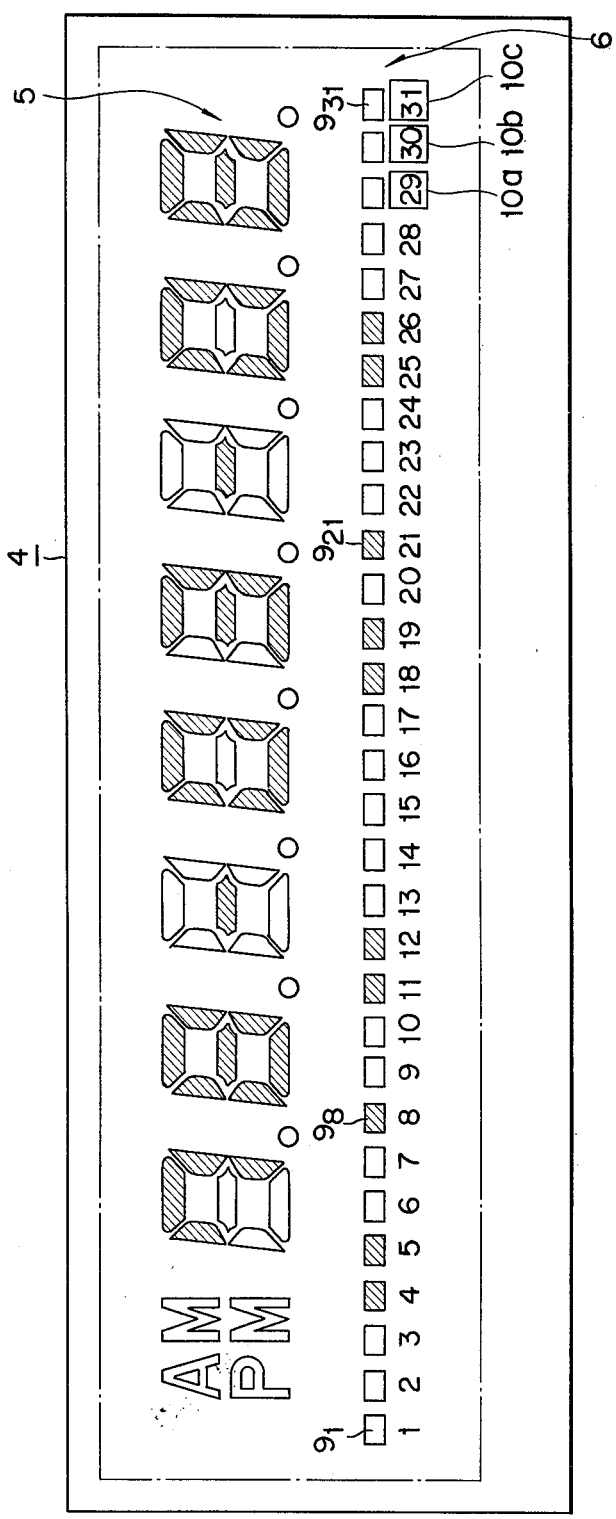
FIGS. 27 shows a display state when a series of processings shown in FIGS. 25 and 26 are executed.

Reference will be made to FIGS. 25 and 26 for explanation to display the specific calendar set as mentioned above. FIG. 26 comparatively shows the respective processing steps for displaying a specific calendar of the month including Mar. 8, 1978 and the contents of the corresponding registers. In order to display the specific calendar of this month, only the DATE key is operated. When the DATE key 12 is operated, the step H judges whether the number data is entered or not, as described referring to FIG. 7G. If the number data is not entered, the program execution advances to a step I. In the step I, the number of days from an imaginary reference day stored in the clock register to today, for example, "722472" days when today is Mar. 8, 1978, is transferred to the Y register, as shown in FIG. 25. The routine 0 then converts the number of days "722473" into the year, month and day data, that is to say, "1978-03-08", through the processing used when an impossible date is inputted, and loads the converted one into the X register, as shown in FIG. 25. In order to calculate the number of days of the 1st day in that month, the routine P subtracts today, i.e. '8', from the number of days set "722472" and adds 1 to the result of the subtraction to obtain "722465". Then, the routine Q is performed to set the Sundays in March into the A register. '1' is previously set in the A register every 7 bits from the most significant bit. Accordingly, the set data is shifted in accordance with the day-of-the-week day. Since the day-of-the-week data of Mar. 1, 1978 is Wednesday '3', the contents of A register is downwardly shifted by three bits. Then, the routine R for setting the national holiday is executed. In this routine, '1' (0001) is loaded into the B5 digit (the sixth digit) in the B register, to set '1' into the 11th bit. In other words, the national holiday data of the Vernal Equinox Day on March 21, is set in the B register. Then, the contents of the B register is loaded into the Z register to which the Sunday data has already been loaded. The detail of the routine R has been described referring to FIGS. 8A to 8C. The, the specific calendar set in routine S is executed and '1' is loaded into the ID in the step S1. In the next step S2, the contents "03-04" of the specific calendar memory M1 specified by the contents '1' of the ID is transferred to the S register. The third step S3 judges whether the contents of the S3, 4 digits of the S register coincides with the month data stored in the $X_3, 4$ in the X register. In this case, the result of the judgement is YES and the data just read out is the month data. Accordingly, the routine program advances to the step S7. Any one of the steps S7 to S22 selects the position where the date data read out to the S register is calendar-displayed and sets the selected position in the C register for the specific calendar.

The step S7 loads '0' into the T register within RAM 30, as shown in FIG. 25 and the step S7 advances to the step S8. The step S8 subtracts '4' from the date data stored in the S register. In this case, the date data stored in the S register is '4' so that the step S8 advances to the step 10 adds '4' to the 0 digit and the first digit of the S register, as shown in FIG. 26. In other words, the steps S8 and S10 execute the operation "4+4+4" and '4' is loaded into the 0 digit and the first digit of the S register. Following the step S10, the step S11 to detect that the contents of the 0th digit of the S register is larger than '3' or is equal to it. In this case, the '4' stored in the 0th digit is larger than '3' so that the routine step advances to the step S12 to load '8' into the 0th digit of the S register. Incidentally, '8' is "1000" in the four-bit code. Following the step S12, the step S14 is executed to execute the address jump of ROM in accordance with the contents (it is now '0' because of the processing in the step S7) of the 0th digit of the T register. In this case, as seen from FIG. 11, the step S14 is followed by the step S15 to OR the contents "1000" in the 0th digit of the S register to the contents of the 0th register of the C register, as shown in FIG. 26. Through these processings, the specific calendar set by an operator including March 4 is set in the C register.

Figure 11:
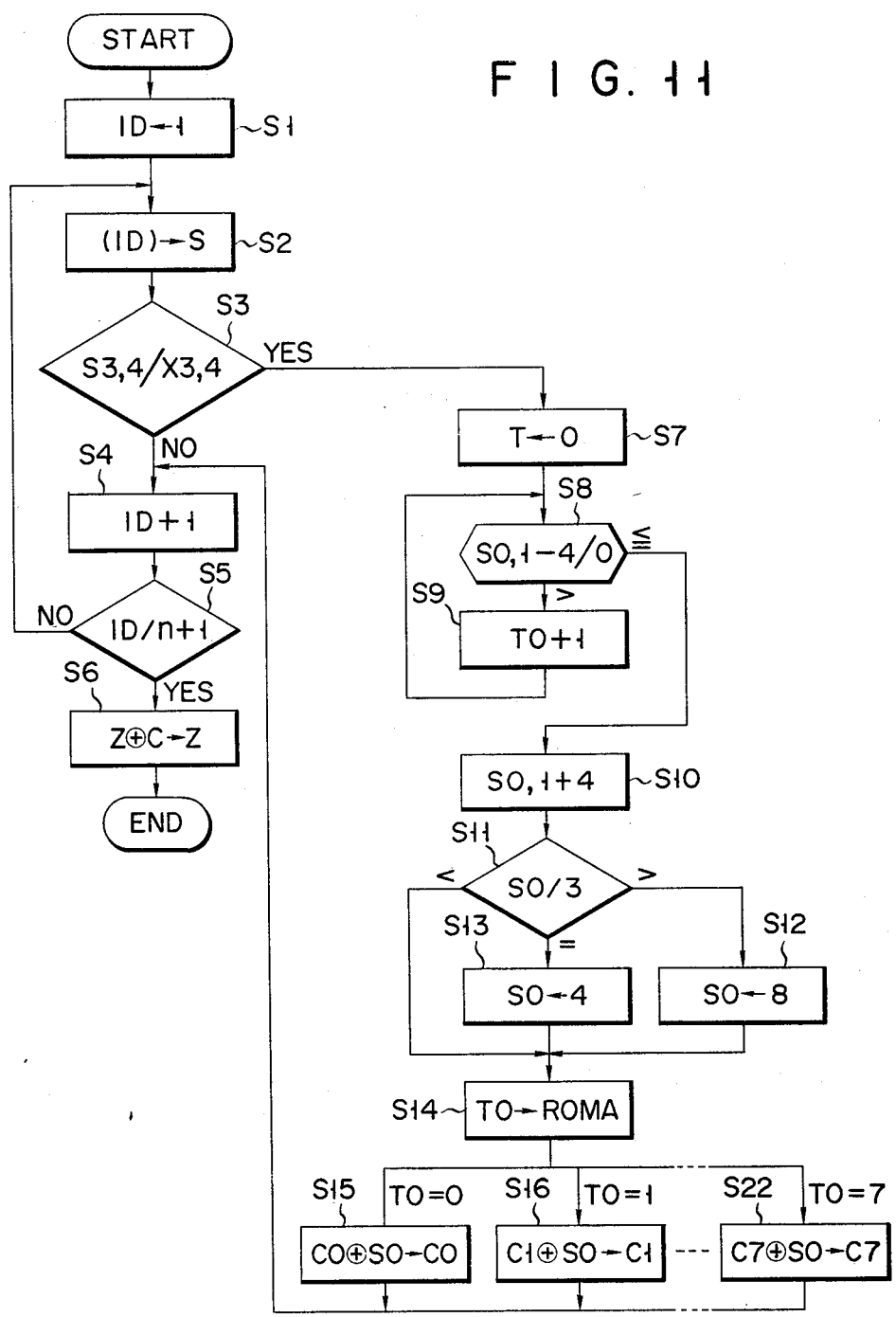
FIG. 11 shows a flow chart of the detail of the routine S shown in FIG. 7G.

After this step S15 is completed, the step S4 is executed as seen from FIG. 11 to add '1' to the ID and, in the next step S5, it is judged that the contents of ID indicates the contents when and the next step S5 judges whether the contents of the indirect address register ID has searched the specific memory registers up to that register Mn. At the present stage, the contents of the ID is '2' so that the result of the judgement in the step S5 is NO. For this, the program step returns to the step S2 and the above-mentioned processing is repeated until the contents of the ID becomes "n+1".

The date data set in specific calendar memory register is March 4, March 11, March 18 and March 25. Therefore, when the contents of the ID reaches "n+1", "1" is loaded into the different bit positions through the steps S15 to S22 and the data as stored in the second stage counted from the bottom in FIG. 26 is loaded in the C register, and then the program step proceeds to the step S26. The step S6 ORs the contents of the C register storing the specific calendar processed as mentioned above to the contents of the R register for storing the calendar display data. The Z register has already stored the Sunday data in March and the national holiday in March. Accordingly, through the above-mentioned processing, ordinary calendar data and the specific calendar data including as holiday Saturdays as well are set in the Z register. Following the specific calendar set routine, a judgement step for judging whether the calendar key in the step T is depressed or not and the routine V for setting a display day are performed and the routine A shown in FIG. 7A is again executed. Through the execution of the routine A shown in FIG. 7A, the display unit 4 displays the date of today and the specific calendar of March. Specifically, the data display section 5 displays the date of today "78-03-08". The calendar display section 6 drives the specific day/holiday display elements $9_1$ to $9_{31}$ to display Sundays of March 5, 12, 19 and 26, the Vernal Equinox Day of March 21, and Saturdays of March 4, 11, 18 and 25. Further, the display element $9_8$ displays the position of March 8 which is the date of today.

Figure 12:
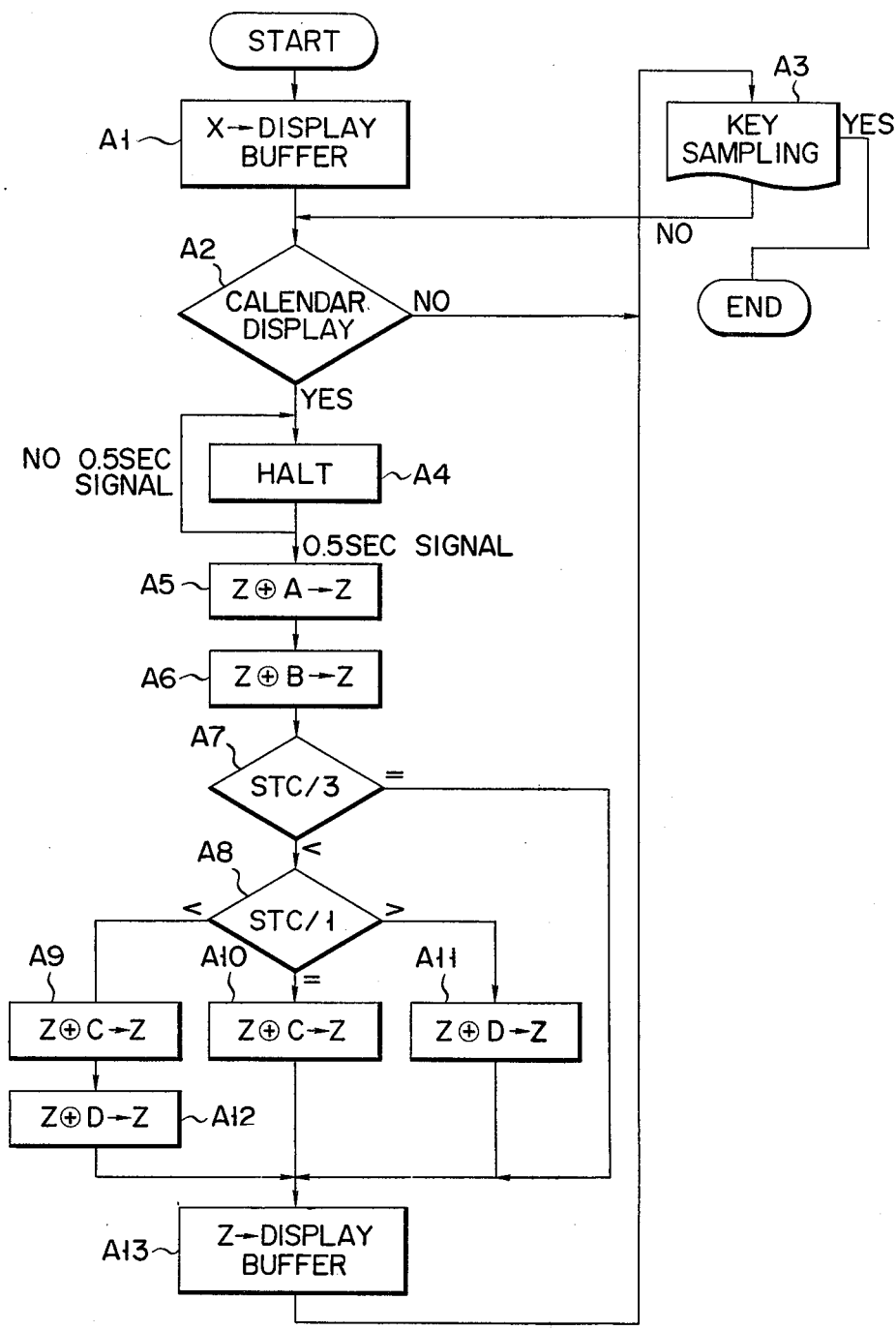
FIG. 12 shows a flow chart illustrating in detail a case where the routine A in FIG. 7A is so set as to make a display with different flashing intervals every display data.
Figure 28:
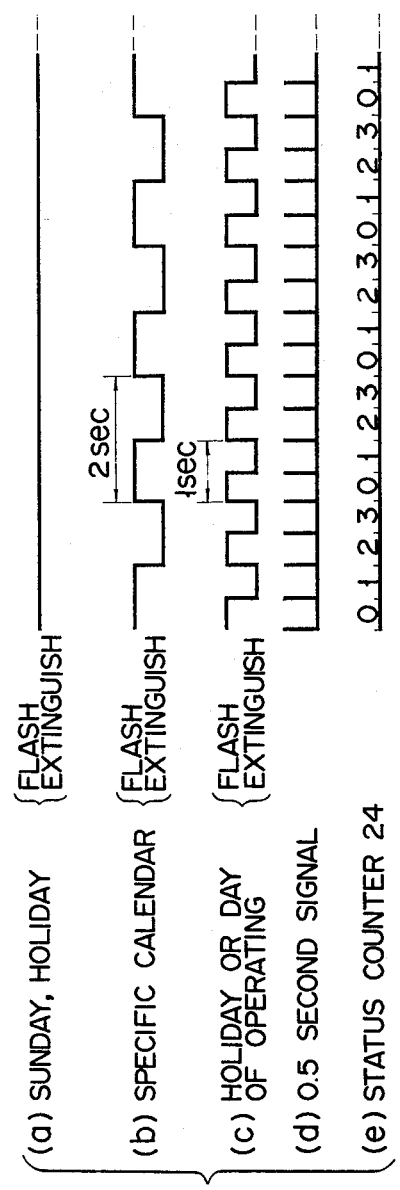
FIG. 28 shows a time chart for illustrating the flow chart shown in FIG. 12.
Figure 29:
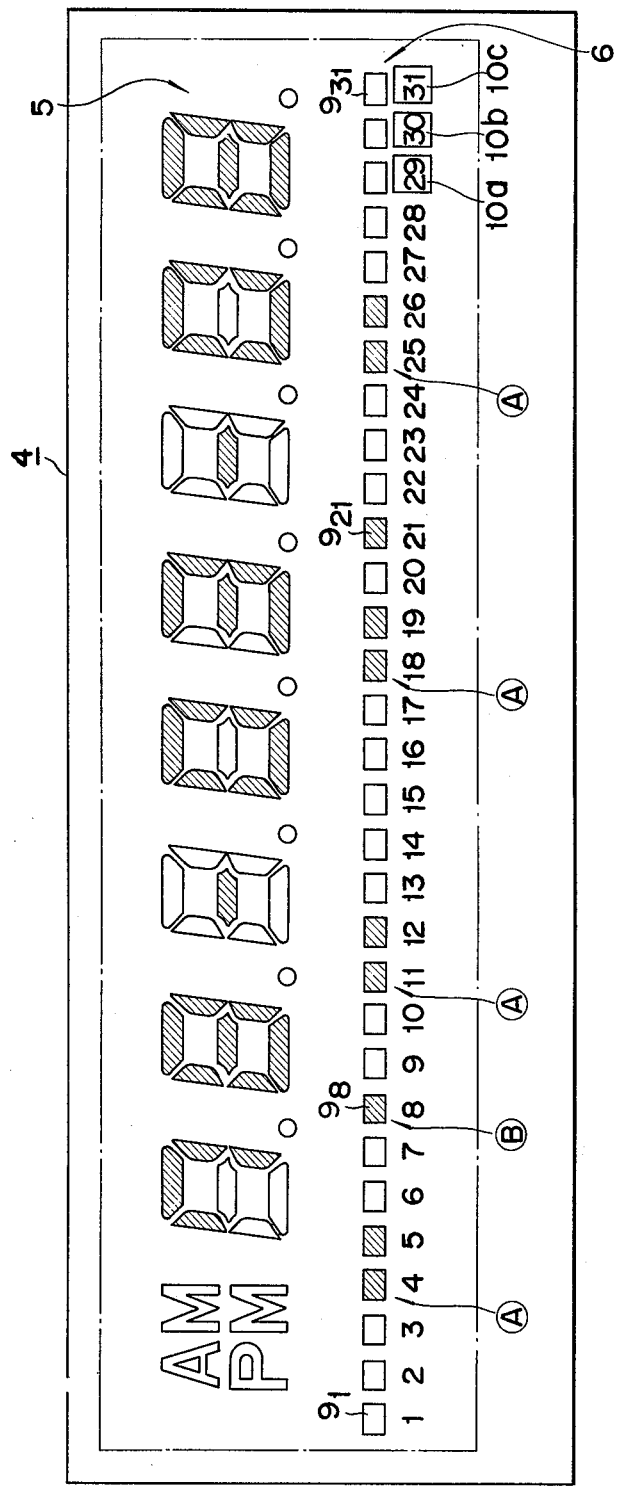
FIG. 29 shows a display state when the processing shown in FIG. 12 is executed.

In the above-mentioned embodiment, Sunday, the national holiday, today, and the specific calendar are displayed in the same display format. However, those may be displayed in diffferent display formats. The display processing of this will be described with reference to FIG. 12. In the processing flow shown in FIG. 12, a light is used to display Sunday and the national holiday; a flashing with one second intervals for today; a flashing with two second intervals. In the routine A, a first step A1 transfers the data of year, month and day or year and month held in the register to the buffers $39_1$ to $39_8$ for display data. The second step A2 judges whether the calendar display is performed or not. The presence of the calendar display is previously set. When the calendar display is not made, the program step advances to the step or subroutine A3 to judge whether the operated key is present or not. If an operated key is present, the program jumps to the routine corresponding to the operated key. When an operated key is not present, the program returns to the step A2. When the routine A2 judges that the calendar display is performed, the program step advances to the fourth step A4 and the program keeps its state (HALT) until the frequency divider 23 produces a 0.5 second signal. When the 0.5 second signal is produced from the frequency divider 23, the program steps to the fifth step A5 to set Sunday data in the A register and then sixth step A6 sets the national day data in the B register in the Z register. Then, the program steps to the seventh step A7 to judge whether the contents of the status counter 24 is equal to '3' or smaller than it. When the contents of the status counter 24 is smaller than '3', the eighth step A8 compares the contents of the status counter 24 with '1'. As a result of the judgment, if the contents of the status counter 24 is '0', the ninth step A9 ORs the specific calendar stored in the C register with the calendar data stored in the Z register. The 12th step A12 ORs the today/operation result data stored in the D register to the calendar data stored in the Z register. When the contents of the status counter 24 is '1', the tenth step A10 ORs the specific calendar stored in the C register to the contents of the Z register. Further, when the contents of the status counter 24 is '2', the 11th step A11 ORs the today/operation result data stored in the D register to the contents of the Z register. When the processing of the steps A10, A11 and A12 is completed, or when the contents of the status counter 24 is '3', the 13th step A13 is performed to transfer the contents of the Z register to the calendar data buffers $43_1$ to $43_9$. The Sunday data stored in the A register and the national holiday data stored in the B register are ORed to the contents of the Z register irrespective of the contents of the status counter 24. Accordingly, it is displayed in the form of light as shown in FIG. 28 (a). The specific calendar stored in the C register is lit when the status counter 24 is '1' and '0' and goes out when it is '2' and '3', and it is flashed with two seconds intervals. The today/operation result data stored in the D register lights when the status counter 24 is '0' and '2' and goes out when it is '1' and '3', and flashes with one second interval, as shown in FIG. 28. FIG. 28(c) shows a 0.5 second, and FIG. 28(e) shows a count state of the status counter 24. In FIG. 29 illustrating a display state of the display unit 4 when the reflashing process is shown in FIG. 12 is performed, symbol A indicates the flashing with two-second intervals and symbol B the flashing with one-second intervals.

In the above-mentioned embodiment, the specific calendar is set by using the month and day data. However, it may be set by using year data in addition to the month and day data. In this case, the specific calendar prepared is the one of a desired year.

The embodiment mentioned above displays the combination of a calendar (including Sundays and the national holidays) previously stored and a specific calendar with today. In a department store, for example, of which the holidays are usually Monday and Wednesday in Japan, those days are set and a specific calendar including those set date data may solely be displayed.

As described above, a specific calendar with a special display format for a day desired by an operator may be optionally designated and displayed by the display unit. Therefore, the electronic device with a calendar data display device of the invention is very beneficial when it is used in companies, offices or the like employing the "five-day working system" or taking extra-ordinary days for holidays.

Display of Today

The date data counted by a clock in the electonic device may be displayed in a specific display format when the calendar display is desired. This is effected by executing the routine shown in FIG. 7G. This routine will be discussed in detail with reference to FIG. 13.

The routine V is prepared on much the same idea as that of the routine S and is comprised of the steps similar to those S2, S7 to S22 in the routine S. When the routine V is initiated, the first step V1 of the routine V transfers the date data stored in the X register to the S register. Then, the second step V2 clears the T register for temporary storage. The third step V3 following the second step V2 substracts the number of bits of one digit, i.e. '4', from the date data stored in the $S_0$, 1 digits (the 1st to 2nd digits) of the S register to judge whether the result of the subtraction is larger than '0' or less. When the subtraction result is larger than '0', the 4th step adds '1' to the To digit (the 1st digit) of the T register and the routine returns to the step V3. The execction of the steps V3 and V4 is continued until the subtraction result in the step V3 becomes '0' or less. When the subtraction result becomes '0' or less, the routine V advances to the 5th step V5. The processing of the steps V3 and V4 provides a digit of the D register to which the date data is loaded. The step V5 adds '4' to the contents of the S register to correct '0' or a negative value obtained in the step V5. The routine further proceeds to the 6th step V6 to compare the contents o f the $S_0$ digit in the S register with the numeral '3'. When the $S_0$ digit contents is larger than '3', the 7th step V7 is executed to load '8' (1000) to the $S_0$ digit. When the contents of the $S_0$ digit is equal to '3', the 8th step V8 is executed to load '4' (0100) into the So digit. When the So digit contents of the S register is smaller than '3' and when the processings V7 and V8 are performed, the routine V proceeds to the 9th step V9. The executions of the steps V6 to V8 determine the bit position for the day to be displayed. When the contents of the So digit in the S register corrected in the step V5 is '1', '1' is set to the first bit of the digit specified by the To digit of the T register. When the contents of the So digit is '2', '1' is set to the second bit of the specified digit. Accordingly, when the contents of the So digit is '1' or '2', there is no need for changing the contents of the So digit and the routine immediately advances to the step V9. When the contents of the So digit is '3', '1' must be set in the 3rd digit of the specified digit. Accordingly, the step V8 loads '4' (0100) to the So digit. When the contents of the So digit is '4', '1' must be set in the fourth bit in the specified digit. For this, the step V8 loads '8' (1000) to the So digit and then the routine steps to the step V9. The step V9 transfers the contents of the To digit of the T register to ROMA 26 to branch the address of ROM 29. Specifically, when the contents of the To digit is '0', the address is branched toward the 10th step V10, and the contents of the So digit of the S register is ORed to the contents of the Do digit of the D register. When the contents of the To is '1', the address branch is directed to the step V11, and the contents of the So digit is ORed to the D1 digit of the D register. Similarly, the address branch is directed to the steps V10 to V17 in accordance with the contents of the To digit, and the contents of the So digit is ORed to the corresponding digits of the D register, with the result that '1' is set in the given bit position of each digit. The resultant value obtained in the steps V10 to V17 is ORed to the contents of the Z register for storing the calendar data. At this point, the display date set routine V ends.

Figure 30:
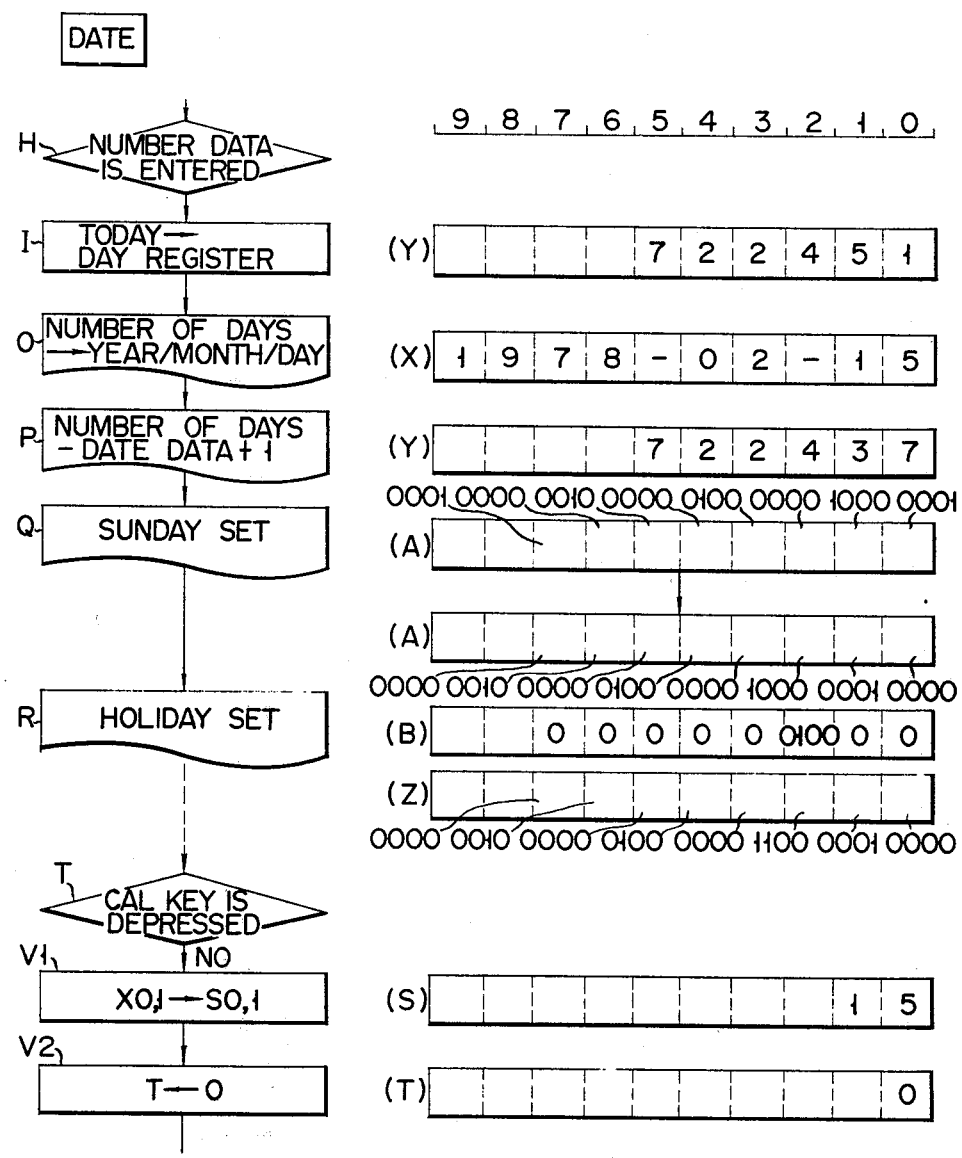
FIGS. 30 and 31 comparatively show the routines or steps and the contents of the related registers when the date of today is displayed by a calendar display section 6.
Figure 31:
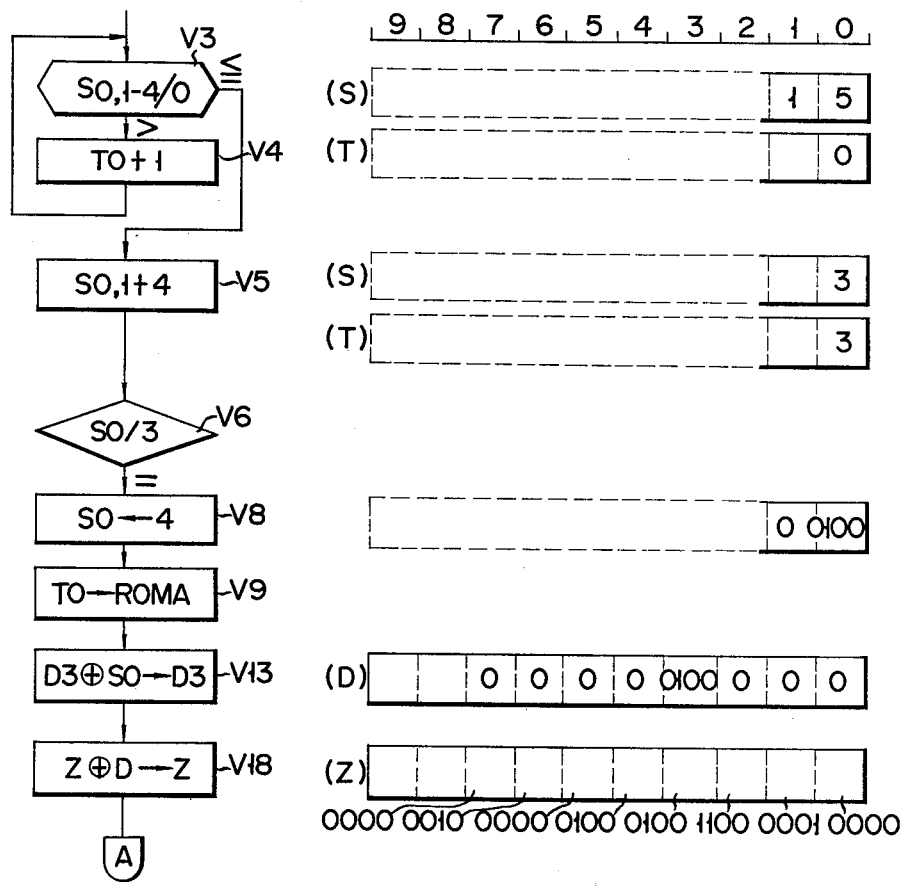

The explanation to follow is the elaboraton of a case where the date of today and the calendar of that month are displayed. FIGS. 30 and 31 comparatively show the step H and the following steps in FIG. 7G and the contents of the respective registers when the date Feb. 17, 1978 and the calendar of that month are displayed. To display the date of today, the DATE key 12 is depressed. Upon the depression of the DATE key 12, the step H first judges whether the entry data is present or not. In this case, no entry operation is performed. Accordingly, the step I is performed to read out the number of days "722451" from an imaginary reference day counted within the time count register till today, Feb. 15, 1978 and to set it into the Y register. Then, the routine O is executed to convert the number of days to the year, month and day data, "1978-02-15", when an impossible date is entered, and then to load the converted one into the X register. In order to calculate the number of days to the first day of that month, the routine P subtracts today, i.e. '15' from the number of days "722451" set in the Y register and adds '1' to the subtraction result thereby to obtain "722437". Then, the program advances to the routine Q to set the Sundays in February into the A register, as described above. '1' is previously set in the A register every 7 bits from the least significant bit. Accordingly, the set data is shifted in accordance with the day-of-the-week data. Since the day-of-the-week data of Feb. 1, 1978 is Wednesday '3', the contents of the A register is downwardly shifted by 3 bits. Then, the routine advances to the routine R for setting the national holiday. The routine R loads '4'(0100) to the B2 digit (the 3rd digit) of the B register and set '1' to the 11th bit. That is, the national holiday data of the National Foundation Day on February 11 is set in the B register. Then, the contents of the B register is loaded into the Z register to which the Sunday data has already been set. Then, the routine passes the calendar set routine S to reach the step T to judge whether the CAL key 11 is operated or not. In this case, the CAL key 11 is not operated, the routine display set routine V is executed. The step V1 transfers the day data '15' to the So, 1 digit of the S register and the step V2 clears the T register. Then, the routine proceeds to the step V3 subtracts '4' from the day data '15' set in the Xo, 1 digits of the X register while at the same time adds '1' to the To digit of the T register. The steps V3 and V4 are repeated until the contents of the S register becomes '0' or a negative value. When the initial data of the S register is '15', the steps V4 is repeated three times to count up the contents of the T register up to '3'. The four times execution of the step V4 provides '−1' so that the routine advances tothe step V5. The step V5 adds '4' to the contents '−1' of the S register and loads the result of the addition " to the So digit. Then, the step V6 compares the contents of the So digit with the numeral '3'. Since the contents of the So digit is coincide with the numeral '3', the routine proceeds from the step V6 to V8 to load '4' (0100) to the So digit. Then, the step V9 transfers the contents '3' of the T register to the ROMA 26 thereby to jump the routine to the step V13. The step V13 ORs the contents '4' (0100) of the so digit of the S register to the D3 digit (the fourth digit) for storing the day/operation result day and sets '1' to the 15th bit corresponding to the 15th day. Then, the step V18 is executed to OR the contents of the D register, i.e. the day data of today, to the Z register for storing the calendar display data, in which the data of Sunday and the national holiday are already stored.

At this stage, the display day set routine V ends and the routine returns to the routine A to display effect the date display and the calendar display in accordance with the X register and Z register. As shown in FIG. 32, the data display section 5 displays "78-02-15" representing Feb. 15, 1978 and at the same time th calendar display section 6 displays Sunday, the national holiday and a specific day (today). In the case of February in 1978, the specific day/holiday display elements $9_5$, $9_{19}$ and $9_{25}$ are driven to display Sunday. At the same time, the display element $9_{11}$ is driven to display the National Foundation Day. Additionally, the display element $9_{15}$ is driven to display today (15). In the case of February in a common year, the mask electrodes $10a$ to $10c$ are driven to mask the days from the 29th to 30th days.

As described above, the embodiment mentioned above can automatically display the calendar of the month including today obtained the time count function within the device. Further, the specific day corresponding to today may be displayed on the calendar. Accordingly, one can directly know today with relation to the other date.

Display of the Operation Result

One frequently knows the date after X days or before Y days counted from a certain date. In order to satisfy such a request, the device according to the invention displays the result of the date operation in the date display section 5 and the calendar display function 6 as well.

Figure 13:
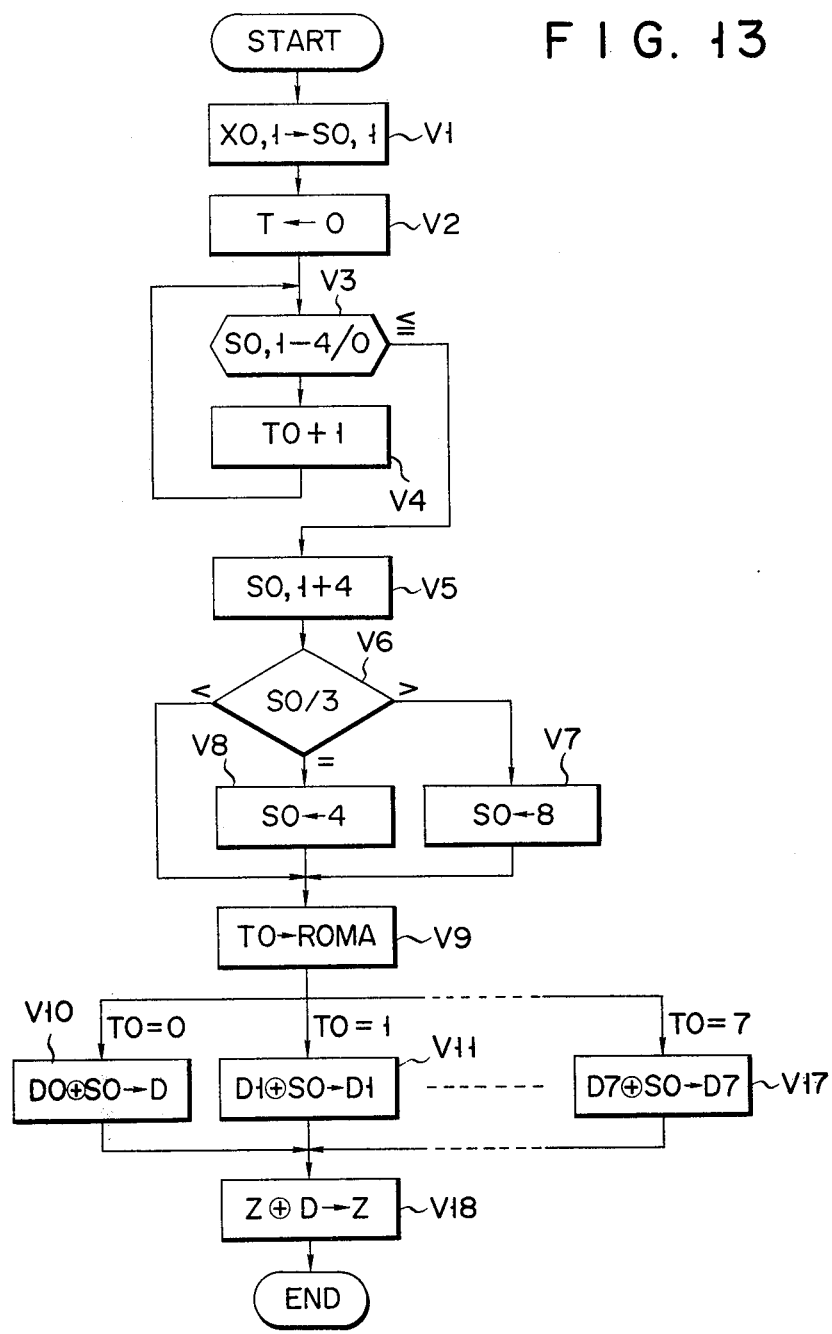
FIG. 13 shows a flow chart illustrating in detail the routine V in FIG. 7G.
Figure 33:
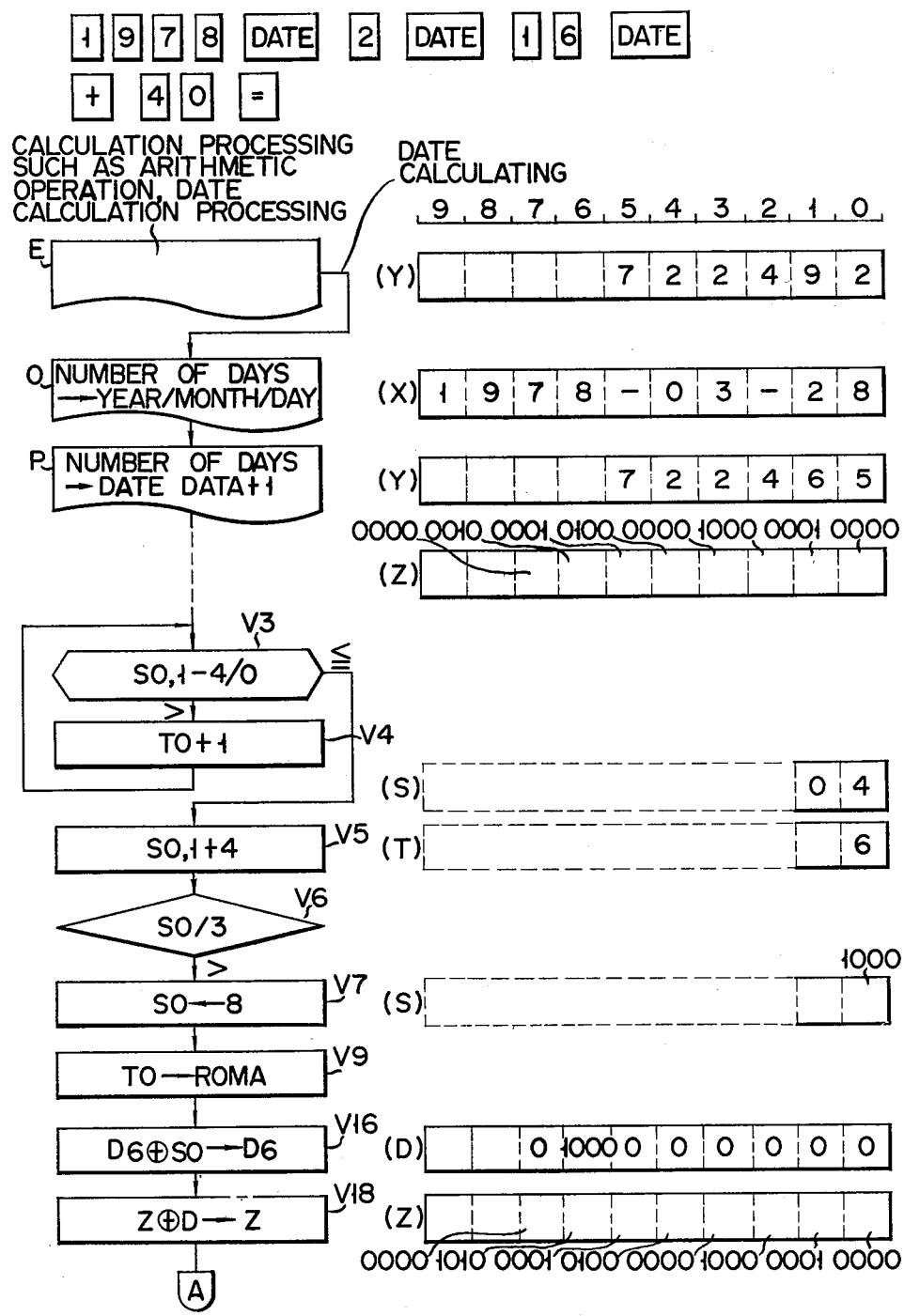
FIG. 33 comparatively shows the routines or steps and the contents of the related registers when the result of date calculation is also displayed by the calendar display section 6.
Figure 34:
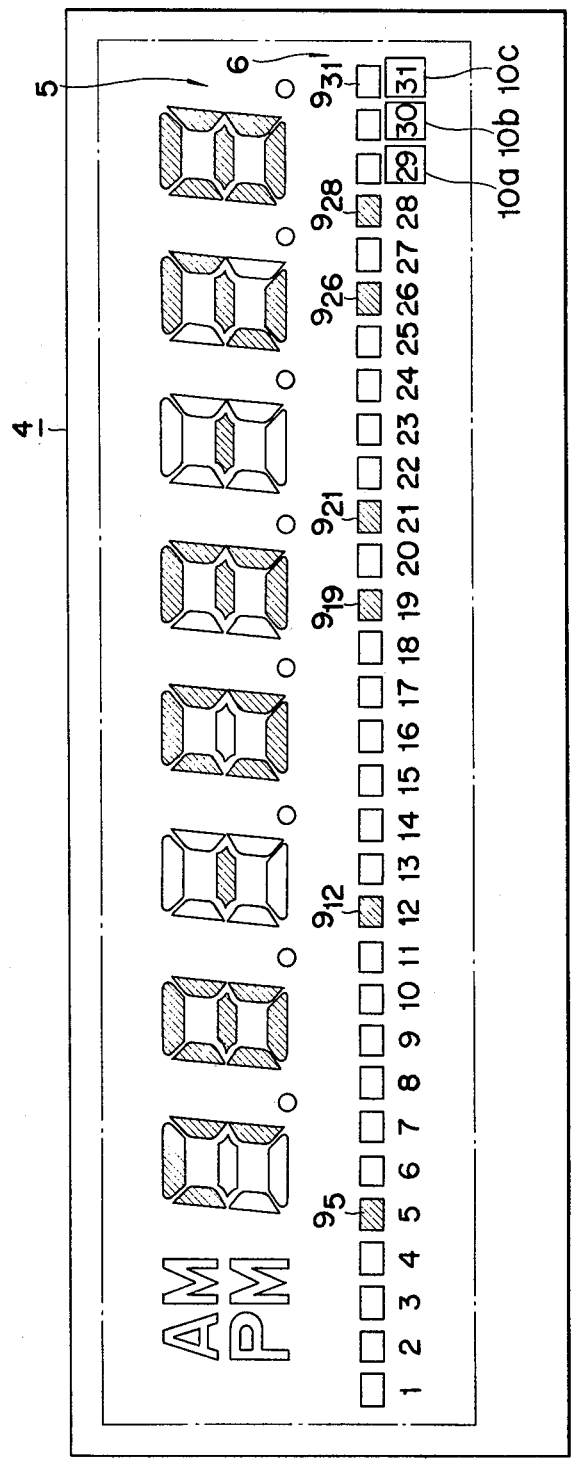
FIG. 34 shows a display state when a series of processings shown in FIG. 34 are executed.
Figure 36:
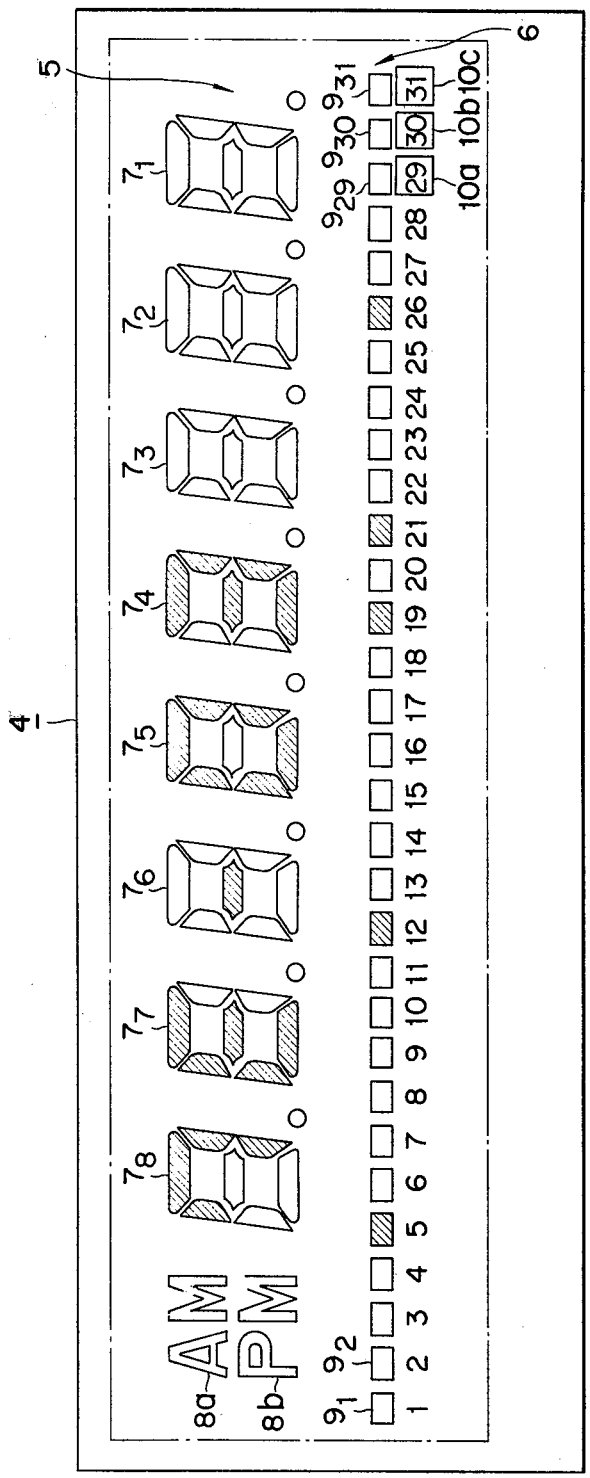
FIG. 36 shows a display state when a series of processings shown in FIG. 35 are executed.
Figure 39:
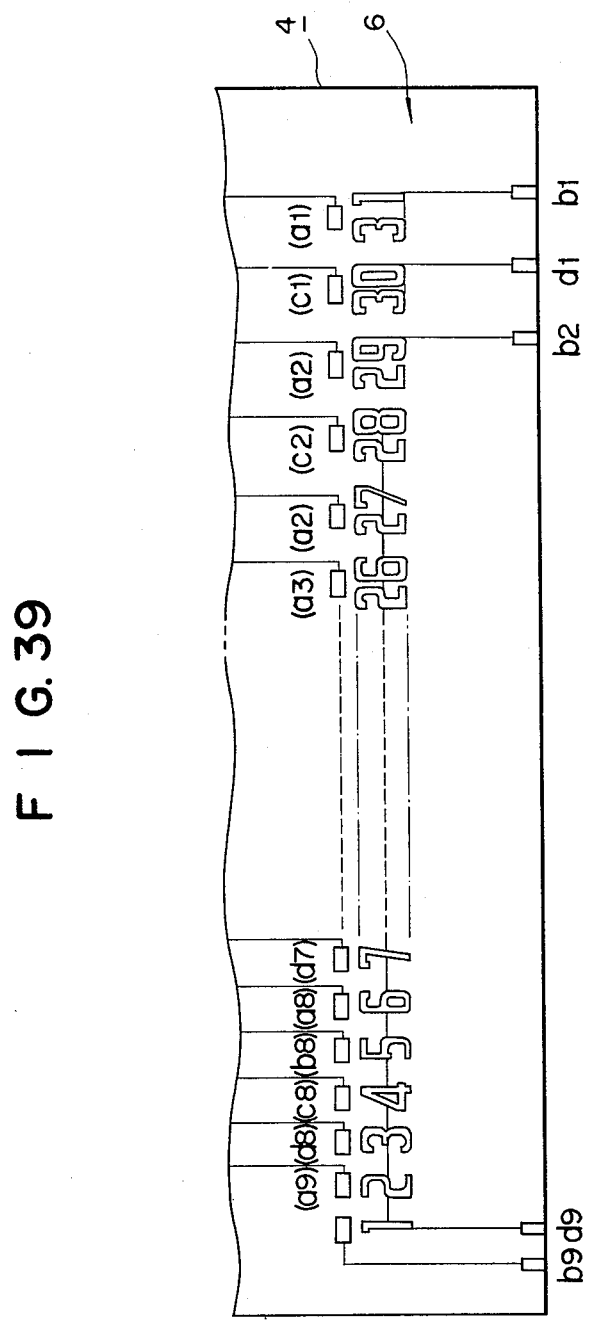
FIG. 39 shows a modification of the electrode structure shown in FIG. 3A.

The display of the operation resultant date is effected by executing the routine V shown in FIG. 7G which described in detail referring to FIG. 13. The application of the operation resultant day to the display day of today suffices. Explanation will be given about a case when Feb. 16, 1978+40 days is operated, referring to thememory states of the respective routines and the steps in FIGS. 7C to 7G shown in FIG. 33 while omitting the explanation of the routine V shown in FIG. 13. For displaying the calculatin result of Feb. 16, 1978+40 days, keys 1 9 7 8 DATE 2 DATE 1 6 DATE+40 = are operated in this order. Upon the operations of those function keys, the routine E for the arithmetic operation, date calculation and the like is executed to perform the operation Feb. 16, 978+40 keys. The operation result is given in the form of the number of days from March 1, 0 which is the imaginary reference day. The routine E calculates the number of days "722492" as shown in FIG. 33(Y). Then, the routine advances to the routine C to convert the number days "722492" into the year, month and day data, i.e. Mar. 28, 1978 and load the converted one into the X register. Then, the routine P is executed to perform "the number of days−day+1" to obtain the number of days "722465" from the imaginary reference day to the 1st day of the operated month (in this example, Mar. 1, 1978) and load it to the Y register. The routine further passes the Sunday set routine Q, the national holiday set routine R, the specific calendar set routine S to advance to the step T. The step T judges as to whether the CAL key 11 is depressed or not. Then, the routine advances to the display day set routine V. In the display day set routine V, the steps V1 to V18 obtains the bit positions cprresponding to Mar. 28, 1978 by a similar means described relating to FIGS. 30 and 31, when today is displayed, and to temporarily set the data in the D register and to OR the data to the contents of the Z register. In the case of 28 day as the operation result day, when the step V5 is executed, '4' has been set in the S register and '6' in the T register. Accordingly, the routine advances from the step V6 to the step V7 to load '8' (1000) to the S register. Following this, the routine V9 advances from the contents '6' of the T register to the step V16 to load '8' (1000) into the D6 (the 7th digits) digit of the D register and to set '1' into the 28th bit corresponding the 28th day. The contents of the D register is ORed to the contents of the Z register in the step V2. Further, the Sunday and National Holiday data are set in the Z register and the 28th data which is the operation result day is set in the same. When the display day set routine V is completed, the routine returns to the routine A shown in FIG. 7A to diaplay the operation resultant date and the calendar of the month. Specifically, the data display secton 5 displays "78-03-28" representing Mar. 28, 1974 which is the operation resultant day and the calendar display secton 6 displays Sunday, the national holiday and a specific day (the operation resultant day). In the case of March in 1978, the specific day/holiday display elements $9_5$, $9_{12}$, $9_{19}$ and $9_{26}$ are driven to display sundays and the display element $9_{21}$ is displayed to display the Vernal Equinox Day. Further, the display elements $9_{28}$ is driven to display the operation resultant day (28).

As described above, the calendar of the month corresponding to the resultant date resulting from the date calculation, and further a specific day corresponding to that date in a specific display format on the calendar. Accordingly, one can quickly distinguish the specific day from the other dates.

Change of Calendar

FIGS. 7A to 7G refer to nothing of the change of a calendar, that is to say, the display of the last month or the next month with respect to the month currently displayed i.e. March. This calendar display change may be made by using the +key 15 or −key 16 which are used in an ordinary operation, saving the number of keys used.

Figure 14A:
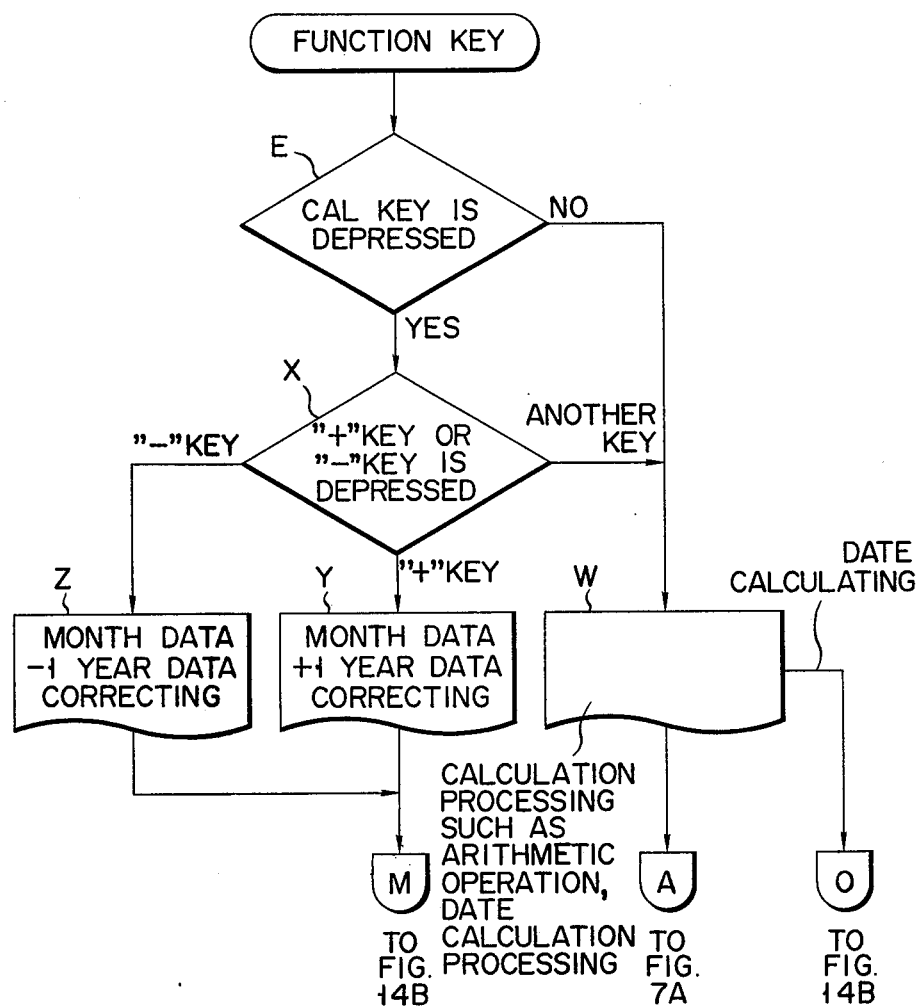
FIGS. 14A and 14B show flow charts which are modifications of those in FIGS. 7C and 7G.
Figure 14B:
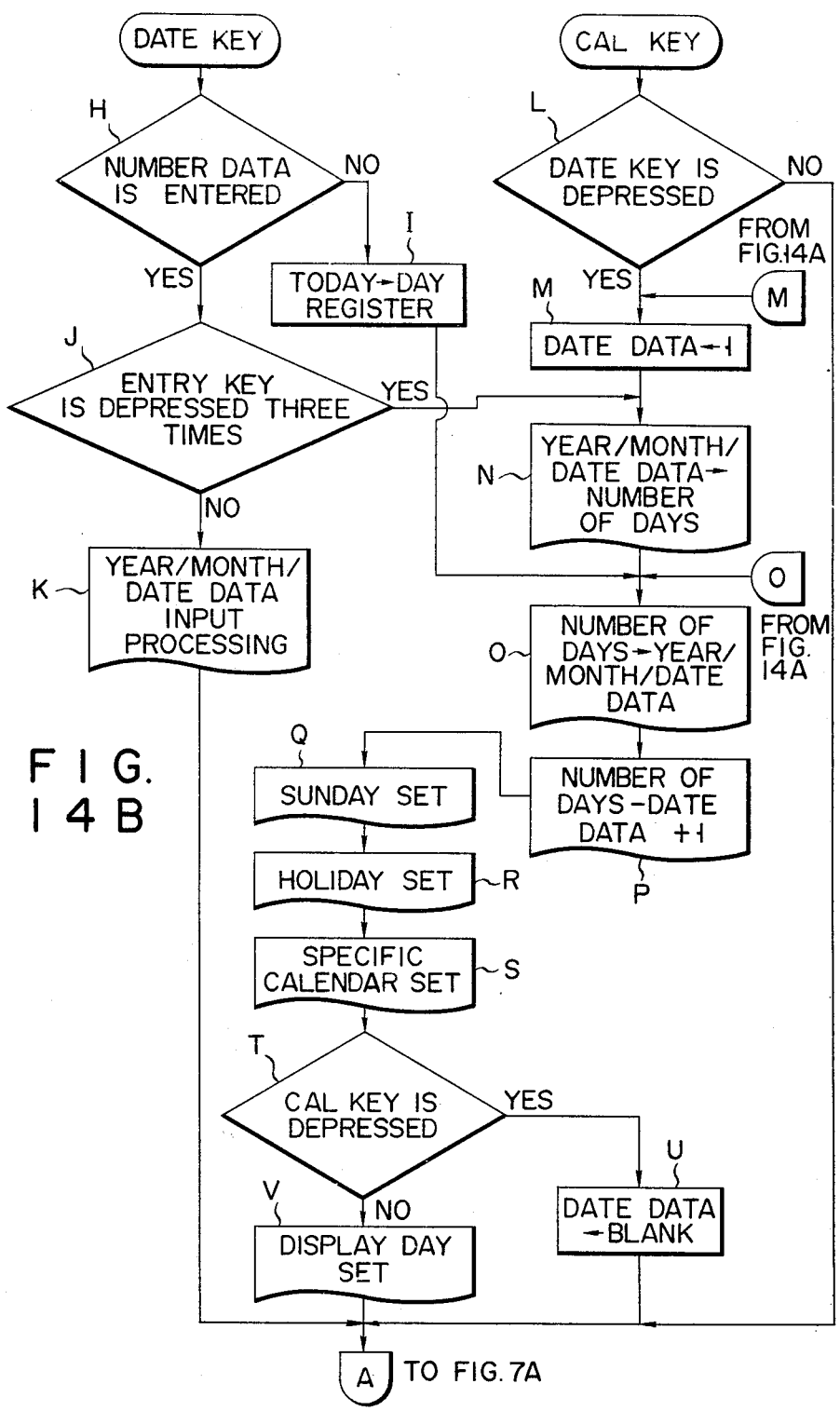

When the +key 15 and the −key 16 are used for the calendar display change, the flow charts shown in FIGS. 7C to 7G are substituted by the flow charts shown in FIG. 14A to 14B. The flow charts in FIGS. 14A and 14B will be described in detail. Upon the depression of the function key, the routine jumps to the step E. The step E judges whether the CAL key 11 is operated or not. When the CAL key has not been operated, the result of the judgement is NO so that the routine advances to the routine W. The routine W performs the specified arithmetic operation, the specified date calculation and the like. After the calculation is completed, if the date calculation is performed, the program advances to the routine O, and if the calculation other than that is performed, the routine program advances to the routine shown in FIG. 7A. In the step E, when the judgement result is YES, the routine advances to the step X to judge whether the operated function key is the + key 15 or the − key 16. When the + key is operated, the program advances to the routine Y. When the − key 16 is operated, the program advances to the routine Z. When the remaining function key is operated, the program steps to the routine W.

The routine Y is used to obtain the year and month data of the next month by adding '1' to year and month data stored in the X register and, if necessary, by correcting the year data. The routine Z is used to obtain the year and month data of the last month by adding '−1' to the year and month data stored in the X register and, if necessary, by correcting the year data. After the routines Y and Z are completed, the program jumps to the step M shown in FIG. 14B and execute the respective routines following the step M. The portions not referred to in FIG. 14B are all the same as those in FIG. 7G and therefore reference should be made to the routines in FIG. 7G with like reference symbols in those attached to the respective routines shown in FIG. 14B.

A case to display the next month of that currently display will be described with reference to FIGS. 17, 18, and 19, and FIGS. 35 and 36.

Figure 19:
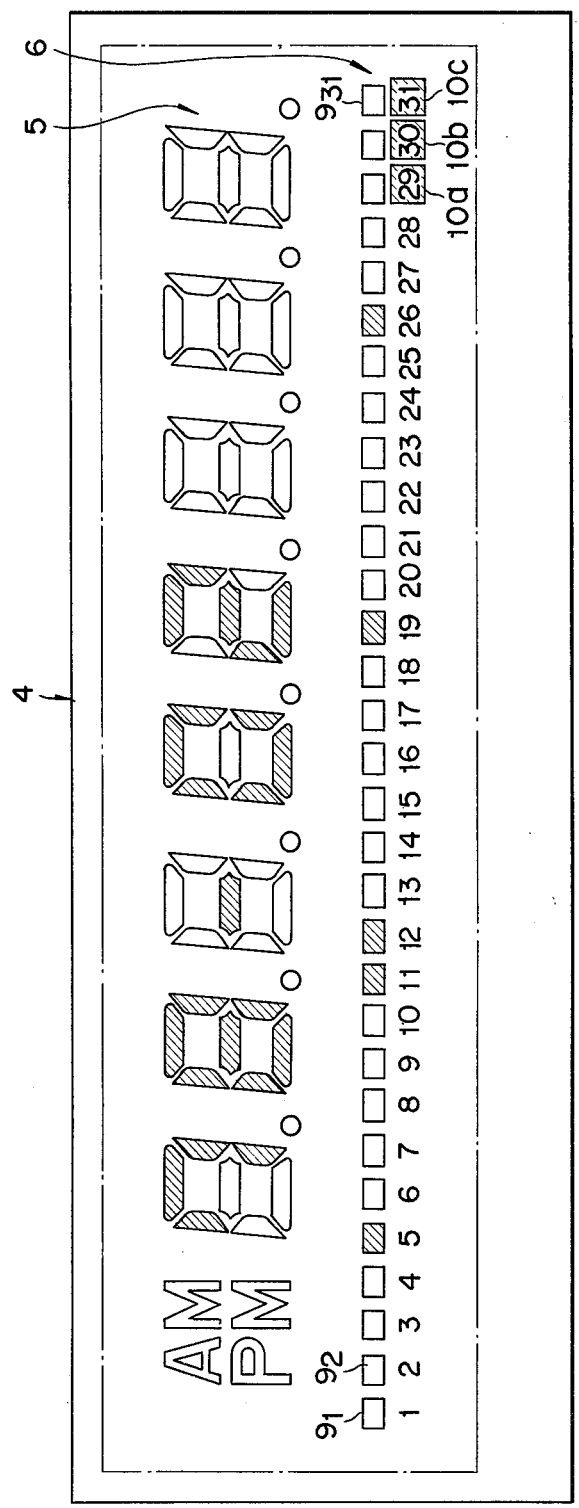
FIG. 19 shows a display state when a series of processings shown in FIGS. 17 and 18 are executed.

Since FIGS. 17 to 19 have been described in the description of the Holiday display, no further explanation is necessary. Assume now that with the execution of the respective routines or steps, the contents of the respective registers become as shown in FIGS. 17 and 18, and the calendar of Fegruary in 1978 is displayed as shown in FIG. 19.

Under this condition, if the + key 15 is operated to display the calendar of March in 1978, the program jumps to the routines following the step E. The step E judges that the CAL key 11 has already been operated, and then advances to the step X. The step X judges that the + key 15 is operated and then advances to the routine Y. The routine Y adds '1' to the month data "1978-02" which is the contents of the X register to obtain the year and month data of the next month, i.e. "1978-03".

Upon the end of the routine Y, the program jumps to the step M to execute the respective routines mentioned above and the steps as in the previous manner. In the step M, '1' is set in the digit storing day in the X register, as shown in FIG. 35. Then, the program advances to the routine N to calculate the number of days till Mar. 1, 1978 in accordance with the above-mentioned equation. The number of days "722464" (stored in the Y register) obtained by the calculation just mentioned is subjected to the processings of the routines O and P, as in the previous case. The routine Q sets Sundays of the specified month in the A register. In this case, the day-of-the-week of Mar. 1, 1978 is Wednesday '3' so that '1' representing Sunday is stored in the 5th bit of the A register, as shown in FIG. 35 and then '1' representing Sunday is set therein every 7 bits thereafter.

Then, the program advances to the routine R for setting the national holidays. In the case of 1978, the Vernal Equinox Day is March 21 and therefore '1' (0001) is loaded into the B5 digit (the 6th digit) of the register. Then, the month end correction for holiday display is performed, as in the previous manner. Then, the Sunday data stored in the A register is ORed to the contents of the Z register and then it is judged whether the national display mode is not. If it is the national holiday mode, the national holiday data stored in the B register is ORed to the contents of the Z register. At this point, the national holiday set routine ends.

As in the previous case, the routines S, the step T and step U are executed and the program returns to the routine A shown in FIG. 7A. In this way, the data display section 5 displays "78-03" representing March in 1978 and the calendar display section 6 displays the calendar of March in 1978 with Sundays and the national holiday.

The embodiment mentioned above relates to a case when the + key 15 is operated. Similarly, the calendar display of the 1st month is performed by operating the − key 16. Further, the month specified may be calendar-displayed by successively depressing the + key 15 or the − key 16. Also in the above-mentioned embodiment, the calendar display of the next month or the last month display is performed by means of the + key 15 and − key 16. To this end, other suitable keys may be used. Further, only the next month may be successively displayed by a specific key.

As described above, according to the embodiment, the calendar display of the last month or the next month may be displayed by a simple key operation. Therefore, in scheduling meeting or travel, a desired month is calendar-displayed and then the next or last month may quickly be displayed if necessary. While the numerals '1' to '31' for day representation are printed in the above-mentioned embodiment, those numerals printed may be replaced by the liquid display elements having the display electrodes for '1' to '31'. In this case, the display electrodes for '1' to '28' are together driven by a signal inputted from the external connection terminal d9 and the display electrodes are selectively driven by the signals coming through external connection terminals b2, d1 and b1 so as to adjust the date at the end of a month to that of a specified month.

In place of the row fashion of the date numerals in the above-mentioned embodiment, a matrix fashion may be used which is an arrangement of the currently used calendar, as shown in FIGS. 40 and 41. FIG. 40 illustrates a calendar in which the date order is arranged horizontally and FIG. 41 shows another calendar with the date order arranged vertically.

The present invention may be applied to not only the small-sized electronic calculator but also any suitable devices such as a timepiece.

What is claimed is:

1. A calendar data display device for an electronic device, comprising:
   display means including a numerical data display section for displaying various numerical data and a calendar display section for forming a calendar showing a desired arrangement of the dates of at least one month;
   display drive means connected to said display means for driving said display means;
   input means including: at least one calendar designating unit for generating a signal instructing that data for forming a calendar of a desired month be supplied to said display drive means; and at least one date data designating unit for generating a signal instructing that data displayed by said numerical data display section is preset;
   control means connected to said input means for generating, in response to the output signal of said at least one calendar designating unit, a control signal instructing that the calendar of the desired month is formed;
   calendar preparation means connected to said control means for preparing the calendar of the desired month under control of said control means and connected to said display drive means for supplying said display drive means with signals corresponding to the calendar prepared, said prepared calendar being formed by using the data representing the date corresponding to a specific day of the week and/or another data; and
   memory means connected to said calendar preparation means and/or said input means for storing the data for forming the calendar of the desired month and/or date data which are to be read out upon actuation of said input means and to be displayed by said display means.

2. The calendar data display device of claim 1, wherein:
   said display means is a liquid crystal display device; and
   said calendar display section comprises: display elements representing the 1st to 31st days
   and printed in a row on said display means; and display elements representing special days and holidays
   and printed beside the respective display elements representing the 1st to 31st days.

3. The calendar data display device of claim 2, wherein said display means includes a glass portion display window, and said display elements representing the 1st to 31st days are printed in a row on said glass portion display window.

4. The calendar data display device of claim 2, wherein said calendar display section includes mask display means for masking at least one of the display elements representing the 29th, 30th and 31st days.

5. The calendar data display device of claim 1, wherein:
   said display means is a liquid crystal display device;
   said numerical data display section comprises display elements representing numerical data and arranged in a row; and
   said calendar display section comprises calendar display elements representing the 1st to 31st days, arranged in a row parallel to the row of the display elements of said numerical data display section and each comprised of segment electrodes, the calendar display elements representing the 1st to 28th days being connected together; and said display drive means simultaneously driving said calendar display elements representing the 1st to 28th days, and said display drive means independently driving the calendar display elements representing the 29th to 31st days.

6. The calendar data display device of claim 1, wherein said calendar display section is comprised of display elements representing the 1st to 31st days and arranged in 5 rows and 7 columns; and mask display means for masking at least one of the display elements representing the 29th, 30th and 31st days.

7. The calendar data display device of claim 1, wherein said input means further includes "0" to "9" keys and said date data designating unit includes a first specific key which is operated to enter "year-month" data, "month-day" data, and "year-month-day" data after the "0" to "9" keys have been selectively operated.

8. The calendar data display device of claim 7, wherein said calendar display section displays the calendar of the current month when said first specific key is operated without operating the "0" to "9" keys.

9. The calendar data display device of claim 7, wherein said input means further includes function keys to direct various operations including date operation; and said control means is responsive to the operation of a given one of the function keys to cause said calendar data preparing means to prepare the calendar of the desired month and to display the prepared calendar by means of said calendar display section.

10. The calendar data display device of claim 1, wherein said display drive means includes a first display buffer for storing data to be displayed by said numerical data display section and a second display buffer for storing data to be displayed by said calendar display section, said second display buffer comprising a 34-bit buffer, 31 bits of which correspond to the 1st to 31st days and 3 bits of which store data for masking at least one of the 29th, 30th and 31st days.

11. The calendar data display device of claim 10, wherein said display drive means further comprises read-in control means coupled to said first and second display buffers and which are responsive to read-in clock signals applied to the respective digits thereof to individually update the contents of the respective digits.

12. The calendar data display device of claim 11, further comprising an address control means for designating an address of said memory means; and wherein said memory means comprises a RAM; and said read-in control means provides different read-in clock signals to said first and second display buffers on the basis of address data delivered from said address control means to designate an address of said memory means to deliver display data to said first and second display buffer.

13. The calendar data display device of claim 12, wherein said read-in control means comprises a decoder to decode said address data, and a gate coupled to said decoder and which is enabled or disabled by an output signal from said decoder.

14. The calendar data display device of claim 1, wherein said calendar preparation means includes means for preparing the data representing the date corresponding to a holiday under control of said control means so that the data corresponding to the holiday is displayed in a predetermined format.

15. The calendar data display device of claim 14, wherein said calendar preparation means comprises a read only memory, and means for the data which correspond to a holiday other than Sunday and which are stored in said read only memory.

16. The calendar data display device of claim 15, wherein said memory means includes first and second registers, and said calendar preparation means includes means for ORing the data stored in said first and second registers of said memory means to prepare data representing the corresponding date.

17. The calendar data display device of claim 14, wherein said calendar preparation means comprises a read only memory, and includes means for preparing the data which represent the date corresponding to a holiday other than Sunday and which are at least partly stored in said read only memory.

18. The calendar data display device of claim 17, comprising means for entering the holiday previously stored in said read only memory through said input means and for storing same in said memory means; and wherein said calendar preparation means prepares the data corresponding to a holiday on the basis of the data stored in said memory means and the data stored in said read only memory of calendar preparation means.

19. The calendar data display device of claim 18, wherein the data representing the holiday and prepared by said calendar preparation means is delivered from said display drive means to drive a display element which is provided in said calendar display section and which represents a special day or a holiday.

20. The calendar data display device of claim 1, wherein said calendar preparation means includes means for preparing data representing the date corresponding to a holiday including Sunday to be displayed under control of said control means; and means for preparing data for rendering the holiday "Monday" when the holiday falls on Sunday.

21. The calendar data display device of claim 20, wherein said control means includes a first register; said memory means includes a second register; and said calendar preparation means includes means for storing the data representing the date corresponding to a holiday other than Sunday into said first register of said control means in terms of the bit position corresponding to the date, and for storing the data representing the date corresponding to Sunday into said second register of said memory means in terms of the date of the holiday other than Sunday.

22. The calendar data display device of claim 21, wherein said calendar preparation means includes means for adding the data stored in said first and second registers to obtain a first sum, and for logically adding the data stored in said first register of said memory means to said first sum to prepare the data representing the date corresponding to the holiday.

23. The calendar data display device of claim 22, wherein the data representing the date corresponding to the holiday and prepared by said calendar preparation means is delivered from said display drive means to drive a display element which is provided in said calendar display section and which represents a special day or a holiday.

24. The calendar data display device of claim 1, wherein said calendar preparation means includes detection means for detecting under control of said control means the presence or absence of the date data in said memory means, which corresponds to a month to be displayed and which has been entered by actuation of said input means and means for preparing the date data in response to the output of said detection means; and said calendar display section displays in a predetermined format the date data prepared by said calendar preparation means.

25. The calendar data display device of claim 24, wherein said date data stored in said memory means includes month and day data, and enables said calendar display section to display the date in a predetermined format irrespective of updating of year.

26. The calendar data display device of claim 24, wherein the data corresponding to the date entered by an operator and prepared by said calendar preparation means is supplied to said display drive means and drives a display element which is provided in said calendar display section and which represents a special day or a holiday.

27. The calendar data display device of claim 1, further comprising a time counting means; further memory means for storing data representing the current date and obtained by the time counting means; and means provided in said calendar designating unit of said input means for designating the display of the calendar of the current month; and wherein said calendar preparation means includes means for converting the data representing the current date into data for calendar display under control of said control means to thereby prepare the calendar of the current month.

28. The calendar data display device of claim 27, wherein the data representing the current date and stored in said further memory means is converted by said calendar preparation means and supplied to said display drive means to drive a display element which is provided in said calendar display section and which is provided in said calendar display section and which represents a special day or a holiday.

29. The calendar data display device of claim 1, wherein said electronic device has a date calculation function and the resultant date obtained by the date calculation function is stored into said memory means.

30. The calendar data display device of claim 1, wherein the date data stored in said memory means is converted into data for calendar display by said calendar preparation means under control of said control means, and the calendar of a month including the date represented by the date data stored in said memory means is displayed in a specific form.

31. The calendar data display device of claim 30, wherein said data for calendar display is supplied to said display drive means to drive a display element which is provided in said calendar display section and which represents a special day or a holiday.

32. The calendar data display device of claim 1, wherein:
said memory means includes first to fourth registers; and
said calendar preparation means includes:
a status counter;
means for preparing calendar data of Sunday, holiday, the date entered by an operator, the current date or a special date;
means for writing the data into the first to fourth registers of said memory means;
means for logically summing the contents of the registers in accordance with the numerical value stored in the status counter; and
means for causing said calendar display section to display a calendar in a continuous display mode or a flashing display mode.

33. The calendar data display device of claim 32, wherein said calendar preparation means includes means for ORing the calendar data and for supplying the ORed calendar data to said display drive means to drive a display element provided in said calendar display section and representing a special day or a holiday, in a continuous display mode or a flashing display mode.

34. The calendar data display device of claim 33, wherein said electronic device includes an electronic calculator and means for the calendar date; and wherein said calendar data preparation means includes an arithmetic unit for said electronic calculator; and said control means is provided in a micro-programmed controller to control said electronic calculator.

35. The calendar data display device of claim 34, wherein said electronic calculator includes a time counting function to obtain current data.

* * * * *

UNITED STATES PATENT AND TRADEMARK OFFICE
CERTIFICATE OF CORRECTION

PATENT NO. : 4,274,146
DATED : June 16, 1981
INVENTOR(S) : Mikio YANAGAWA

It is certified that error appears in the above—identified patent and that said Letters Patent is hereby corrected as shown below:

COLUMN 24, line 3, after "to 8C." change "The, the" to

--Then, the--;

COLUMN 34, line 1, after "so that the" change "data" to --date--.

Signed and Sealed this

Twentieth Day of October 1981

[SEAL]

Attest:

GERALD J. MOSSINGHOFF

Attesting Officer       Commissioner of Patents and Trademarks